United States Patent
Ueno et al.

(10) Patent No.: US 7,348,382 B2
(45) Date of Patent: Mar. 25, 2008

(54) POLYVINYL ALCOHOL BASED BLOCK COPOLYMER AND PIGMENT DISPERSION AQUEOUS LIQUID USING THE SAME AND RECORDING LIQUID

(75) Inventors: Nobuhiko Ueno, Kanagawa (JP); Takahiro Saitou, Mie (JP); Masanobu Yokoyama, Mie (JP); Hideko Akai, Kanagawa (JP); Hideaki Tanaka, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/240,619

(22) Filed: Oct. 3, 2005

(65) Prior Publication Data

US 2006/0089423 A1 Apr. 27, 2006

Related U.S. Application Data

(63) Continuation of application No. PCT/JP2004/004659, filed on Mar. 31, 2004.

(30) Foreign Application Priority Data

Apr. 2, 2003 (JP) ............................ 2003-099276
Jun. 10, 2003 (JP) ............................ 2003-164779

(51) Int. Cl.
*C08F 293/00* (2006.01)
*C09D 17/00* (2006.01)
*C09D 11/00* (2006.01)

(52) U.S. Cl. .................... 526/87; 526/330; 526/331; 526/923

(58) Field of Classification Search ............ 526/87, 526/330, 331, 923
See application file for complete search history.

(56) References Cited

U.S. PATENT DOCUMENTS

| 4,002,589 A | 1/1977 | Farley et al. |
| 5,672,424 A * | 9/1997 | Malhotra et al. ........ 428/32.13 |

FOREIGN PATENT DOCUMENTS

| EP | 0 161 662 | 11/1985 |
| JP | 59-189113 | 10/1984 |
| JP | 59-189114 | 10/1984 |
| JP | 60-226535 | 11/1985 |
| JP | 61-130349 | 6/1986 |
| JP | 64-75505 | 3/1989 |
| JP | 3-290402 | 12/1991 |
| JP | 6-136036 | 5/1994 |
| JP | 6-228214 | 8/1994 |
| JP | 8-134401 | 5/1996 |
| JP | 10-25347 | 1/1998 |
| JP | 10025347 A * | 1/1998 |
| JP | 2001-19770 | 1/2001 |
| JP | 2001019770 A * | 1/2001 |
| JP | 2001-233678 | 8/2001 |

OTHER PUBLICATIONS

Zaijun Lu, et al., "Synthesis and Characterization of Amphiphilic Diblock Copolymer of Polystyrene and Polyvinyl Alcohol Using Ethanolamine-Benzophenone as Photochemical Binary Initiation System", Journal of Polymer Science: Part A: Polymer Chemistry, vol. 36, 1998, pp. 109-115.

Zhengrong Guo, et al., "Synthesis and Characterization of a Diblock Copolymer of Methyl Methacrylate and Vinyl Acetate by Successive Photo-Induced Charge Transfer Polymerization Using Ethanolamine as the Parent Compound", Macromol. Rapid Commun., vol. 22, No. 2, 2001, pp. 120-125.

\* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

A recording liquid capable of giving a printed matter which is high in printing density, is suppressed in blur, has high printing quality, and has good fastness of a recorded matter including light fastness, water fastness and the like and having a low viscosity, good discharge properties and excellent storage stability. The invention is concerned with a polyvinyl alcohol based block copolymer represented by the following general formula (1), a pigment dispersion aqueous liquid containing this polyvinyl alcohol based block copolymer and a pigment in an aqueous medium, and a recording liquid containing this pigment dispersion aqueous liquid.

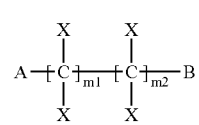

(1)

wherein A, B, $X^1$, $X^2$, $X^3$, $X^4$, m1, and m2 have the same meanings as defined in the specification.

17 Claims, 4 Drawing Sheets

POLYVINYL ALCOHOL BASED BLOCK COPOLYMER AND PIGMENT DISPERSION AQUEOUS LIQUID USING THE SAME AND RECORDING LIQUID

TECHNICAL FIELD

The present invention relates to a polyvinyl alcohol based block copolymer and to an aqueous pigment dispersion using the same. In detail, the invention relates to a recording liquid of a pigment dispersion type to be used as a recording liquid for an inkjet printer, etc. and to a polyvinyl alcohol based block copolymer which can be used therefor.

BACKGROUND ART

An inkjet printer is rapidly propagating from both personal use and business use for such reasons that full colorization can be easily achieved; that noises are low; that an image with high resolution is obtained at low costs; and that high-speed printing is possible. At present, as a recording liquid to be used for an inkjet printer, an aqueous recording liquid is the mainstream, and printed matters with high resolution become available.

Hitherto, as this aqueous recording liquid, one containing a water-soluble dye and a liquid medium as the major components was the mainstream. However, printed matters obtained by such an aqueous recording liquid were insufficient with respect to water fastness, light fastness, ozone fastness, etc. because the aqueous recording liquid contains a water-soluble dye. Then, in recent years, an aqueous recording liquid of a pigment dispersion type in which a pigment is dispersed in an aqueous medium (hereinafter sometimes referred to simply as "ink") is developed in place of such a dye.

In recent years, following an enhancement of resolution of a printed matter, a lowering of the ink discharge amount of one time from an ink discharge nozzle is remarkable. And, because of an increase of a demand for an enhancement of a printing speed of an inkjet printer, an aqueous recording liquid of a pigment dispersion type is required to have higher pigment dispersion stability and rub fastness of printed matter. On the other hand, there is proposed a method in which a variety of water-soluble polymers or water-dispersible polymers or the like are used a pigment dispersant in the aqueous recording liquid of a pigment dispersion type.

As water-soluble or water-dispersible polymers, for example, polyvinyl alcohol, polyvinyl alcohol based block polymers containing polyvinyl alcohol as the major component, and the like are generally known. Since the polyvinyl alcohol (hereinafter sometimes referred to as "PVA") is a crystalline polymer, if its degree of saponification is too high, its solubility in water is lowered. Furthermore, such PVA has low solubility in a general organic solvent. Accordingly, for the purpose of designing to highly functionalize PVA, there are known PVA whose degree of saponification is lowered (partially saponified PVA); PVA whose solubility in an organic solvent is enhanced by allowing a hydroxyl group of PVA to react with a compound having an aldehyde group (modified PVA); and besides, PVA based block copolymers in which a different kind of polymer is bound to PVA in a blocked state for the purpose of imparting effective characteristics as a polymer dispersant. And, it is proposed to use such a PVA based block copolymer as a polymer dispersant.

For example, as PVA based block copolymers, there are proposed ones in which a PVA based block and other block are bound to each other via a sulfur atom-containing connecting group (see, for example, Patent Documents 1 and 2); ones in which the subject blocks are bound to each other via an ether bond (see, for example, Patent Documents 3 and 4); ones in which the subject blocks are bound to each other via a nitrogen atom (see, for example, Non-Patent Documents 1 and 2); and besides, PVA based block copolymers composed of three blocks, etc. (see, for example, Patent Document 5).

[Patent Document 1] JP-A-59-189113
[Patent Document 2] JP-A-6-136036
[Patent Document 3] JP-A-2001-19770
[Patent Document 4] JP-A-2001-72728
[Non-Patent Document 1] *Polymer*, 39, 109 (1998)
[Non-Patent Document 2] *Polymer*, 39, 1369 (1998)
[Patent Document 5] JP-A-7-53841

DISCLOSURE OF THE INVENTION

However, in the PVA based block copolymers as described in Patent Documents 1 and 2, since the PVA based block and other block are bound to each other via a sulfur atom, there was encountered a problem that the heat resistance is low so that coloration likely occurs at the time of heating such as the time of ink discharge and the time of drying after printing. Furthermore, in the PVA based block copolymers as described in Patent Documents 3 and 4, because of the production processes thereof, a monomer capable of being introduced into the copolymer is limited to a cationic polymerizable monomer. Thus, there was encountered a problem that such cannot be adaptive with introduction of an acrylate based or meth-acrylate based monomer which is industrially useful.

And, in the PVA based copolymers as described in Non-Patent Documents 1 and 2, since the production processes thereof are concerned with a polymerization method by irradiation with ultraviolet rays, there was encountered a problem that such is not suitable for industrial application.

In addition, Patent Document 5 describes that as one of merely general exemplifications, a PVA based block can be used as a block of a copolymer. However, as specific examples, only an example of an acrylic block copolymer is given.

Furthermore, in using such a polymer dispersant, for the purpose of maintaining dispersion stability of a pigment in a pigment dispersion aqueous ink or making rub fastness of a printed matter in a certain level or higher, the content of the polymer dispersant in the ink had to be increased. For that reason, viscosity of the ink becomes high. Thus, in an inkjet recording method or the like, there was encountered a problem that printing becomes impossible because of a lowering of ink discharge properties from an ink discharge nozzle, clogging of a nozzle, etc.

Thus, development of a pigment dispersion aqueous recording liquid having higher dispersion stability and capable of providing a printed matter having excellent rub fastness, which is especially excellent as an inkjet recording liquid, has been desired. In particular, a polymer dispersant capable of satisfying such requirements has been desired.

Then, in order to solve these problems, the present inventors made extensive and intensive investigations regarding a pigment dispersion type aqueous recording liquid. As a result, it has been found that by using, as a polymer dispersant to be using in a recording liquid of a pigment dispersion type, a novel polyvinyl alcohol based block copolymer having a specific structure, in which a PVA based block and other block are connected to each other via an optionally substituted alkylene chain, not only dispersion stability of a pigment becomes good, but also discharge properties of a recording liquid becomes good at the same time, and further, the resulting printed matter has excellent rub fastness.

In particular, it has been found that in this specific polyvinyl alcohol based block copolymer, if the block which is connected to the polyvinyl alcohol based block is a copolymer and this copolymer is a so-called gradient copolymer in which the composition of plural kinds of monomers constituting the copolymer changes along a copolymer chain, the foregoing effects become more remarkable, leading to accomplishment of the invention.

That is, the gist of the invention is concerned with a polyvinyl alcohol based block copolymer represented by the following general formula (1). Also, another gist of the invention is concerned with a pigment dispersion aqueous liquid containing at least a pigment and this specific polyvinyl alcohol based block copolymer in an aqueous medium and a recording liquid containing this pigment dispersion aqueous liquid.

(1)

(In the formula, A represents a polyvinyl alcohol based block; B represents a block containing a hydrophobic segment B' and a hydrophilic or hydrophobic segment B" other than A and B'; $X^1$, $X^2$, $X^3$, and $X^4$ each independently represents a hydrogen atom, a halogen atom, an alkyl group, an alkenyl group, an aralkyl group, or an aryl group; m1 represents an integer of from 1 to 5; m2 represents an integer of from 0 to 4; and (m1+m2) represents an integer of from 1 to 5.)

BEST MODE FOR CARRYING OUT THE INVENTION

Figure 1:
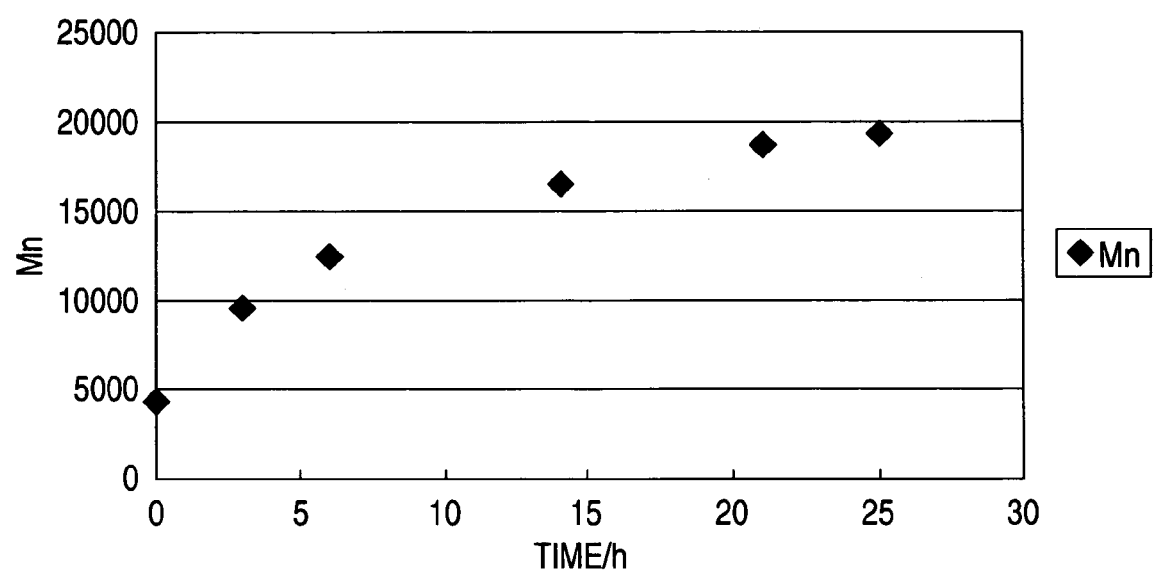
FIG. 1 is a graph showing a number average molecular weight of a polyvinyl alcohol based block copolymer as synthesized in Example 5 versus the elapsed polymerization time.

The invention will be hereunder described in detail.

1. Polyvinyl Alcohol Based Block Copolymer

The polyvinyl alcohol based block copolymer of the invention is a block copolymer in which a polyvinyl alcohol based block A and other block B are connected to each other via a specific connecting group, as represented by the following general formula (1).

(1)

(In the formula, A represents a polyvinyl alcohol based block; B represents a block containing a hydrophobic segment B' and a hydrophilic or hydrophobic segment B" other than A and B'; $X^1$, $X^2$, $X^3$, and $X^4$ each independently represents a hydrogen atom, a halogen atom, an alkyl group, an alkenyl group, an aralkyl group, or an aryl group; m1 represents an integer of from 1 to 5; m2 represents an integer of from 0 to 4; and (m1+m2) represents an integer of from 1 to 5.)

The polyvinyl alcohol based block copolymer which is used in the invention usually has a number average molecular weight in the range of 1,000 or more, preferably 3,000 or more, and more preferably 5,000 or more and not more than 150,000, preferably not more than 100,000, more preferably not more than 60,000, and further preferably not more than 40,000. Furthermore, it is preferable that its molecular weight distribution (Mw/Mn) is narrow. Above all, the molecular weight distribution is preferably not more than 4, and especially preferably not more than 2.

<Re: Polyvinyl Alcohol Based Block A in the General formula (1)>

The polyvinyl alcohol based block A is a polyvinyl alcohol based polymer residue, and a part of the hydroxyl groups thereof may be protected by an acyl group.

Though the subject acyl group is not particularly limited so far as it is general as a protective group of a hydroxyl group, preferred examples thereof include alkylcarbonyl groups which may be substituted with a substituent selected from the group consisting of a halogen atom and an aryl group, such as an acetyl group, a propionyl group, a butyryl group, an isobutyryl group, a valeryl group, a pivaloyl group, a pentylcarbonyl group, a neopentylcarbonyl group, a hexyl-carbonyl group, a heptylcarbonyl group, a decyl group, a laurolyl group, a myristolyl group, a palmitoyl group, a stearoyl group, a chloroacetyl group, a dichloroacetyl group, a trichloroacetyl group, a trifluoroacetyl group, a benzylcarbonyl group, a phenethylcarbonyl group, a phenylbutylcarbonyl group, a diphenylmethylcarbonyl group, a triphenylmethylcarbonyl group, a naphthylmethylcarbonyl group, and a naphthylethylcarbonyl group; alkenylcarbonyl groups such as an acryloyl group, an isopropenylcarbonyl group, a 3-butenylcarbonyl group, a methacryloyl group, an allylcarbonyl group, a 1,1-dimethylallylcarbonyl group, a crotonoyl group, a 3-methylallylcarbonyl group, a 2,3-dimethylallylcarbonyl group, a 3,3-dimethylallylcarbonyl group, a cinnamoyl group, and a 3-cyclohexylallylcarbonyl group; and arylcarbonyl groups which may have from 1 to 3 substituents selected from the group consisting of an alkyl group having from 1 to 4 carbon atoms and an alkoxy group having from 1 to 4 carbon atoms, such as a benzoyl group and a naphthylcarbonyl group. Of these, an acetyl group, a chloroacetyl group, an allylcarbonyl group, a benzoyl group, or a benzylcarbonyl group is preferable. Above all, an acetyl group is preferable.

In the polyvinyl alcohol based block A, a rate of acylation of the hydroxyl group in the vinyl alcohol based polymer residue may be properly chosen and determined depending upon the intended application of an ultimately obtained polymer. In general, the rate of acylation is in general not more than 20%, preferably not more than 10%, and more preferably not more than 5% of the total unit number in the polyvinyl alcohol based block A.

As this vinyl alcohol based polymer residue, ones represented by the following general formulae (2) to (5) are preferable because the effects of the invention become remarkable.

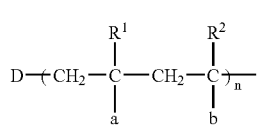
(2)

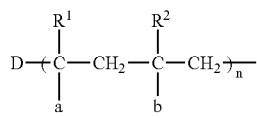
(3)

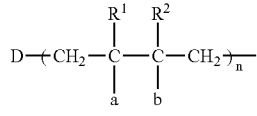
(4)

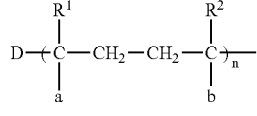
(5)

In the formulae, a and b each represents —OH or —OCOR$^3$ (wherein R$^3$ represents a hydrogen atom, an alkyl group, an alkenyl group, an aryl group, or an aralkyl group, provided that the case where a and b represent —OCOR$^3$ at the same time is excluded); R$^1$ and R$^2$ each independently represents a hydrogen atom or a hydrocarbon group having from 1 to 6 carbon atoms; n represents an integer of from 1 to 1,000; and D is represented by the following general formula (6) or (7).

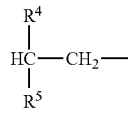
(6)

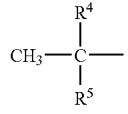
(7)

(In the formulae, R$^4$ represents a hydrogen atom or a hydrocarbon group having from 1 to 6 carbon atoms; and R$^5$ represents —OH or —OCOR$^A$ (wherein R$^A$ represents a hydrogen atom, an alkyl group, an alkenyl group, an aryl group, or an aralkyl group).))

R$^1$ and R$^2$ each independently represents a hydrogen atom or a hydrocarbon group having from 1 to 6 carbon atoms. Specific examples of this hydrocarbon group having from 1 to 6 carbon atoms include alkyl groups such as a methyl group, an ethyl group, a propyl group, an isopropyl group, a butyl group, an isobutyl group, a t-butyl group, a sec-butyl group, a pentyl group, a pentyl group, an isopentyl group, a neopentyl group, a t-pentyl group, and a hexyl group. Above all, a hydrogen atom or an alkyl group having a small number of carbon atoms is preferable, and specifically, an alkyl group having from 1 to 3 carbon atoms is preferable; and a hydrogen atom or a methyl group is especially preferable.

a and b each represents —OH or —OCOR$^3$, provided that the case where a and b represent —OCOR$^3$ at the same time is excluded. And, R$^3$ represents a hydrogen atom, an alkyl group, an alkenyl group, an aryl group, or an aralkyl group. In R$^3$, the alkyl group, alkenyl group, aryl group or aralkyl group preferably has from 1 to 20 carbon atoms and may be linear, branched or cyclic, and the carbon atom may have a substituent.

Specific examples thereof include alkyl groups and substituted alkyl groups such as a methyl group, an ethyl group, a propyl group, an isopropyl group, a butyl group, an isobutyl group, a t-butyl group, a sec-butyl group, a pentyl group, an isopentyl group, a neopentyl group, a t-pentyl group, a hexyl group, a heptyl group, a decyl group, a dodecyl group, a hexadecyl group, an octadecyl group, a chloromethyl group, a dichloromethyl group, a trichloromethyl group, and a tri-fluoromethyl group; alkenyl groups and substituted alkenyl groups such as a vinyl group, an allyl group, an isopropenyl group, a 3-butenyl group, a 1-methylallyl group, a 1,1-di-methylallyl group, a 2-methylallyl group, a 3-methylallyl group, a 2,3-dimethylallyl group, a 3,3-dimethylallyl group, a cinnamyl group, and a 3-cyclohexylallyl group; aryl groups such as a phenyl group and a naphthyl group; substituted aryl groups in which from 1 to 3 hydrogen atoms in an aryl group such as phenyl group and a naphthyl group are substituted with a functional group such as a methyl group, an ethyl group, a butyl group, a methoxy group, and an ethoxy group; and aralkyl groups and substituted aralkyl groups such as a benzyl group, a phenethyl group, a phenylbutyl group, a diphenylmethyl group, a triphenylmethyl group, a naphthylmethyl group, and a naphthylethyl group.

Above all, a methyl group, a chloromethyl group, an allyl group, a phenyl group, or a benzyl group is preferable as R$^3$; alkyl groups or substituted alkyl groups having a small number of carbon atoms are more preferable, specifically, alkyl groups or substituted alkyl groups having from 1 to 3 carbon atoms are preferable, and a methyl group or a chloromethyl group is especially preferable.

R$^4$ represents a hydrogen atom or a hydrocarbon group having from 1 to 6 carbon atoms; R$^5$ represents —OH or —OCOR$^A$; and R$^A$ represents a hydrogen atom, an alkyl group, an alkenyl group, an aryl group, or an aralkyl group. As the hydrocarbon group having from 1 to 6 carbon atoms in R$^4$, specifically ones which are the same as described above for R$^1$ and R$^2$ are enumerated. Above all, a hydrogen atom or an alkyl group having a small number of carbon atoms is preferable, and specifically, an alkyl group having from 1 to 3 carbon atoms is preferable, and a hydrogen atom or a methyl group is especially preferable.

As —OCOR$^A$ in R$^5$, it is preferable that R$^A$ represents an alkyl group, an alkenyl group, an aryl group, or an aralkyl group each having from 1 to 20 carbon atoms. These groups may be linear, branched or cyclic, and the carbon atom may have a substituent. In R$^A$, as the alkyl group, the alkenyl group, the aryl group, or the aralkyl group each having from 1 to 20 carbon atoms, specifically ones which are the same as described above for R$^3$ are enumerated. Above all, a methyl group, a chloromethyl group, an allyl group, a phenyl group, or a benzyl group is preferable, and alkyl groups or substituted alkyl group having a small number of carbon atoms are more preferable. Specifically, alkyl groups or substituted alkyl groups having from 1 to 3 carbon atoms are preferable, and a methyl group or a chloromethyl group is especially preferable.

As described previously, it is preferable that the polyvinyl alcohol based block A is one in which the respective vinyl alcohol units are bound to each other by an arbitrary combination from four binding models of "head-to-head", "head-to-tail", "tail-to-head", and "tail-to-tail" as represented by the general formulae (2) to (5). In general, though the number of vinyl alcohol units in the polyvinyl alcohol based block A may be 2 or more, it is usually 10 or more, preferably 20 or more, more preferably 30 or more, and further preferably 40 or more; and its upper limit is not more than 2,000, preferably not more than 1,000, more preferably not more than 500, and further preferably not more than 250.

Accordingly, n in the general formulae (2) to (5) is an integer of 1 or more, preferably 5 or more, more preferably 10 or more, preferably 15 or more, and further preferably 20 or more; and its upper limit is an integer of not more than 1,000, preferably not more than 500, more preferably not more than 250, and further preferably not more than 125.

When the number of vinyl alcohol units is too small (namely, n is too low), there may be the case where because of a lowering in solubility in water of the polyvinyl alcohol based block copolymer of the invention, the pigment dispersibility is lowered, or the rub fastness of a printed matter is lowered. Conversely, when the number of vinyl alcohol units is too large (namely, n is too high), there may be the case where because of an excessive increase of the viscosity of a pigment dispersion aqueous liquid, the pigment dispersibility is lowered, and when such a pigment dispersion aqueous liquid is used as a recording liquid, discharge properties of the recording liquid are lowered.

Furthermore, though the tacticity of the polyvinyl alcohol based block A is not particularly limited, an atactic structure or a syndiotactic structure closed to the atactic structure is preferable, and an atactic structure is more preferable.

And, so far as the gist of the invention is not hindered, this polyvinyl alcohol based block A may have a unit derived from a monomer other than vinyl alcohol as a copolymerization component. Its content is usually not more than 15% by mole, and especially preferably not more than 10% by mole based on the whole of the polyvinyl alcohol based block A.

Examples of this monomer include olefins such as ethylene, propylene, 1-butene, and isobutene; acrylic acid and salts thereof; acrylic esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; meth-acrylic acid and salts thereof; methacrylic esters such as methyl methacrylate, ethyl methacrylate, n-propyl meth-acrylate, i-propyl methacrylate, n-butyl methacrylate, i-butyl methacrylate, t-butyl methacrylate, 2-ethylhexyl methacrylate, dodecyl methacrylate, and octadecyl meth-acrylate; acrylamide derivatives such as acrylamide, N-methylacrylamide, N-ethylacrylamide, N,N-dimethylacrylamide, diacetoneacrylamide, acrylamidopropanesulfonic acid and salts thereof, acrylamidopropyldimethylamine and salts and quaternary salts thereof, and N-methylolacrylamide and derivatives thereof; methacrylamide derivatives such as methacrylamide, N-methylmethacrylamide, N-ethylmethacryl-amide, N,N-dimethylmethacrylamide, diacetonemethacrylamide, methacrylamidopropanesulfonic acid and salts thereof, methacrylamidopropyldimethylamine and salts and quaternary salts thereof, and N-methylolmethacrylamide and derivatives thereof; vinyl ethers such as methyl vinyl ether, ethyl vinyl ether, n-propyl vinyl ether, i-propyl vinyl ether, i-butyl vinyl ether, t-butyl vinyl ether, benzyl vinyl ether, dodecyl vinyl ether, and stearyl vinyl ether; nitrites such as acrylonitrile and methacrylonitrile; vinyl halides such as vinyl chloride, vinylidene chloride, vinyl fluoride, and vinylidene fluoride; allyl compounds such as allyl acetate and allyl chloride; dicarboxylic acids and ester derivatives thereof such as maleic acid and salts and esters thereof and itaconic acid and salts and esters thereof; vinyl silyl compounds such as vinyl trimethoxysilane; and isopropenyl acetate.

A molecular weight of the polyvinyl alcohol based block A is generally 500 or more, preferably 800 or more, and especially preferably 1,000 or more; and its upper limit is not more than 100,000, preferably not more than 50,000, more preferably not more than 30,000, and especially preferably not more than 10,000. When the molecular weight is too low, there may be the case where because of a lowering in solubility in water of the polyvinyl alcohol based block copolymer of the invention, the pigment dispersibility is lowered, or the rub fastness of a printed matter is lowered. Conversely, when it is too large, there may be the case where because of an excessive increase of the viscosity of a pigment dispersion aqueous liquid, the pigment dispersibility is lowered, and when such a pigment dispersion aqueous liquid is used as a recording liquid, discharge properties of the recording liquid are lowered.

<Re: Connecting Group Between the Polyvinyl Alcohol Based Block A and the Block B in the General Formula (1)>

The polyvinyl alcohol based block copolymer of the invention is characterized in that the connecting group between the polyvinyl alcohol based block A and other block B in the general formula (1) is a specific connecting group, specifically an optionally substituted alkylene group.

In the general formula (1), $X^1$, $X^2$, $X^3$, and $X^4$ each independently represents a hydrogen atom, a halogen atom, an alkyl group, an alkenyl group, an aralkyl group, or an aryl group. Above all, the alkyl group, alkenyl group, aralkyl group or aryl group preferably has from 1 to 20 carbon atoms and may be linear, branched or cyclic, and the carbon atom may have a substituent.

Specific examples thereof include a hydrogen atom; a halogen atom such as F, Cl, Br, and I; and ones which are the same as described above for $R^3$. Above all, in the substituted aryl group, any substituted functional group can be used so far as it does not hinder the stability of the polyvinyl alcohol based block copolymer of the invention. Specifically, linear or branched alkyl groups having from 1 to 4 carbon atoms such as a methyl group, an ethyl group, and a butyl group; and linear or branched alkoxy groups having from 1 to 4 carbon atoms such as a methoxy group and an ethoxy group are preferable.

And, as $X^1$, $X^2$, $X^3$, and $X^4$, a hydrogen atom, a halogen atom, an alkyl group having not more than 4 carbon atoms, an alkenyl group, a benzyl group, or a phenyl group is preferable. Above all, a hydrogen atom, a halogen atom, a methyl group, an allyl group, a benzyl group, or a phenyl group is preferable, and a hydrogen atom or a halogen atom is especially preferable.

m1 represents an integer of from 1 to 5; m2 represents an integer of from 0 to 4; and (m1+m2) represents an integer of from 1 to 5. Above all, (m1+m2) is preferably an integer of from 1 to 3; and (m1+m2) is especially preferably 1 or 2.

In the invention, as specific examples of the connecting group between the polyvinyl alcohol based block A and the block B, alkylene groups or haloalkylene groups having a relatively small number of carbon atoms are preferable, and haloalkylene groups are especially preferable. Specifically, examples of alkylene groups or haloalkylene groups having from 1 to 3 carbon atoms include a methylene group, an ethylene group, a propylene group, a chloromethylene group, a dichloromethylene group, a dibromomethylene group, and a tetrachloroethylene group. Above all, a chloromethylene group, a dichloro-methylene group, a dibromomethylene group, or a tetra-chloroethylene group is preferable.

<Re: Block B in the General Formula (1)>

The block B represents a block containing a hydrophobic segment B' and a hydrophilic or hydrophobic segment B" other than the foregoing A and B'.

Though the alignment order of the segments B' and B" in the block B is arbitrary, it is preferable that B' and B" are aligned in this order from the side near the polyvinyl alcohol based block A. Above all, on this occasion, the segment B" is preferably a hydrophilic segment. By taking such an alignment, not only the dispersion stability of a pigment in the pigment dispersion aqueous liquid becomes extremely good, but also the rub fastness of a printed matter is enhanced at the same time. While the reason of this is not elucidated, the following may be considered.

The polyvinyl alcohol based block A is a block which is soluble in water and crystalline. Accordingly, when the block B which is bound to this block A via the connecting group aligns the hydrophobic segment B' and the hydrophilic segment B" in this order from the connecting group, the both terminal sides of the polyvinyl alcohol based block copolymer become hydrophilic. And, the hydrophobic segment B' interposed by these hydrophilic portions adsorbs on the surface of the pigment which is hydrophobic.

It is considered that since the pigments on which the polyvinyl alcohol based block copolymer has been adsorbed in this way repulse each other in an aqueous medium by the hydrophilic portions present on the both sides of the hydrophobic segment B', coagulation in the pigment dispersion aqueous liquid is suppressed so that the dispersion stability becomes good.

In addition, by using an ionic hydrophilic segment as the segment B" in the block B, since it is possible to utilize both structural repulsion by the polyvinyl alcohol based block A and electrical repulsion of this segment B", the dispersion becomes further stable, and hence, such is preferable.

In particular, when the block B is made of a gradient copolymer, the pigment dispersion stability is further enhanced, and hence, such is preferable. While the reason why the pigment dispersion stability is enhanced is not elucidated, the following reasons may be considered. It is considered that in bringing the polymer dispersant and the pigment into contact with each other in an aqueous medium such as water and alcohols to produce a pigment dispersion aqueous liquid, the hydrophobic polymer chain itself causes coagulation in the aqueous medium because of its hydrophobicity. And, there may be considered the case where this coagulate becomes firm to such extent that the coagulation is not loosened even at the time of pigment dispersing. It is considered that it is difficult to widely cover the surface of the pigment which is hydrophobic by such a hydrophobic polymer chain.

However, in the foregoing hydrophobic segment B', when it is made of a gradient copolymer containing a small amount of a hydrophilic monomer in addition to the hydrophobic monomer (for example, when the hydrophobic segment B' composed mainly of a styrene monomer contains a hydrophilic monomer such as a (meth)acrylic acid based monomer), it is possible to provide the structure of the hydrophobic segment B' with flexibility. Therefore, it is considered that it is possible to suppress the formation of a firm coagulate even at the time of pigment dispersing in the aqueous medium. And, it is considered that the polymer dispersant having such a hydrophobic segment can more widely cover the surface of the pigment. It is considered that by widely covering the surface of the pigment which is hydrophobic, it becomes possible to reduce the hydrophobicity of the surface of the pigment, whereby the pigment dispersion stability in the aqueous medium is enhanced.

In addition, as the block B, ones represented by the following general formulae (8) to (11) are preferable because the effects of the invention become remarkable.

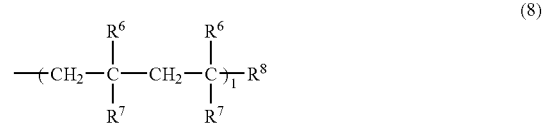

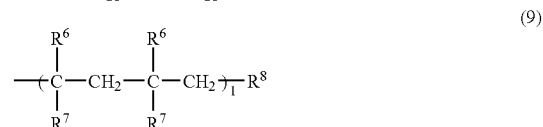

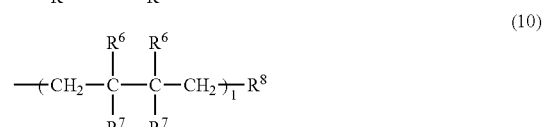

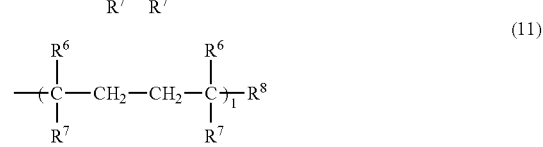

(In the formulae, $R^6$ represents a hydrogen atom, a halogen atom, a cyano group, or an alkyl group having from 1 to 10 carbon atoms; $R^7$ represents a hydrogen atom, a hydroxyl group, a halogen atom, a cyano group, a carboxyl group, a carboxylato salt, an aminocarbonyl group, an alkyl group, an acyloxy group, an alkenyl group, an aryl group, or an alkoxycarbonyl group; $R^8$ represents a hydrogen atom, a halogen atom, an alkyl group, an alkyl ether group, an alkenyl group, an aryl group, an aralkyl group, or an acyloxy group; and l represents an integer of from 1 to 1,000.)

$R^6$ represents a hydrogen atom, a halogen atom, a cyano group, or an alkyl group having from 1 to 10 carbon atoms. Specifically, examples of the halogen atom include F, Cl, Br, and I; and examples of the alkyl group having from 1 to 10 carbon atoms include a methyl group, an ethyl group, an n-propyl group, an isopropyl group, an n-butyl group, a t-butyl group, a pentyl group, a neopentyl group, a hexyl group, a heptyl group, and a decyl group. Of these, as $R^6$, a hydrogen atom or an alkyl group having from 1 to 10 carbon atoms is preferable; and above all, an alkyl group having a relatively small number of carbon atoms is preferable, and specifically, an alkyl group having from 1 to 3 carbon atoms is preferable. Especially, a hydrogen atom or a methyl group is preferable.

$R^7$ represents a hydrogen atom, a hydroxyl group, a halogen atom, a cyano group, a carboxyl group, a carboxylato salt, an aminocarbonyl group, an alkyl group, an acyloxy group, an alkenyl group, an aryl group, or an alkoxycarbonyl group. Specific examples thereof include a halogen atom such as F, Cl, Br, and I; an alkyl group, an alkenyl group, and an aryl group, each of which is the same as in the foregoing $R^3$; an acyloxy group such as an acetoxy group, a propionyloxy group, a butyryloxy group, an isobutyryloxy group, a valelyloxy group, an isovalelyloxy group, a pivaloyloxy group, a benzoyloxy group, and a toluoyloxy group; a carboxyl group; a carboxylato salt such as —COONa and —COOK; an aminocarbonyl group; a linear or branched alkoxycarbonyl group such as a methoxycarbonyl group, an ethoxycarbonyl group, an n-propoxycarbonyl group, an isopropoxycarbonyl group, an n-butoxycarbonyl group, an isobutoxycarbonyl group, a t-butoxycarbonyl group, a sec-butoxycarbonyl group, an n-pentyloxycarbonyl group, and an n-hexyloxycarbonyl group; and an arylcarbonyl group such as a phenylcarbonyl group and a benzylcarbonyl group.

Above all, as $R^7$, a methyl group, an acetoxy group, an allyl group, a phenyl group, a t-butoxycarbonyl group, an arylcarbonyl group, a methoxycarbonyl group, or a carboxylato salt is preferable; and a phenyl group, a t-butoxycarbonyl group, a benzylcarbonyl group, a methoxycarbonyl group, or a carboxylato salt is especially preferable.

$R^8$ represents a hydrogen atom, a halogen atom, an alkyl group, an alkyl ether group, an alkenyl group, an aryl group, an aralkyl group, or an acyloxy group. Specifically, ones which are the same as those disclosed in $R^7$ are enumerated. Above all, a hydrogen atom or a halogen atom is preferable.

l in the general formulae (8) to (11) represents an integer of from 1 to 1,000. Above all, it is preferable that l is 1 or more, and its upper limit is not more than 500, and especially not more than 200.

More specifically, with respect to the segments B' and B" in the block B, a polymer residue having a charge group is preferable as the hydrophilic segment. For example, acrylic acid salt polymer residues such as a sodium acrylate polymer residue (AA(Na)); and methacrylic acid salt polymer residues such as a sodium methacrylate polymer residue (MAA(Na)) are preferable.

Furthermore, as the hydrophobic segment, ones not having a charge group are preferable. Specific examples thereof include aryl (meth)acrylate based polymer residues such as a benzyl acrylate polymer residue and a benzyl methacrylate polymer residue (BzMA); alkyl(meth)acrylate based polymer residues such as a 2-ethylhexyl acrylate polymer residue (2EtHxA), an n-butyl acrylate polymer residue (n-BtA), a t-butyl acrylate polymer residue (t-BA), a methyl acrylate polymer residue (MeA), and an ethyl acrylate polymer residue (EtA); and a styrene based polymer residue (St). Above all, aryl methacrylate based polymer residues such as (BZMA), alkyl acrylate based polymer residues such as (2EtHxA), (n-BtA), (t-BA), and (MeA), a styrene based polymer residue (St), etc. are preferable.

A molecular weight of the block B is in general 500 or more; and its upper limit is preferably not more than 50,000, and especially not more than 20,000.

As the polyvinyl alcohol based block copolymer of the invention, in the foregoing general formula (1), it is preferable that the polyvinyl alcohol based block A is represented by any one of the foregoing general formulae (2) to (5), while the block B is represented by any one of the foregoing general formulae (8) to (11). Above all, polyvinyl alcohol based block copolymers comprising a combination of preferred ones in the respective blocks A and B are preferable because the effects of the invention become remarkable.

<Re: Production Process of Polyvinyl Alcohol Based Block Copolymer>

Next, one example of the production process of the polyvinyl alcohol based block copolymer of the invention as represented by the foregoing general formula (1) will be hereunder described.

With respect to the polyvinyl alcohol based block copolymer of the invention, for example, a polyvinyl ester having a halogen atom Z in one terminal thereof as represented by the following general formula (12) is first obtained by a chain transfer polymerization method, etc. This polyvinyl ester has a similar structure to the foregoing polyvinyl alcohol based block A, except that a halogen atom is bound to one terminal thereof. Next, a radical polymerizable monomer is polymerized by an atom transfer radical polymerization method, etc. by using this polyvinyl ester as a macro initiator, to obtain a block copolymer containing a polyvinyl ester. Thereafter, by saponifying the polyvinyl ester portion in this block copolymer, it is possible to obtain a polyvinyl alcohol based block copolymer. However, the saponification can be carried out prior to the polymerization. In that case, atom transfer radical polymerization using polyvinyl alcohol as obtained by the saponification as a macro initiator is carried out.

(12)

(In the formulae, A' represents an acyloxy group in which a in the units represented by the foregoing general formulae (2) to (5) is all represented by —OCOR$^3$ (wherein R$^3$ is the same as defined above); X$^1$, X$^2$, X$^3$, X$^4$, m1, and m2 are the same as defined above; and Z represents a halogen atom such as F, Cl, Br, and I.) In the general formula (12), Z is preferably a chlorine atom.

First of all, the preparation method of the polyvinyl ester represented by the general formula (12) by the chain transfer polymerization method will be hereunder described.

The foregoing polyvinyl ester having a halogen atom in one terminal thereof can be synthesized by a chain transfer polymerization method called as telomerization (*Eur. Polym. J.*, 18, 779 (1982)). That is, a polyvinyl ester having a halogen atom in one terminal thereof is obtained quantitatively by radical polymerization of a vinyl ester in the presence of a polyhalogenated hydrocarbon having a large radical chain transfer constant called as a chain transfer agent (telogen). Incidentally, in the general formula (12), the connecting group between A' and Z is corresponding to the connecting group of A-B in the general formula (1) and is derived by the chain transfer agent. That is, X$^1$, X$^2$, X$^3$, and X$^4$ in the general formula (1) are derived from the chain transfer agent.

Examples of the foregoing chain transfer agent include methylene chloride, ethylene chloride, dichloroethane, ethylidene chloride, ethylidene bromide, chloroform, carbon tetrachloride, carbon tetrabromide, methylchloroform, trichloroethane, tetrachloroethane, allyl chloride, butyl chloride, butyl bromide, butyl iodide, chlorobenzene, bromobenzene, dichlorobenzene, benzyl chloride, and meth-allyl chloride.

Examples of the foregoing vinyl ester include vinyl acetate, vinyl propionate, vinyl laurate, vinyl stearate, vinyl pivalate, vinyl formate, vinyl caproate, vinyl caprate, vinyl myristate, vinyl palmitate, vinyl 2-ethylhexanoate, vinyl cyclohexanecarboxylate, vinyl monochloroacetate, vinyl adipate, vinyl methacrylate, vinyl crotonate, vinyl sorbate, vinyl benzoate, vinyl cinnamate, and α-substitution products thereof. Of these, vinyl esters having a bulky side chain or vinyl esters having high polarity, such as vinyl acetate, vinyl pivalate, and vinyl formate, are suitable.

According to the chain transfer polymerization method, the molecular weight can be arbitrarily adjusted by choosing a ratio of the chain transfer agent to the vinyl ester monomer or by changing the monomer concentration in the case of using a polymerization solvent.

As a radical polymerization initiator in the chain transfer polymerization method, known initiators such as azo based initiators, redox based initiators, and UV based initiators can be used. Radiations or electron beams can also be used. Of these, azo based initiators are preferable because of easiness in handling.

The polymerization reaction can be carried out in the absence of a solvent or in the presence of a solvent. Examples of polymerization reaction solvents include ethers such as diethyl ether, tetrahydrofuran, diphenyl ether, anisole, and dimethoxybenzene; amides such as N,N-dimethylformamide and N,N-dimethylacetamide; nitriles such as acetonitrile, propionitrile, and benzonitrile; carbonyl compounds such as acetone, methyl ethyl ketone, methyl isobutyl ketone, ethyl acetate, butyl acetate, ethylene carbonate, and propylene carbonate; alcohols such as methanol, ethanol, propanol, isopropanol, n-butyl alcohol, t-butyl alcohol, and isoamyl alcohol; aromatic hydrocarbons such as benzene, toluene, and xylene; and halogenated hydrocarbons such as chlorobenzene, methylene chloride, chloroform, chlorobenzene, and carbon tetrachloride. Furthermore, in the case where the chain transfer agent to be used is liquid, this may be used as the polymerization reaction solvent. As the chain transfer agent which is used as the solvent, halogenated hydrocarbons are preferable, and chloroform is more preferable.

In carrying out the polymerization reaction, the addition order of the vinyl ester monomer, the chain transfer agent, the polymerization solvent, the radical initiator, and the like are arbitrary. For example, there is enumerated a method in which the vinyl ester monomer, the chain transfer agent, the polymerization solvent, and the radical polymerization initiator are collectively charged in a reactor and the temperature is then raised to achieve the polymerization reaction. As another method, there is enumerated a method in which after charging a vinyl ester monomer, a chain transfer agent, and a polymerization solvent in a reactor and raising the temperature, a monomer solution containing the radical polymerization initiator, the chain transfer agent, and the polymerization solvent, or a mixture thereof is continuously or dividedly added to achieve the polymerization reaction. Above all, a method in which the vinyl ester monomer, the chain transfer agent, and the polymerization solvent are charged in a reactor, the temperature is raised, and the polymerization solvent containing the radical polymerization initiator is then dividedly added is preferable because the generation of heat at the time of polymerization reaction can be controlled.

Though an amount of the chain transfer agent to be used is not particularly limited, it is usually 0.01 parts by weight or more, preferably 1 part by weight or more and not more than 2,000 parts by weight, and preferably not more than 1,000 parts by weight based on 100 parts by weight of the vinyl ester monomer. Though an amount of the solvent to be used is not particularly limited, it is usually 1 part by weight or more and not more than 2,000 parts by weight, and preferably not more than 1,000 parts by weight based on 100 parts by weight of the monomer. Though a polymerization temperature is not particularly limited, it is usually 0° C. or higher, and preferably 20° C. or higher; and its upper limit is not higher than 200° C., and preferably not higher than 150° C.

The thus obtained polyvinyl ester is purified in the usual way and provided for a next step. As this purification method, for example, there is enumerated a method in which the polymerization solution is thrown into a solvent in which the monomer and the polymerization solvent are soluble but the polyvinyl ester is insoluble, thereby precipitating the polyvinyl ester, which is then filtered out and dried. There is also enumerated a purification method in which after removing the unreacted monomer by distillation, etc., the reaction solvent is displaced. Above all, a purification method in which after removing the unreacted monomer by distillation, etc., the reaction solvent is displaced is preferable. In particular, according to this purification method, by adding an alkaline component to a solution containing the polyvinyl ester at the time of removal operation of the unreacted monomer, an acid as generated within the system by distillation, etc. is neutralized, whereby decomposition of the polyvinyl ester due to this acid can be suppressed, and hence, this method is preferable. In removing the unreacted monomer and reaction solvent by distillation, it is preferable that the distillation is carried out in vacuo. At the time of distillation in vacuo, in order to avoid polymerization of the unreacted monomer and decomposition of the polyvinyl ester, it is preferable that the distillation in vacuo is carried out at not higher than 50° C., and especially not higher than 40° C.

Next, the foregoing atom transfer radical polymerization method, namely, the atom transfer radical polymerization method using a polyvinyl ester having a halogen atom in one terminal thereof as a macro initiator, will be hereunder described. The atom transfer radical polymerization method is one method of living radical polymerization methods and is expressed by the following scheme.

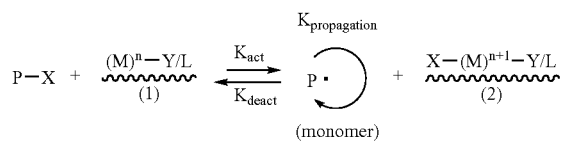

(monomer)

In the foregoing scheme, (P) represents a polymer or an initiator; (M) represents a transition metal; X represents a halogen atom; Y and L each represents a ligand capable of being coordinated on (M); and n and (n+1) each represents a valence of the transition metal. A low-valence complex (1) and a high-valence complex (2) constitute a redox conjugated system.

First, a low-valence complex (1) radically withdraws a halogen atom X from a halogen-containing polymerization initiator P-X to form a high-valence complex (2) and a carbon-center radical P•. Incidentally, a rate of this reaction is expressed by $K_{act}$. This radical P• reacts with a monomer to form an intermediate radical species P• of the same kind as illustrated in the scheme. Incidentally, a rate of this reaction is expressed by $K_{propagation}$).

A reaction between the high-valence complex (2) and the radical P• generates a product P-X and simultaneously regenerates the low-valence complex (1). A rate of this reaction is expressed by $K_{deact}$. And, the low-valence complex (1) further reacts with P-X to advance a new reaction. In this reaction, what a concentration of the growing radical species P• is suppressed in a low level is the most important in controlling the polymerization.

Incidentally, specific examples of the foregoing atom transfer radical polymerization method include the following reports (1) and (2).

(1) Polymerization of styrene using α-chloroethylbenzene as an initiator in the presence of a CuCl/bipyridyl complex (J. Wang and K. Matyjaszewski, *J. Am, Chem. Soc.*, 117, 5614 (1995))

(2) Polymerization of methyl methacrylate using $CCl_4$ as an initiator in the presence of $RuCl_2$ $(PPh_3)_3$ and an organoaluminum compound (M. Kato, M. Kamigaito, M. Sawamoto, T. Higashimura, *Macromolcules*, 28, 1821 (1995))

Accordingly, by polymerizing a radical polymerizable monomer by an atom transfer radical polymerization method by using the foregoing polyvinyl ester having a halogen atom in one terminal thereof as the foregoing macro initiator (P-X) of the atom transfer type radical polymerization method, a block copolymer containing the polyvinyl ester block and other block B is obtained.

Though the transition metal to be used for the atom transfer radical polymerization method is not particularly limited, at least one transition metal selected from those belonging to the groups 7 to 11 of the periodic table is suitable. In a redox catalyst (redox conjugated complex), the low-valence complex (1) and the high-valence complex (2) reversible change as illustrated in the foregoing scheme. Specifically, the low-valence metal $(M)_n$ to be used is a metal selected from the group of $Cu^+$, $Ni^0$, $Ni^+$, $Ni^{2+}$, $Pd^0$, $Pd^+$, $Pt^0$, $Pt^+$, $Pt^{2+}$, $Rh^+$, $Rh^{2+}$, $Rh^{3+}$, $Co^+$, $Co^{2+}$, $Ir^0$, $Ir^+$, $Ir^{2+}$, $Ir^{3+}$, $Fe^{2+}$, $Ru^{2+}$, $Ru^{3+}$, $Ru^{4+}$, $Ru^{5+}$, $Os^{2+}$, $Os^{3+}$, $Re^{2+}$, $Re^{3+}$, $Re^{4+}$, $Re^{6+}$, $Mn^{2+}$, and $Mn^{3+}$. Above all, $Cu^+$, $Ru^{2+}$, $Fe^{2+}$, or $Ni^{2+}$ is preferable; and $Cu^+$ is especially preferable. Specific examples of a monovalent copper compound include cuprous chloride, cuprous bromide, cuprous iodide, and cuprous cyanide.

As the ligand, an organic ligand is generally used. Specific examples thereof include 2,2'-bipyridyl and derivatives thereof, 1,10-phenanthroline and derivatives thereof, tetramethyethylenediamine, pentamethyldiethylene-triamine, tris (dimethylaminoethyl)amine, triphenyl phosphine, and tributyl phosphine. Aliphatic polyamines such as tris (dimethylaminoethyl)amine are especially preferable.

As the solvent, the solvents as enumerated as the polymerization solvent to be used in the chain transfer polymerization can be similarly used. Above all, alcohols are preferable; and methanol, isopropyl alcohol, or a mixed solvent thereof is especially preferable.

Examples of the radical polymerizable monomer include an acrylate based monomer, a methacrylate based monomer, and a styrene based monomer. A monomer which is hardly radical polymerized singly, such as vinyl ethers, allyl ethers, and allyl esters, can also be used as a copolymerization component of the radical polymerizable monomer.

Examples of the foregoing acrylate based monomer include methyl acrylate, ethyl acrylate, propyl acrylate, n-butyl acrylate, t-butyl acrylate, hexyl acrylate, 2-ethylhexyl acrylate, nonyl acrylate, benzyl acrylate, cyclohexyl acrylate, lauryl acrylate, n-octyl acrylate, 2-methoxyethyl acrylate, butoxyethyl acrylate, methoxytetraethylene glycol acrylate, 2-hydroxyethyl acrylate, 2-hydroxypropyl acrylate, 3-chloro-2-hydroxypropyl acrylate, tetrahydrofurfuryl acrylate, 2-hydroxy-3-phenoxypropyl acrylate, diethylene glycol acrylate, polyethylene glycol acrylate, 2-(dimethylamino) ethyl acrylalte, N,N-dimethylacrylamide, and N-methylolacrylamide.

Specific examples of the foregoing methacrylate based monomer include methyl methacrylate, ethyl methacrylate, propyl methacrylate, n-butyl methacrylate, t-butyl methacrylate, hexyl methacrylate, 2-ethylhexyl methacrylate, nonyl methacrylate, benzyl methacrylate, cyclohexyl methacrylate, lauryl methacrylate, n-octyl methacrylate, 2-methoxyethyl methacrylate, butoxyethyl methacrylate, methoxytetraethylene glycol methacrylate, 2-hydroxyethyl methacrylate, 2-hydroxypropyl methacrylate, 3-chloro-2-hydroxypropyl methacrylate, tetrahydrofurfuryl methacrylate, 2-hydroxy-3-phenoxypropyl methacrylate, diethylene glycol methacrylate, polyethylene glycol methacrylate, and 2-(dimethylamino)ethyl methacrylate.

Examples of the foregoing styrene based monomer include styrene, o-methoxystyrene, m-methoxystyrene, p-methoxy-styrene, o-t-butoxystyrene, m-t-butoxystyrene, p-t-butoxy-styrene, o-chloromethylstyrene, m-chloromethylstyrene, and p-chloromethylstyrene.

Though an amount of the solvent to be used is not particularly limited, it is usually 1 part by weight or more, and preferably 100 parts by weight or more based on 100 parts by weight of the monomer; and its upper limit is not more than 2,000 parts by weight, and preferably not more than 1,000 parts by weight.

Though an amount of the low-valence metal $(M)_n$ to be used is not particularly limited, it is usually $10^{-6}$ moles/liter or more, and preferably $10^{-5}$ moles/liter or more in terms of a concentration in the polymerization reaction system; and its upper limit is not more than $10^{-1}$ moles/liter. And, it is usually 0.001 moles or more, and preferably 0.005 moles or more per mole of the initiator; and its upper limit is not more than 100 moles, and preferably not more than 50 moles. Furthermore, though a polymerization temperature is not particularly limited, it is usually 0° C. or higher, and preferably 20° C. or higher; and its upper limit is not higher than 200° C., and preferably not higher than 150° C. In the invention, the polymerization livingly proceeds.

The block B is preferably a polymer containing the foregoing radical polymerizable monomer as a constituent component and may be a modification product thereof depending upon the intended application. Specifically, it is possible to introduce a carboxylic acid ester group as a side chain in the polymer backbone of the block B; to hydrolyze a carboxylic acid ester group under an acidic or alkaline condition to form a carboxylic acid structure; and to further neutralize the carboxylic acid with sodium hydroxide, etc. to form a carboxylic acid salt structure. In the case of hydrolyzing a carboxylic acid ester group under an acidic or alkaline condition to form a carboxylic acid structure, the hydrolysis may be carried out in the same step as in the saponification reaction of the polyvinyl ester as the block A or in a separate step. Furthermore, in the case of the polymer block B having a tertiary amine structure as in a dimethylaminoethyl group, a tertiary amine may be allowed to react with benzyl chloride, etc. to form a quaternary salt structure. By such a modification treatment, $R^6$ to $R^8$ in the foregoing general formulae (8) to (11) are determined.

In addition, the block B is preferably a gradient copolymer as obtained by polymerizing a plural number of radical polymerizable monomers having different reactivity as the radical polymerizable monomer. As a process for producing the gradient copolymer, for example, there is enumerated a method in which in the foregoing atom transfer radical polymerization method, two or more monomers having different reactivity are copolymerized by using the foregoing polyvinyl ester having a halogen atom in one terminal thereof as the macro initiator (P-X).

A method for introducing two or more monomers having different reactivity into the polymerization reaction system is arbitrary. Specifically, for example, there is enumerated a method for simultaneously introducing all kinds of monomers to be used for the reaction in a reactor at the time of initiating the polymerization. As another method, there is enumerated a method for continuously or dividedly introducing the monomers to be used for the reaction singly and/or in admixture in the reactor at the time of initiating the polymerization. In addition, there is enumerated a method for continuously or dividedly introducing the monomers to be used for the reaction as two or more mixtures having a different composition ratio in the reactor at the time of initiating the polymerization. Above all, a method for simultaneously introducing all kinds of the monomers to be used for the reaction in the reactor at the time of initiating the polymerization is preferable.

On this occasion, it is preferred to use a hydrophobic monomer and a hydrophilic monomer (the hydrophilic monomer includes a monomer which exhibits hydrophilicity by a modification reaction after the polymerization) as plural kinds of monomers having different reactivity. Above all, it is preferred to use a hydrophobic monomer having high reactivity and a hydrophilic monomer having low reactivity as compared with this hydrophobic monomer. By using such hydrophobic monomer and hydrophilic monomer, the block B becomes a gradient copolymer such that the hydrophobic monomer composition decreases in a constant proportion towards its terminal (the terminal in the direction opposite to the connecting group), while the hydrophilic monomer composition conversely increases in a constant proportion.

By introducing such a gradient structure in the polymer chain, when the PVA based block copolymer of the invention is made present in an aqueous medium, since in the block B, the hydrophobic segment B' in a portion closed to the connecting group contains a hydrophilic group in its structure, it is plasticized by water in the aqueous medium, whereby it becomes possible to provide the hydrophobic segment B' with flexibility.

Accordingly, when the hydrophobic segment B' in the block B has flexibility, and preferably the terminal of the block B has the hydrophilic segment B", in producing a pigment dispersion aqueous liquid by bringing the PVA based block copolymer of the invention having this block B (polymer dispersant) and a pigment into contact with each other in an aqueous medium such as water and alcohols and dispersing, it is possible to prevent the polymer chain itself of the hydrophobic segment B' from the formation of a firm coagulate to such extent that it is not loosened at the time of dispersing in the aqueous medium, whereby the polymer dispersant more widely covers the surface of the pigment. In this way, it is considered that it becomes possible to reduce hydrophobicity on the surface of the pigment which is originally hydrophobic, whereby the dispersion stability of the pigment in the aqueous medium is enhanced.

A combination of such hydrophobic segment B' and hydrophilic segment B" may be produced by using an arbitrary hydrophobic monomer having high reactivity and an arbitrary hydrophilic monomer having low reactivity as compared with this hydrophobic monomer (the hydrophilic monomer includes a monomer which exhibits hydrophilicity by a modification reaction after the polymerization). Specifically, examples of the hydrophobic segment in the segments B' and B" include polymer residues not having a charge group, for example, aryl(meth)acrylate based polymer residues such as a benzyl acrylate polymer residue and a benzyl methacrylate polymer residue (BzMA); alkyl (meth)acrylate based polymer residues such as a 2-ethylhexyl acrylate polymer residue (2EtHxA), an n-butyl acrylate polymer residue (n-BtA), a t-butyl acrylate polymer residue (t-BA), a methyl acrylate polymer residue (MeA), and an ethyl acrylate polymer residue (EtA); and a styrene based polymer residue (St). Above all, aryl methacrylate based polymer residues such as (BZMA), alkyl methacrylate based polymer residues such as (2EtHxA), (n-BtA), (t-BA), and (MeA), and a styrene based polymer residue (St), etc. are preferable. Furthermore, as the hydrophilic segment in the segment B", polymer residues having a charge group are preferable. For example, acrylic acid salt polymer residues such as a sodium acrylate polymer residue (AA(Na)); and methacrylic acid salt polymer residues such as a sodium methacrylate polymer residue (MAA(Na)) are preferable.

In this way, a block copolymer containing the polyvinyl ester block and the block B, which is a gradient copolymer, is obtained.

In forming the block B into a gradient copolymer, as described previously, a plural number of radical polymerizable monomers, and preferably a mixture of these monomers may be polymerized by the atom transfer radical polymerization method by using the foregoing polyvinyl ester having a halogen atom in one terminal thereof as the macro initiator (P-X) of the atom transfer radical polymerization method. In carrying out this polymerization, the addition order of the macro initiator, the plural kinds of radical polymerizable monomers, and the catalyst is arbitrary. For example, there are enumerated a method in which after throwing a metal catalyst in a reactor, a mixture of a macro initiator, radical polymerizable monomers and a polymerization solvent is thrown, an organic ligand is then mixed, and the temperature is raised to achieve the polymerization; and a method in which after throwing a mixture of a macro initiator, radical polymerizable monomers and a polymerization solvent in a reactor, a metal catalyst and an organic ligand are separately thrown, or a solution containing a mixture thereof is thrown.

Above all, it is preferable that prior to adding a catalyst, the temperature is raised to the vicinity of the reaction initiation temperature within the range not exceeding the reaction initiation temperature, specifically, the temperature is raised within 20° C., and preferably 15° C. of the reaction initiation temperature, and a mixture containing a macro initiator and plural kinds of radical polymerizable monomers is then mixed with the catalyst, followed by raising the temperature to initiate the polymerization reaction. This method is preferable because impurities derived from the catalyst are reduced. The catalyst which is used in such a polymerization reaction method is arbitrary. Above all, the use of a copper catalyst such as cuprous chloride and cuprous bromide is preferable because the effects become remarkable. The use of cuprous bromide is more preferable.

The thus obtained block copolymer is provided for a next step after purification in the usual way or without being purified. As the purification method, there are enumerated a method in which precipitation and filtration of the block copolymer in a solvent in which the polymer is insoluble but the monomers and the catalyst are soluble are repeated and a purification method in which the unreacted monomers are removed by distillation, etc. and the reaction solvent is then displaced.

Next, the saponification method will be hereunder described. The saponification reaction of the polyvinyl ester block is carried out in the presence of a saponification catalyst. Usually, in carrying out saponification, the polyvinyl ester which is a macro initiator or a block copolymer as synthesized from a macro initiator by the atom transfer radical polymerization method is dissolved in an alcohol (for example, methanol, ethanol, isopropanol, and butanol), benzene, methyl acetate, etc. In the case where solubility of the block copolymer in the foregoing solvent is low, an ether such as tetrahydrofuran, diphenyl ether, anisole, and dimethoxybenzene; an amide such as N,N-dimethylformamide and N,N-dimethylacetamide; a nitrile such as acetonitrile, propionitrile, and benzonitrile; a carbonyl compound such as acetone, methyl ethyl ketone, methyl isobutyl ketone, ethyl acetate, butyl acetate, ethylene carbonate, and propylene carbonate; and the like may be mixed and used as a solvent for saponification reaction.

As the saponification catalyst, alkaline catalysts such as alkali metal hydroxides or alcoholates, for example, sodium hydroxide, potassium hydroxide, sodium methylate, sodium ethylate, and potassium methylate can be used. Acid catalysts such as sulfuric acid, hydrochloric acid, and p-toluenesulfonic acid can also be used. Though an amount of the alkaline catalyst to be used is not particularly limited, it is usually not more than 100 millimolar equivalents, preferably not more than 50 millimolar equivalents, and more preferably not more than 30 millimolar equivalents per mole of the vinyl ester unit. Though an amount of the acid catalyst to be used is not particularly limited, it is usually not more than 1,000 millimolar equivalents, preferably not more than 500 millimolar equivalents, and more preferably not more than 300 millimolar equivalents per mole of the vinyl ester unit. A temperature of the saponification reaction is usually 20° C. or higher, and preferably 40° C. or higher; and its upper limit is not higher than 100° C., and preferably not higher than 80° C.

While a degree of saponification may be properly chosen and determined depending upon the intended application of an ultimately obtained PVA based block copolymer, it is usually 80% by mole or more, and preferably 90% by mole or more. The "degree of saponification" as referred to herein expresses a proportion of a vinyl alcohol unit after saponification to a unit which can be converted to a vinyl alcohol unit by saponification of a vinyl ester unit, and the residue is a vinyl ester unit.

In addition, in introducing a monomer having a carboxylic acid ester group in the block B and after polymerization, hydrolyzing the carboxylic acid ester group to form a carboxylic acid structure or a carboxylic acid salt structure, the saponification reaction of the block A and the hydrolysis reaction may be carried out in the same step (one pot). At the time of saponification and hydrolysis reaction in one pot, examples of a solvent to be used include alcohols (for example, methanol, ethanol, isopropanol, and butanol), benzene, methyl acetate, ethers such as tetrahydrofuran, diphenyl ether, anisole, and dimethoxybenzene; amides such as N,N-dimethylformamide and N,N-dimethylacetamide; nitrites such as acetonitrile, propionitrile, and benzonitrile; carbonyl compounds such as acetone, methyl ethyl ketone, methyl isobutyl ketone, ethyl acetate, butyl acetate, ethylene carbonate, and propylene carbonate; and water. These may be used singly or in admixture. Above all, it is preferred to use a mixture of water and a water-soluble organic solvent such as methanol and tetrahydrofuran.

As the saponification and hydrolysis catalyst, likewise the case of carrying out the saponification reaction in a single step, alkaline catalysts such as alkali metal hydroxides or alcoholates, for example, sodium hydroxide, potassium hydroxide, sodium methylate, sodium ethylate, and potassium methylate are used. Acid catalysts such as sulfuric acid, hydrochloric acid, and p-toluenesulfonic acid can also be used. Though an amount of the alkaline catalyst to be used is not particularly limited, it is usually 1/100 equivalents or more and not more than 5 equivalents, preferably not more than 2 equivalents, and more preferably not more than 1.5 equivalents based on the total sum of the vinyl ester unit and the carboxylic acid ester unit in the polymer. Though an amount of the acid catalyst to be used is not particularly limited, it is usually 1/1,000 equivalents or more and not more than 5 equivalents, preferably not more than 2 equivalents, and more preferably not more than 1.5 equivalents based on the total sum of the vinyl ester unit and the carboxylic acid ester unit in the polymer. A temperature of the reaction is usually 20° C. or higher, and preferably 40° C. or higher; and its upper limit is not higher than 100° C., and preferably not higher than 80° C.

2. Pigment Dispersion Aqueous Liquid and Recording Liquid

Since the polyvinyl alcohol based block copolymer of the invention is a water-soluble or water-dispersible polymer, when used as a polymer dispersant of a pigment dispersion aqueous liquid, it exhibits excellent pigment dispersibility in this aqueous liquid. Furthermore, when this pigment dispersion aqueous liquid is used as a recording liquid, especially it is used as an inkjet recording liquid, there gives rise to effects at the same time such that not only dispersion stability of a pigment becomes good, but also discharge properties of a recording liquid from a discharge nozzle become good, and further, a printed matter having excellent rub fastness is obtained.

A pigment dispersion aqueous liquid using the polyvinyl alcohol based block copolymer of the invention as a polymer dispersant and a recording liquid of a pigment dispersion type containing the same will be hereunder described.

<Re: Pigment>

As the pigment which is used in the invention, ones which are general in respective applications may be properly chosen without particular limitations. Representative examples thereof include extender pigments such as calcium carbonate, kaolin clay, talc, bentonite, and mica; metal oxide based pigments represented by titanium oxide, zinc oxide, goethite, magnetite, and chromium oxide; composite oxide based pigments such as Titan Yellow, Titan Buff, antimony yellow, vanadium-tin yellow, cobalt green, cobalt chromium green, manganese green, cobalt blue, cerulean blue, manganese blue, tungsten blue, Egyptian Blue, and cobalt black; sulfide based pigments represented by lithophone, cadmium red/yellow, and cadmium red; phosphate based pigments represented by mineral violet, cobalt violet, lithium cobalt phosphate, sodium cobalt phosphate, potassium cobalt phosphate, ammonium cobalt phosphate, nickel phosphate, and copper phosphate; chromate based pigments represented by chrome yellow and molybdate orange; metal complex salt based pigments represented by ultramarine blue and Persian Blue; metal powder based pigments represented by aluminum paste, bronze powder, zinc dust, stainless steel flake, and nickel flake; inorganic pigments such as pearly luster pigments and pearly luster conductive pigments represented by carbon black, bismuth oxychloride, basic carbonate, titanium dioxide, coated mica, ITO, and ATO; and organic pigments such as quinacridone based pigments, quinacridone quinone based pigments, dioxazine based pigments, phthalocyanine based pigments, anthrapyrimidine based pigments, anthanthrone based pigments, indanthrone based pigments, flavanthrone based pigments, perylene based pigments, diketopyrrolopyrrole based pigments, perinone based pigments, quinophthalone based pigments, anthraquinone based pigments, thioindigo based pigments, metal complex based pigments, azomethine based pigments, and azo based pigments.

Specific examples of the foregoing pigment include pigments having the pigment number as described below and known carbon blacks which are generally used in the field of color material. Incidentally, terminologies as enumerated below, such as "C.I. Pigment Red 2", mean a color index (C.I.).

Red color material: C.I. Pigment Red 1, 2, 3, 4, 5, 6, 7, 8, 9, 12, 14, 15, 16, 17, 21, 22, 23, 31, 32, 37, 38, 41, 47, 48, 48:1, 48:2, 48:3, 48:4, 49, 49:1, 49:2, 50:1, 52:1, 52:2, 53, 53:1, 53:2, 53:3, 54, 57, 57:1, 57:2, 58, 58:4, 60, 63, 63:1, 63:2, 64, 64:1, 68, 69, 81, 81:1, 81:2, 81:3, 81:4, 83, 88, 90:1, 101, 101:1, 104, 108, 108:1, 109, 112, 113, 114, 122, 123, 144, 146, 147, 149, 151, 166, 168, 169, 170, 172, 173, 174, 175, 176, 177, 178, 179, 181, 184, 185, 187, 188, 190, 193, 194, 200, 202, 206, 207, 208, 209, 210, 214, 216, 220, 221, 224, 230, 231, 232, 233, 235, 236, 237, 238, 239, 242, 243, 245, 247, 249, 250, 251, 253, 254, 255, 256, 257, 258, 259, 260, 262, 263, 264, 265, 266, 267, 268, 269, 270, 271, 272, 273, 274, 275, 276;

Blue color material: C.I. Pigment Blue 1, 1:2, 9, 14, 15, 15:1, 15:2, 15:3, 15:4, 15:6, 16, 17, 19, 25, 27, 28, 29, 33, 35, 36, 56, 56:1, 60, 61, 61:1, 62, 63, 66, 67, 68, 71, 72, 73, 74, 75, 76, 78, 79;

Green color material: C.I. Pigment Green 1, 2, 4, 7, 8, 10, 13, 14, 15, 17, 18, 19, 26, 36, 45, 48, 50, 51, 54, 55;

Yellow color material: C.I. Pigment Yellow 1, 1:1, 2, 3, 4, 5, 6, 9, 10, 12, 13, 14, 16, 17, 23, 24, 31, 32, 34, 35, 35:1, 36, 36:1, 37, 37:1, 40, 41, 42, 43, 48, 53, 55, 61, 62, 62:1, 63, 65, 73, 74, 75, 81, 83, 87, 93, 94, 95, 97, 100, 101, 104, 105, 108, 109, 110, 111, 116, 119, 120, 126, 127, 127:1, 128, 129, 133, 134, 136, 138, 139, 142, 147, 148, 150, 151, 153, 154, 155, 157, 158, 159, 160, 161, 162, 163, 164, 165, 166, 167, 168, 169, 170, 172, 173, 174, 175, 176, 180, 181, 182, 183, 184, 185, 188, 189, 190, 191, 191:1, 192, 193, 194, 195, 196, 197, 198, 199, 200, 202, 203, 204, 205, 206, 207, 208;

Orange color material: C.I. Pigment Orange 1, 2, 5, 13, 16, 17, 19, 20, 21, 22, 23, 24, 34, 36, 38, 39, 43, 46, 48, 49, 61, 62, 64, 65, 67, 68, 69, 70, 71, 72, 73, 74, 75, 77, 78, 79;

Violet color material: C.I. Pigment Violet 1, 1:1, 2, 2:2, 3, 3:1, 3:3, 5, 5:1, 14, 15, 16, 19, 23, 25, 27, 29, 31, 32, 37, 39, 42, 44, 47, 49, 50;

Brown color material: C.I. Pigment Brown 1, 6, 11, 22, 23, 24, 25, 27, 29, 30, 31, 33, 34, 35, 37, 39, 40, 41, 42, 43, 44, 45; and Black color material: C.I. Pigment Black 1, 31, 32.

Among the foregoing pigments, preferred examples of the red pigment include quinacridone based pigments, xanthene based pigments, perylene based pigments, anthanthrone based pigments, and monozo based pigments; and specific examples thereof include C.I. Pigment Red-5, -7, -12, -112, -81, -122, -123, -146, -147, -168, -173, -202, -206, -207, and -209. Of these, quinacridone based pigments are more preferable.

Among the foregoing pigments, monoazoe based pigments and disazo based pigments are preferable as the yellow pigment because their color development as printed materials is good as compared with other pigments. Above all, C.I. Pigment Yellow-1, -3, -16, -17, -74, -120, -128, -151, and -175 are especially preferable in view of hue thereof; and C.I. Pigment Yellow-74 is especially preferable because it is a non-halogen compound and it scarcely influences the environment and can be made fine, etc.

Among the foregoing pigments, copper phthalocyanine pigments are preferable as the blue pigment because their color development as printed materials is good as compared with other pigments. Above all, C.I. Pigment Blue-15:3 is preferable in view of hue thereof.

Furthermore, a variety of carbon blacks such as acetylene black, channel black, and furnace black can be used as the carbon black which is used in the invention. Above all, channel black or furnace black is preferable; and furnace black is especially preferable.

A DBP oil absorption of the foregoing carbon black is preferably 40 mL/100 g or more, more preferably 50 mL/100 g or more, and especially preferably 60 mL/100 g or more from the viewpoint of optical density. A volatile matter content is preferably not more than 8% by weight, and especially preferably not more than 4% by weight. From the viewpoint of storage stability of the recording liquid, a pH is preferably 3 or more, and especially preferably 6 or more; and its upper limit is not more than 11, and especially preferably not more than 9.

A BET specific surface area is usually 100 $m^2/g$ or more, and preferably 150 $m^2/g$ or more; and its upper limit is preferably not more than 700 $m^2/g$, and especially preferably not more than 600 $m^2/g$. Here, the DBP oil absorption is a value as measured according to the A method of JIS K6221; the volatile matter content is a value as measured according to the method of JIS K6221; and the primary particle size is an arithmetic average (number average) size by an electron microscope.

As specific examples of the foregoing carbon black, the following trade names (1) to (4) are enumerated.

(1) #2700B, #2650, #2650B, #2600, #2600B, 2450B, 2400B, #2350, #2300, #2300B, #2200B, #1000, #100GB, #990, #990B, #980, #980B, #970, #960, #960B, #950, #950B, #900, #900B, #850, #850B, MCF88, MCF88B, MA600, MA600B, #750B, #650B, #52, #52B, #50, #47, #47B, #45, #45B, #45L, #44, #44B, #40, #40B, #33, #33B, #32, #32B, #30, #30B, #25, #25B, #20, #20B, #10, #10B, #5, #5B, CF9, CF9B, #95, #260, MA77, MA77B, MA7, MA7B, MA8, MA8B, MA11, MA11B, MA100, MA100B, MA100R, MA100RB, MA100S, MA230, MA220, MA200RB, MA14, #3030B, #3040B, #3050B, #3230B, and #3350B (all of which are a product of Mitsubishi Chemical Corporation).

(2) Monarch 1400, Black Pearls 1400, Monarch 1300, Black Pearls 1300, Monarch 1100, Black Pearls 1100, Monarch 1000, Black Pearls 1000, Monarch 900, Black Pearls 900, Monarch 880, Black Pearls 880, Monarch 800, Black Pearls 800, Monarch 700, Black Pearls 700, Black Pearls 2000, Vulcan XC72R, Vulcan XC72, Vulcan PA90, Vulcan 9A32, Mogul L, Black Pearls L, Regal 660R, Regal 660, Black Pearls 570, Black Pearls 520, Regal 400R, Regal 400, Regal 330R, Regal 330, Regal 300R, Black Pearls 490, Black Pearls 480, Black Pearls 470, Black Pearls 460, Black Pearls 450, Black Pearls 430, Black Pearls 420, Black Pearls 410, Regal 350R, Regal 350, Regal 250R, Regal 250, Regal 99R, Regal 99I, Elftex Pellets 115, Elftex 8, Elftex 5, Elftex 12, Monarch 280, Black Pearls 280, Black Pearls 170, Black Pearls 160, Black Pearls 130, Monarch 120, and Black Pearls 120 (all of which are a product of Cabot Corporation).

(3) Color Black FW1, Color Black FW2, Color Black FW2V, Color Black FW18, Color Black FW200, Special Black 4, Special Black 4A, Special Black 5, Special Black 6, Color Black S160, Color Black S170, Printex U, Printex V, Printex 150T, Printex 140U, Printex 140V, Printex 95, Printex 90, Printex 85, Printex 80, Printex 75, Printex 55, Printex 45, Printex 40, Printex P, Printex 60, Printex XE, Printex L6, Printex L, Printex 300, Printex 30, Printex 3, Printex 35, Printex 25, Printex 200, Printex A, Printex G, Special Black 550, Special Black 350, Special Black 250, and Special Black 100 (all of which are a product of Degussa).

(4) Raven 7000, Raven 5750, Raven 5250, Raven 5000 ULTRA, Raven 3500, Raven 2000, Raven 1500, Raven 1255, Raven 1250, Raven 1200, Raven 1170, Raven 1060 ULTRA, Raven 1040, Raven 1035, Raven 1020, Raven 1000, Raven 890H, Raven890, Raven 850, Raven 790 ULTRA, Raven 760 ULTRA, Raven 520, Raven 500, Raven 450, Raven 430, Raven 420, Raven 410, CONDUCTEX 975 ULTRA, CONDUCTEX SC ULTRA, Raven H2O, and Raven C ULTRA (all of which a product of Colombian Carbon Co.).

Though the size of the primary particle of such a pigment may be arbitrarily set up depending upon the intended purpose, it is usually 10 nm or more and not more than 800 nm, preferably not more than 500 nm, more preferably not more than 300 nm, further preferably not more than 200 nm, and especially preferably not more than 100 nm.

A mean particle size of the foregoing pigment is usually not more than 500 nm, and preferably not more than 200 nm. Furthermore, its lower limit is usually 20 nm or more. As a method for measuring the foregoing mean particle size, a measurement using an electron microscope such as SEM and TEM may be employed.

It is preferable that the foregoing pigment is one which is not chemical modified and which does not contain impurities other than the pigment, such as a crystallization preventing agent for promoting the pigment to become fine. However, for the purpose of imparting self-dispersibility to the pigment, it is also possible to use a pigment which has been subjected to known chemical modification in advance, or a pigment having self-dispersibility as prepared by dispersing a pigment and a dye having specific physical adsorptivity against the pigment in an aqueous medium to physically adsorb the subject dye on the surface of the pigment. Of these pigments having self-dispersibility, the latter is especially preferable because a color region of the recording liquid can be widened.

As the dye which is physically adsorbed on the pigment, the dye preferably contains one having a dye adsorption, as represented by the following expression (I), of 0.02 g/g or more, preferably 0.03 g/g or more, and more preferably 0.04 g/g or more.

[Dye adsorption (g/g)]={[Dye adsorption rate of dispersion]×[Total amount of dyes in dispersion (0.4 g)]}/[Amount of pigment in dispersion (4.1 g)]  (I)

(Here, the dye adsorption rate is a value as determined from a ratio of peak areas as obtained by measuring dye concentrations by high performance liquid chromatography with respect to a supernatant resulting from removal of solids from a dispersion as prepared in the absence of a surfactant by using the foregoing pigment (4.1 g) and the foregoing dye (0.4 g) and an aqueous solution of the foregoing dye (0.4 g).)

What the dye is reversibly adsorbed on the pigment without being accompanied by a chemical reaction can be, for example, confirmed in the following way. That is, a large excess (for example, approximately 9 times by weight) of dimethylformamide (DMF) is added to the prepared recording liquid and thoroughly mixed by an ultrasonic dispersing treatment, etc., and an amount of the dye in a filtrate resulting from removal of the pigment from the mixture by filtering, etc. is measured. An amount of the dye which is not adsorbed on the pigment in the recording liquid at the time of preparation is confirmed in advance, and an increase of the dye to be contained in the recording liquid after the treatment therefor is confirmed, whereby it can be confirmed that the dye is reversibly adsorbed on the pigment.

Furthermore, the "dye adsorption rate" in the expression (I) is a value as determined in the following method.

Dye Adsorption Rate:

Water is added to the pigment in an amount of 4.1 g in terms of solids and the dye in an amount of 0.4 g in terms of solids at 23° C., to make the total amount to 50 g; the mixture is subjected to a dispersing treatment together with 75 g of 0.5-mm$\phi$ zirconia beads in a paint shaker for 6 hours to obtain a dispersion; and this dispersion is subjected to a centrifugal treatment at 23° C. and a centrifugal force of 17968×g (g: gravitational acceleration) for 3 hours to obtain a supernatant.

A 0.87 wt % dye aqueous solution [namely, a dye aqueous solution having a concentration (0.4/45.9×100=0.87 wt %) of the dye (0.4 g) against water (45.5 g) and the dye (0.4 g)] which is corresponding to the case where the pigment is entirely centrifugally precipitated and the dye is not adsorbed on the pigment at all is obtained.

The foregoing supernatant and the foregoing 0.87 wt % dye aqueous solution are each measured by high performance liquid chromatography, and the dye adsorption rate is determined according to the following expression (II) on a basis of the resulting peak area of HPLC derived from the subject dye.

(Dye adsorption rate)=[1−(Peak area of HPLC of supernatant)/(Peak area of HPLC of 0.87 wt % dye aqueous solution)]  (II)

HPLC Measurement Condition:

Detection wavelength: 254 nm

Column temperature: 40° C.

Eluent: Acetonitrile water (the concentration of which is adjusted such that a main peak is detected within 60 minutes after initiating the measurement)

Buffer: 1.0% by weight aqueous solution of tetrabutylammonium bromide and 0.25% by weight aqueous solution of sodium dihydrogenphosphate Flow rate: 1.0 mL/min Pouring amount: 2.0 µL (without dilution)

In the measurement, so far as a water-soluble dye can be detected, a column is not particularly limited, but a column whose separation mode is a reversed phase, which is generally used, is suitable. Furthermore, a chromatopack is not particularly limited so far as data processing from an HPLC detector can be achieved.

Furthermore, as the recording liquid of the invention, a combination of two or more kinds of pigments and/or two or more kinds of dyes may be used. In the case where the recording liquid is of a mixed dye system, a dye of the dispersion is a dye mixture adaptive with a mixing ratio of the dyes in the recording liquid. Similarly, in the case where the recording liquid is of a mixed pigment system, a red pigment of the dispersion is a pigment mixture. In the case where the recording liquid is made of a mixed dye and a mixed pigment, a dye and a pigment in the dispersion are a dye mixture and a pigment mixture adaptive with a mixing ratio in the recording liquid, respectively. In the case of a recording liquid of a mixed dye system, a dye of the 0.87 wt % dye aqueous solution in the expression (II) is a dye mixture adaptive with a mixing ratio of the dyes in the recording liquid.

It is preferable that the dye adsorption on the pigment is high as far as possible. However, there is theoretically an upper limit with respect to the dye adsorption, and when the amount of the dye is increased while making the pigment concentration constant, the dye adsorption becomes constant from a certain addition amount (this adsorption will be hereinafter referred to as "saturation adsorption"). Accordingly, an upper limit of the dye adsorption is defined by such a saturation adsorption.

The saturation adsorption is determined by the kinds of the pigment and the dye to be used and cannot be unequivocally defined. However, it is from approximately 0.01 to 0.1 g/g.

Examples of such a dye include ones having a skeleton structure analogous to the pigment, namely ones derived from a ring structure for bearing plane properties in the chemical structures of the dye molecule and the pigment molecule, and ones derived from stack between $\pi$-electrons in the dye molecule and the pigment molecule or an electrical attraction of functional groups.

Specifically, in the case of using a quinacridone pigment as the pigment, a xanthene based dye, an anthraquinone based dye, and the like are preferable in view of a combination of analogous skeleton structures of an aromatic fused polycyclic system suitable for physical adsorption; in the case of using a monoazo based pigment and a disazo based pigment as the pigment, a monoazo based dye and a disazo based dye are preferable in view of a combination of analogous skeleton structures suitable for physical adsorption; in the case of using a copper phthalocyanine based pigment as the pigment, a copper phthalocyanine based dye is preferable in view of a combination analogous skeleton structures of an aromatic fused polycyclic system suitable for physical adsorption; and in the case of using carbon black as the pigment, a monoazo based dye, a disazo based dye, a copper phthalocyanine based dye, and the like are preferable in view of a combination of skeleton structures suitable for physical adsorption.

Furthermore, in one molecule of a dye, the number of dissociative groups such as a hydroxyl group, an amino group, a carboxyl group, and a sulfonic group is preferably one or more and not more than four. Ones having a dissociative group represented by at least one of —COOH and —SO$_3$H as the form of a free acid are more preferable, and the number thereof is especially preferably one or more and not more than two per molecule of the dye.

When the dye molecule does not have a dissociative group, a dispersing effect in the aqueous medium due to adsorption of the dye on the pigment is hardly obtained. On the other hand, when the number of dissociative groups represented by —COOH or —SO$_3$H is three or more, since the dye is likely dissolved in the medium of the recording liquid rather than adsorption on the pigment, a dispersing effect due to adsorption of the dye on the pigment is hardly obtained. In addition, since the liquid properties of an inkjet recording liquid are usually neutral to alkaline, it is suitable that the inkjet recording liquid has an anionic group to such extent that it is dissociated in an alkaline aqueous medium to secure affinity with water.

In addition, though a mixture of a pigment having the foregoing dye physically adsorbed thereon and a pigment having self dispersing performance due to surface treatment, etc. may be used as the foregoing pigment, a proportion of the latter is not more than 30% by weight, preferably not more than 20% by weight, more preferably not more than 10% by weight, further preferably not more than 5% by weight, and especially preferably not more than 1% by weight based the whole amount of the pigments.

<Re: Pigment dispersion Aqueous Liquid and Recording Liquid>

The pigment dispersion aqueous liquid contains at least the foregoing pigment and the foregoing polyvinyl alcohol based block copolymer as a polymer dispersant in an aqueous medium.

Examples of the aqueous medium include water and/or a water-soluble organic solvent. The water-soluble organic solvent is not particularly limited so far as it is generally used for this application. Specifically, ones having a vapor pressure lower than water are useful. Examples thereof include polyhydric alcohols such as ethylene glycol, propylene glycol, butanediol, pentanediol, 2-butene-1,4-diol, 2-methyl-2,4-pentanediol, 1,2,6-hexanetriol, diethylene glycol, triethylene glycol, polyethylene glycol, glycerin, and dipropylene glycol; ketones such as acetonylacetone; esters such as γ-butyrolactone, diacetin, and triethyl phosphate; lower alkoxy alcohols such as 2-methoxyethanol and 2-ethoxyethanol; furfuryl alcohol, tetrahydrofurfuryl alcohol, N-methylpyrrolidone, N-ethylpyrrolidone, 1,3-dimethyl imidazolidinone, thiodiethanol, thiodiglycol, dimethyl sulfoxide, ethylene glycol monoallyl ether, ethylene glycol monoethyl ether, ethylene glycol monobutyl ether, diethylene glycol monomethyl ether, triethylene glycol monobutyl ether, 2-pyrrolidone, sulforane, imidazole, methyl imidazole, hydroxyimidazole, triazole, nicotinamide, dimethylaminopyridine, ε-caprolactam, lactic acid amide, 1,3-propanesultone, methyl carbamate, ethyl carbamate, 1-methylol-5,5-dimethylhydantoin, hydroxyethylpiperazine, piperazine, ethylene urea, propylene urea, urea, thiourea, biuret, semicarbazide, ethylene carbonate, propylene carbonate, acetamide, formamide, dimethylformamide, N-methylformamide, dimethylacetamide, and trimethylolpropane. As the foregoing aqueous medium, water or a mixture of water and a water-soluble organic solvent is preferable.

As described previously, with respect to the pigment which is used in the pigment aqueous liquid of the invention, arbitrary pigments such as untreated pigments, pigments in which the surface thereof is chemically modified, and pigments in which a dye is adsorbed on the surface thereof to impart self dispersibility thereto can be used.

A concentration of the pigment in the pigment dispersion aqueous liquid of the invention is usually not more than 30% by weight, and preferably not more than 20% by weight. Here, when the concentration of the pigment is too thin, a problem is generated such that it takes a long time to do concentration at the time of inking. Accordingly, the concentration of the pigment is usually 0.1% by weight or more, preferably 0.5% by weight or more, and more preferably 1% by weight or more.

Furthermore, a concentration of the foregoing polyvinyl alcohol based block copolymer in the pigment dispersion aqueous liquid of the invention is usually 0.05% by weight or more, preferably 0.25% by weight or more, and more preferably 0.5% by weight or more. When the concentration of the polyvinyl alcohol based block copolymer falls within this range, an effect for enhancing rub fastness is sufficient. On the other hand, the upper limit of the content of the subject polymer is usually not more than 20% by weight, preferably not more than 10% by weight, and more preferably not more than 5% by weight.

Furthermore, though a weight ratio of the pigment and the polyvinyl alcohol based block copolymer may be properly chosen and determined, the amount of the polyvinyl alcohol based block copolymer is generally 0.01 parts by weight or more, preferably 0.05 parts by weight, and especially preferably 0.1 parts by weight or more based on part by weight of the pigment; and its upper limit is not more than 2 parts by weight, and especially preferably not more than 1.5 parts by weight.

With respect to the recording liquid of the invention, a concentration of a coloring agent of the foregoing pigment dispersion aqueous liquid is adjusted as the need arises, and in addition, a variety of additives may be added depending upon the intended application.

As the coloring agent, in addition to the coloring agent in the foregoing pigment dispersion, a pigment or a dye may be additionally contained for the purposes of toning, etc.

A concentration of the whole of coloring agents in the recording liquid of the invention is 0.1% by weight or more, and especially preferably 0.5% by weight or more based on the whole amount of the recording liquid; and its upper limit is not more than 15% by weight, preferably not more than 10% by weight, and especially preferably not more than 8% by weight. On the other hand, the amount of the coloring agent to be additionally contained in the pigment dispersion aqueous liquid is usually not more than 100 parts by weight, preferably not more than 75 parts by weight, more preferably not more than 50 parts by weight, and especially preferably not more than 25 parts by weight based on 100 parts by weight of the coloring agent in the pigment dispersion aqueous liquid.

Though a concentration of the water-soluble organic solvent in the recording liquid of the invention may be properly chosen and determined, it is usually 1% by weight or more and not more than 45% by weight, and especially preferably not more than 40% by weight based on the recording liquid. Furthermore, with respect to the content of water in the recording liquid, concentrations of the foregoing coloring agent and water-soluble organic solvent and arbitrary addition components as described below may be properly set up.

<Re: Additives>

In the recording liquid of the invention, a variety of additives may be added as the need arises within the range where the effects of the invention are not hindered. Specifically, for example, there are enumerated ones which are known as additives for recording liquid, such as a penetration accelerator, a surface tension modifier, a hydrotropic agent, a pH adjuster, a chelating agent, an antiseptic, a viscosity adjuster, a humectant, a fungicide, and a rust preventive.

The content of these additives in the recording liquid of the invention is usually not more than 10% by weight, and especially preferably not more than 5% by weight based on the whole amount of the recording liquid.

Examples of the penetration accelerator include lower alcohols such as ethanol, isopropanol, butanol, and pentanol; carbitols such as ethylene glycol monobutyl ether and triethylene glycol monobutyl ether; and surfactants.

As the surfactant, arbitrary surfactants such as non-ionic surfactants, anionic surfactants, cationic surfactants, amphoteric surfactants, and polymer based surfactants can be used. Above all, nonionic surfactants, anionic surfactants, and polymer based surfactants are preferable.

Examples of the nonionic surfactant include polyoxyethylene alkyl ethers, polyoxyethylene alkylaryl ethers, polyoxyethylene derivatives, oxyethylene/oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, and polyoxyethylene alkylamines.

Examples of the anionic surfactant include fatty acid salts, alkylsulfuric acid ester salts, alkylbenzenesulfonic acid salts, alkylnaphthalenesulfonic acid salts, alkylsulfosuccinic acid salts, alkyldiphenyl ether sulfonic acid salts, alkylphosphoric acid salts, polyoxyethylene alkylsulfuric acid ester salts, polyoxyethylene alkylarylsulfuric acid ester salts, alkanesulfonic acid salts, naphthalenesulfonic acid-formalin condensates, polyoxyethylene alkylphospric acid esters, and α-olefin sulfonic acid salts.

Furthermore, examples of the polymer based surfactant include polyacrylic acid, styrene/acrylic acid copolymers, styrene/acrylic acid/acrylic ester copolymers, styrene/maleic acid copolymers, styrene/maleic acid/acrylic ester copolymers, styrene/methacrylic acid copolymers, styrene/methacrylic acid/acrylic ester copolymers, styrene/maleic acid half ester copolymers, streyne/styrenesulfonic acid copolymers, vinylnaphthalene/maleic acid copolymers, vinylnaphthalene/acrylic acid copolymers, and salts thereof.

Though the cationic surfactant is not particularly limited, examples thereof include tetraalkylammonium salts, alkylamine salts, benzalconium salts, alkylpyridinium salts, and imidazolium salts.

Besides, surfactants such as silicone based surfactants, for example, polysiloxane oxyethylene adducts; fluorine based surfactants, for example, perfluoroalkylcarboxylic acid salts, perfluoroalkylsulfonic acid salts, and oxyethylene perfluoroalkyl ethers; and biosurfactants, for example, rhamonolipid and lysolecithin can also be used.

The content of such a surfactant may be properly chosen and determined. Usually, by adding the surfactant in an amount in the range of 0.001% by weight or more and not more than 5% by weight based on the recording liquid, it is possible to further improve rapid dryness and printing quality of a printed matter.

Examples of the surface tension modifier include alcohols such as diethanolamine, triethanolamine, glycerin, and diethylene glycol; and nonionic, cationic, anionic or amphoteric surfactants.

As the hydrotropic agent, urea, alkylureas, ethylene urea, propylene urea, thiourea, guanidine urea, and tetra-alkylammonium halides are preferable.

As the humectant, glycerin, diethylene glycol, etc. can also be added as one which also functions as a water-soluble organic solvent. In addition, sugars such as maltitol, sorbitol, gluconolactone, and maltose can be added.

For the purposes of adjusting the pH of the recording liquid and stabilizing the recording liquid or obtaining stability against a conduit of the recording liquid in a recording device, a pH modifier such as sodium hydroxide, nitric acid, and ammonia, or a buffer such as phosphoric acid can also be used, although these materials are not particularly limited. A pH of the recording liquid is usually in the neutral to alkaline range. The recording liquid is preferably adjusted at a pH of from about 6 to 11.

Though the chelating agent is not particularly limited, a sodium salt of ethylenediaminetetraacetic acid, a diammonium salt of ethylenediaminetetraacetic acid, and the like are useful. Such a material is preferably used in an amount in the range of 0.005% by weight or more and not more than 0.5% by weight based on the recording liquid.

Though the fungicide is not particularly limited, sodium dehydroacetate, sodium benzoate, and the like are useful. Such a material is preferably contained in an amount in the range of 0.05% by weight or more and not more than 1% by weight based on the recording liquid.

In particular, the recording liquid of the invention brings an excellent effect as an inkjet recording liquid. The recording liquid of the invention is most characterized by using the foregoing polyvinyl alcohol based block copolymer as a polymer dispersant. In comparison with usual polymer dispersants which are a water-soluble resin and which have hitherto been added for the purposes of fixing properties to paper and water fastness of an ink coating film, in using the polyvinyl alcohol based block copolymer of the invention, even when its concentration is low, it is possible to provide a printed matter which is excellent in dispersion stability of the pigment and excellent in rub fastness.

Furthermore, in the recording liquid of the invention, a water-soluble or water-dispersible resin other than the foregoing polyvinyl alcohol based block copolymer may be contained within the range where the effects of the invention are not hindered. Specific examples thereof include water-soluble vinyl based resins such as acrylic resins, styrene-acrylic resins, polyvinyl alcohol based resins other than those of the invention, and vinyl acetate based resins; and known water-soluble or water-dispersible resins such as polyester resins, polyamide resins, polyurethane resins, epoxy resins, butadiene based resins, petroleum based resins, and fluorine based resins. Above all, acrylic resins or styrene-acrylic resins are preferable. A copolymer containing such a hydrophobic segment and a hydrophilic segment other than the polyvinyl alcohol based block is preferable; and this copolymer is especially preferably a random copolymer.

In the recording liquid of the invention, the content of all of the water-soluble or water-dispersible resins including the foregoing polyvinyl alcohol based block copolymer and other water-soluble or water-dispersible resin is usually 0.05% by weight or more, preferably 0.25% by weight or more, and more preferably 0.5% by weight or more; and its upper limit is not more than 20% by weight, preferably not more than 10% by weight, and especially preferably not more than 5% by weight. Furthermore, an amount of the known water-soluble or water-dispersible resin to be used may be properly chosen and determined within the range where its weight ratio to the foregoing polyvinyl alcohol based block copolymer is in the range of from 99:1 to 1:99. Specifically, the amount of other water-soluble or water-dispersible resin is not more than 30 parts by weight, preferably not more than 20 parts by weight, and especially preferably not more than 10 parts by weight based on part by weight of the polyvinyl alcohol based block copolymer.

The pigment dispersion aqueous liquid of the invention contains the foregoing polyvinyl alcohol based block copolymer as a polymer dispersant. Furthermore, in the production process of the pigment dispersion aqueous liquid, a mixing method and an addition order of the pigment, the aqueous medium, and the polymer dispersant, etc. are arbitrary. For example, there is enumerated a method in which after bringing an untreated pigment or a treated pigment, such as pigments in which the surface thereof is chemically modified as described previously, pigments which are treated with a known dispersant such as surfactant, and pigments on which a dye is adsorbed, into contact with a polymer dispersant, the resulting pigment is brought into contact with an aqueous medium, mixed and dispersed. Furthermore, after dispersing the foregoing treated pigment in an aqueous medium, the dispersion may be brought into contact with a polymer dispersant to form a pigment dispersion aqueous liquid.

Above all, a method in which after bringing an untreated pigment into contact with a polymer dispersant, the resulting pigment is brought into contact with an aqueous medium, mixed and treated is preferable because the effects of the invention become remarkable.

EXAMPLES

The invention will be hereunder described in detail with reference to the Examples, but it should not be construed that the invention is limited to the following Examples so far as it does not exceed the gist thereof. In the following Examples, a number average molecular weight (Mn) was measured by means of gel permeation chromatography (GPC) as calibrated by a polystyrene standard sample. Incidentally, in the following expressions, "b" means a block, and "co" means "co" of a copolymer.

Example 1

Synthesis of PVA-b-poly(methyl acrylate-co-t-butyl acrylate-co-sodium acrylate)

A flask equipped with a condenser, a nitrogen introducing tube, a stirrer, and a thermometer, the inside of which had been purged with nitrogen, was charged with 187 g of vinyl acetate, 375 g of chloroform as a chain transfer agent and a solvent, and 0.5 g of azobisisobutyronitrile as a catalyst, and after bubbling with nitrogen for about 15 minutes, the mixture was heated and subjected to a polymerization reaction under a reflux condition for 150 minutes. After completion of the reaction, the reaction mixture was brought into contact with hexane, and a polymer as obtained by precipitation in hexane was dried in vacuo to obtain polyvinyl acetate. The polyvinyl acetate had a number average molecular weight of 2,914 and a molecular weight distribution of 1.83.

A terminal structure of this polyvinyl acetate was —$CCl_3$. From the matter that a peak of a methylene group (a peak having a chemical shift $\delta$ of from 2.8 to 3.2) adjacent to the terminal of this polyvinyl acetate was seen in 1H-NMR (solvent: $CDCl_3$) and the matter that a number average molecular weight (3,000) as calculated while taking the terminal structure as —$CCl_3$ was substantially coincident with a number average molecular weight as determined from GPC, it was confirmed that polyvinyl acetate having a quantitatively halogen-substituted group (—$CCl_3$) in one terminal thereof could be synthesized.

Next, a flask equipped with a condenser, a nitrogen introducing tube, a stirrer, and a thermometer, the inside of which had been purged with nitrogen, was charged with 0.1057 g of cuprous chloride as a catalyst. Furthermore, a mixed solution of 13.7 g of isopropyl alcohol as a solvent, 68.85 g of t-butyl acrylate as a monomer, 0.2713 g of tris-(2-dimethylamino)ethylamine as a ligand, and 29.9 g of the foregoing polyvinyl acetate (1) as a macro initiator was bubbled with nitrogen for 15 minutes and then charged in the foregoing flask. The mixture was heated and subjected to a polymerization reaction under a reflux condition for 30 minutes.

After completion of the reaction, methanol/water (500 mL/100 mL) was added to the reaction mixture to precipitate the resulting polymer. The precipitated polymer was recovered, dissolved in 300 mL of THF, and passed through a column filled with 100 g of active alumina to remove a residual copper component. Thereafter, the THF was removed by an evaporator, and the residue was dried in vacuo to obtain polyvinyl acetate-b-poly-t-butyl acrylate having a number average molecular weight of 7,081 and a molecular weight distribution (Mw/Mn) of 1.28. In this polyvinyl acetate based block copolymer, a connecting group to connect the polyvinyl acetate block to the other block is a dichloromethylene group.

Next, in a flask equipped with a condenser, a stirrer, and a thermometer, 63 g of the foregoing polyvinyl acetate-b-poly-t-butyl acrylate was dissolved in 600 mL of methanol, to which was then added 2.0 g of p-toluenesulfonic acid monohydrate, and the mixture was heated and allowed to react under reflux for 12 hours. Thereafter, the methanol was removed by an evaporator. And, after adding 200 mL of water, the mixture was neutralized with a sodium hydroxide aqueous solution, and a polymer was precipitated in acetone. The resulting polymer was dried in vacuo to obtain PVA-b-poly(sodium acrylate-co-t-butyl acrylate-methyl acrylate). In this PVA based block copolymer, a connecting group to connect the PVA based block to the other block is the foregoing connecting group (dichloromethylene group) in which a part or all of the chlorine atoms are substituted with a hydrogen atom.

A structure of this PVA based block copolymer was confirmed by $^{13}$C-NMR using heavy water as a solvent. A degree of saponification of PVA as determined by $^{13}$C-NMR was 99%, and a composition ratio of a vinyl alcohol unit to a sodium acrylate unit to a t-butyl acrylate unit to a methyl acrylate unit in the block copolymer was 40.7:32.1:13.6:13.7 (molar ratio). The resulting block copolymer was allowed to stand in a hot air dryer at 180° C. for 30 minutes. As a result, coloration and odor were not observed so that it was noted that the block copolymer was excellent in heat resistance.

Comparative Example 1

Synthesis of PVA-b-poly(benzyl methacrylate)

First of all, a flask equipped with a condenser, a nitrogen introducing tube, a stirrer, and a thermometer, the inside of which had been purged with nitrogen, was charged with 240 g of vinyl acetate as a monomer, 58 g of methanol as a solvent, and 0.093 g of thiolacetic acid. After heating until the internal temperature had reached 60° C., 2 g of methanol having 0.0868 g of azobisisobutyronitrile as a catalyst dissolved therein was added, and thereafter, 6 g of methanol having 1.74 g of thiolacetic acid dissolved therein was added dropwise over 3 hours.

After completion of the reaction, the methanol and unreacted vinyl acetate were distilled off, and methanol was again added to obtain a methanol solution of polyvinyl acetate (concentration: 50%). The resulting polyvinyl acetate had a number average molecular weight of 6,490 and a molecular weight distribution of 2.1.

Next, a methanol solution of NaOH was added to the foregoing methanol solution of polyvinyl acetate at a molar ratio of NaOH/vinyl acetate of 0.05%, and the mixture was subjected to a saponification reaction at 40° C. to obtain polyvinyl alcohol (1). A degree of saponification as measured by $^1$H-NMR was 99%.

Next, in a flask equipped with a condenser, a nitrogen introducing tube, a stirrer, and a thermometer, the inside of which had been purged with nitrogen, 1 g of the foregoing polyvinyl alcohol (1) was added to and dissolved in 11 g of distilled water at 95° C., and the solution was cooled to room temperature under nitrogen. After adjusting the solution at a pH of 3, 1 g of benzyl methacrylate was added to and dissolved in the solution. And, after bubbling with nitrogen for 15 minutes, the solution was heated to 60° C. Next, 0.02 g of potassium persulfate was added to achieve a polymerization reaction for 3 hours. After completion of the reaction, water was removed in vacuo from the polymerization solution which was obtained as an emulsion, to obtain PVA-b-poly(benzyl methacrylate). The resulting polymer was allowed to stand in a hot air dryer at 180° C. for 30 minutes. As a result, the polymer was colored brown and caused an odor so that it was noted that the polymer was inferior in heat resistance.

Example 2

Synthesis of PVA-b-poly(sodium acrylate-co-t-butyl acrylate-co-methyl acrylate-co-styrene)

A flask equipped with a condenser, a nitrogen introducing tube, a stirrer, and a thermometer, the inside of which had been purged with nitrogen, was charged with 445 g of vinyl acetate, 320 g of chloroform as a chain transfer agent and a solvent, and 0.51 g of azobisisobutyronitrile as a catalyst, and after bubbling with nitrogen for about 15 minutes, the mixture was heated and subjected to a polymerization reaction under a reflux condition for 150 minutes. After completion of the reaction, the reaction mixture was brought into contact with hexane, and a polymer as obtained by precipitation in hexane was dried in vacuo to obtain polyvinyl acetate. The polyvinyl acetate had a number average molecular weight of 5,100 and a molecular weight distribution of 1.96.

A terminal structure of the foregoing polyvinyl acetate was —CCl$_3$. From the matter that a peak of a methylene group (a peak having a chemical shift δ of from 2.8 to 3.2) adjacent to the terminal of this polyvinyl acetate was seen in 1H-NMR (solvent: CDCl$_3$) and the matter that a number average molecular weight (5,000) as calculated while taking the terminal structure as —CCl$_3$ was substantially coincident with a number average molecular weight as determined from GPC, it was confirmed that polyvinyl acetate having a quantitatively halogen-substituted group (—CCl$_3$) in one terminal thereof could be synthesized.

Next, a flask equipped with a condenser, a nitrogen introducing tube, a stirrer, and a thermometer, the inside of which had been purged with nitrogen, was charged with 1.02 g of cuprous chloride as a catalyst. Furthermore, a mixed solution of 75 g of isopropyl alcohol as a solvent, 721 g of t-butyl acrylate and 58 g of styrene as monomers, 9.6051 g of tris(2-dimethylamino)ethylamine as a ligand, and 110.4 g of the foregoing polyvinyl acetate as obtained by the foregoing method as a macro initiator was bubbled with nitrogen for 15 minutes and then charged in the foregoing flask. The mixture was heated and subjected to a polymerization reaction under a reflux condition for 365 minutes.

After completion of the reaction, methanol/water (1,000 mL/300 mL) was added to the polymerization reaction liquid to precipitate the polymer. The precipitated polymer was recovered and suspended in 1,000 mL of methanol, to which was then added 300 mL of water to precipitate the polymer. Thereafter, the resulting polymer was dried in vacuo to obtain polyvinyl acetate-b-poly(t-butyl acrylate-co-styrene). The polyvinyl acetate-b-poly(t-butyl acrylate-co-styrene) had a number average molecular weight of 19,000 and a molecular weight distribution of 1.28. In this polyvinyl acetate based block copolymer, a connecting group to connect the polyvinyl acetate block to the other block is a dichloromethylene group.

Next, in a flask equipped with a condenser, a stirrer, and a thermometer, 360 g of the foregoing polyvinyl acetate-b-poly(t-butyl acrylate-co-styrene) was dissolved in 3,600 mL of methanol, to which was then added 12.0 g of p-toluenesulfonic acid monohydrate, and the mixture was heated and allowed to react under a reflux condition for 12 hours. Thereafter, the methanol was removed by an evaporator. And, after adding 1,000 mL of water, the mixture was neutralized with a sodium hydroxide aqueous solution, and a polymer was precipitated in acetonitrile. The resulting polymer was dried in vacuo to obtain polyvinyl alcohol-b-poly(sodium acrylate-co-t-butyl acrylate-co-methyl acrylate-co-styrene). In this PVA based block copolymer, a connecting group to connect the PVA based block to the other block is the foregoing connecting group (dichloromethylene group) in which a part or all of the chlorine atoms are substituted with a hydrogen atom.

A structure of the foregoing block copolymer was confirmed by 13C-NMR using heavy water as a solvent. A composition ratio, as determined by 13C-NMR, of a vinyl acetate unit to a vinyl alcohol unit to a sodium acrylate unit to a t-butyl acrylate unit to a methyl acrylate unit to a styrene unit in the block copolymer was 1.3:21.4:13.8:46.3:5.3:11.9 (molar ratio).

Example 3

Synthesis of PVA-b-poly(sodium acrylate-co-methyl acrylate-co-sodium methacrylate-co-benzyl methacrylate)

A flask equipped with a condenser, a nitrogen introducing tube, a stirrer, and a thermometer, the inside of which had been purged with nitrogen, was charged with 441 g of vinyl acetate, 464 g of chloroform as a chain transfer agent and a solvent, and 0.5 g of azobisisobutyronitrile as a catalyst, and after bubbling with nitrogen for about 15 minutes, the mixture was heated and subjected to a polymerization reaction under a reflux condition for 150 minutes. After completion of the reaction, the reaction mixture was brought into contact with hexane, and a polymer as obtained by precipitation in hexane was dried in vacuo to obtain polyvinyl acetate. The polyvinyl acetate had a number average molecular weight of 3,800 and a molecular weight distribution of 1.96.

A terminal structure of the foregoing polyvinyl acetate was —CCl$_3$. From the matter that a peak of a methylene group (a peak having a chemical shift δ of from 2.8 to 3.2) adjacent to the terminal of this polyvinyl acetate was seen in 1H-NMR (solvent: CDCl$_3$) and the matter that a number average molecular weight (4,000) as calculated while taking the terminal structure as —CCl$_3$ was substantially coincident with a number average molecular weight as determined from GPC, it was confirmed that polyvinyl acetate having a quantitatively halogen-substituted group (—CCl$_3$) in one terminal thereof could be synthesized.

Next, a flask equipped with a condenser, a nitrogen introducing tube, a stirrer, and a thermometer, the inside of which had been purged with nitrogen, was charged with 0.883 g of cuprous chloride as a catalyst. Furthermore, a mixed solution of 90 g of isopropyl alcohol and 30 g of methanol as solvents, 306 g of benzyl methacrylate and 374.5 g of methyl acrylate as monomers, 9.14 g of tris(2-dimethylamino)-ethylamine as a ligand, and 96 g of the foregoing polyvinyl acetate as a macro initiator was bubbled with nitrogen for 15 minutes and then charged in the foregoing flask. The mixture was heated and allowed to react under a reflux condition for 660 minutes.

After completion of the reaction, methanol/water (4,000 mL/1,000 mL) was added to the polymerization reaction liquid to precipitate the polymer. The precipitated polymer was recovered and suspended in 1,000 mL of methanol, to which was then added 300 mL of water to precipitate the polymer. Thereafter, the resulting polymer was dried in vacuo to obtain polyvinyl acetate-b-poly(methyl acrylate-co-benzyl methacrylate). The polyvinyl acetate-b-poly(methyl acrylate-co-benzyl methacrylate) had a number average molecular weight of 20,000 and a molecular weight distribution of 1.33. In this polyvinyl acetate based block copolymer, a connecting group to connect the polyvinyl acetate block to the other block is a dichloromethylene group.

Next, in a flask equipped with a condenser, a stirrer, and a thermometer, 500 g of the foregoing polyvinyl acetate-b-poly(methyl acrylate-co-benzyl methacrylate) was dissolved in a mixed solvent of 1,000 g of methanol and 1,500 g of tetrahydrofuran, to which was then added 974.7 g of 5N sodium hydroxide, and the mixture was heated and allowed to react under a reflux condition for 7 hours. Thereafter, a supernatant was removed, and the resulting polymer block was suspended by adding 750 g of tetrahydrofuran thereto, to which was then added 500 g of methanol to precipitate the polymer. The resulting polymer was dissolved in 1,000 g of water, neutralized with p-toluenesulfonic acid, and then precipitated in acetonitrile. The resulting polymer was dried in vacuo to obtain polyvinyl alcohol-b-poly(sodium acrylate-co-methyl acrylate-co-sodium methacrylate-co-benzyl methacrylate). In this PVA based block copolymer, a connecting group to connect the PVA based block to the other block is the foregoing connecting group (dichloromethylene group) in which a part or all of the chlorine atoms are substituted with a hydrogen atom.

A structure of the foregoing block copolymer was confirmed by H-NMR using heavy water as a solvent. A composition ratio, as determined by H-NMR, of a vinyl alcohol unit to a sodium acrylate unit to a methyl acrylate unit to a sodium methacrylate unit to a benzyl methacrylate unit in the block copolymer was 14:44:10:11:21 (molar ratio).

Example 4

Synthesis of PVA-b-poly(sodium acrylate-co-n-butyl acrylate-co-styrene)

A flask equipped with a condenser, a nitrogen introducing tube, a stirrer, and a thermometer, the inside of which had been purged with nitrogen, was charged with 440 g of vinyl acetate, 460 g of chloroform as a chain transfer agent and a solvent, and 0.5 g of azobisisobutyronitrile as a catalyst, and after bubbling with nitrogen for about 15 minutes, the mixture was heated and subjected to a polymerization reaction under a reflux condition for 150 minutes. After completion of the reaction, the reaction mixture was brought into contact with hexane, and a polymer as obtained by precipitation in hexane was dried in vacuo to obtain polyvinyl acetate. The polyvinyl acetate had a number average molecular weight of 4,200 and a molecular weight distribution of 2.22.

A terminal structure of the foregoing polyvinyl acetate was —CCl$_3$. From the matter that a peak of a methylene group (a peak having a chemical shift δ of from 2.8 to 3.2)

adjacent to the terminal of this polyvinyl acetate was seen in 1H-NMR (solvent: $CDCl_3$) and the matter that a number average molecular weight (4,500) as calculated while taking the terminal structure as —$CCl_3$ was substantially coincident with a number average molecular weight as determined from GPC, it was confirmed that polyvinyl acetate having a quantitatively halogen-substituted group (—$CCl_3$) in one terminal thereof could be synthesized.

Next, a flask equipped with a condenser, a nitrogen introducing tube, a stirrer, and a thermometer, the inside of which had been purged with nitrogen, was charged with 0.4962 g of cuprous chloride as a catalyst. Furthermore, a mixed solution of 23.9 g of isopropyl alcohol as a solvent, 80.19 g of n-butyl acrylate and 16.78 g of styrene as monomers, 1.276 g of tris(2-dimethylamino)ethylamine as a ligand, and 15 g of the foregoing polyvinyl acetate as a macro initiator was bubbled with nitrogen for 15 minutes and then charged in the foregoing flask. The mixture was heated and subjected to a polymerization reaction under a reflux condition for 22 hours.

After completion of the reaction, methanol/water (500 mL/100 mL) was added to the polymerization reaction liquid to precipitate the polymer. The precipitated polymer was recovered and suspended in 500 mL of methanol, to which was then added 100 mL of water to precipitate the polymer. Thereafter, the resulting polymer was dried in vacuo to obtain polyvinyl acetate-b-poly(n-butyl acrylate-co-styrene). The polyvinyl acetate-b-poly(n-butyl acrylate-co-styrene) had a number average molecular weight of 24,100 and a molecular weight distribution of 1.50. In this polyvinyl acetate based block copolymer, a connecting group to connect the polyvinyl acetate block to the other block is a dichloromethylene group.

Next, in a flask equipped with a condenser, a stirrer, and a thermometer, 59 g of the foregoing polyvinyl acetate-b-poly(n-butyl acrylate-co-styrene) was dissolved in a mixed solvent of 118 g of methanol and 177 g of tetrahydrofuran, to which was then added 115 g of 5N sodium hydroxide, and the mixture was heated and allowed to react under a reflux condition for 7 hours. Thereafter, a supernatant was removed, and the resulting polymer block was suspended by adding 90 g of tetrahydrofuran thereto, to which was then added 60 g of methanol to precipitate the polymer. The resulting polymer was dissolved in 100 g of water, neutralized with p-toluenesulfonic acid, and then precipitated in acetonitrile. The resulting polymer was dried in vacuo to obtain polyvinyl alcohol-b-poly(sodium acrylate-co-n-butyl acrylate-co-styrene). In this PVA based block copolymer, a connecting group to connect the PVA based block to the other block is the foregoing connecting group (dichloromethylene group) in which a part or all of the chlorine atoms are substituted with a hydrogen atom.

A structure of the foregoing block copolymer was confirmed by H-NMR using heavy water as a solvent. A composition ratio, as determined by H-NMR, of a vinyl alcohol unit to a sodium acrylate unit to an n-butyl acrylate unit to a styrene unit in the block copolymer was 20:65:4:11 (molar ratio).

Example 5

Synthesis of polyvinyl alcohol-b-poly(sodium acrylate-co-methyl acrylate-co-sodium methacrylate-co-benzyl methacrylate-co-styrene)

A flask equipped with a condenser, a nitrogen introducing tube, a stirrer, and a thermometer, the inside of which had been purged with nitrogen, was charged with 3,587 g of vinyl acetate, 1,907 g of chloroform as a chain transfer agent and a solvent, and 0.1 g of azobis(2-methylbutyronitrile) as a catalyst, and the mixture was heated and subjected to a polymerization reaction under a reflux condition for 21 hours. After completion of the reaction, the unreacted vinyl acetate and chloroform were distilled off in vacuo at an internal temperature of 40° C. while continuously adding dropwise a 0.01N sodium hydroxide/methanol solution in the reaction solution, to obtain a polyvinyl acetate/methanol solution (polymer concentration: 81%). This polyvinyl acetate had a number average molecular weight of 4,100 and a molecular weight distribution of 2.07.

A terminal structure of the foregoing polyvinyl acetate was —$CCl_3$. From the matter that a peak of a methylene group (a peak having a chemical shift δ of from 2.8 to 3.2) adjacent to the terminal of this polyvinyl acetate was seen in 1H-NMR (solvent: $CDCl_3$) and the matter that a number average molecular weight (4,000) as calculated while taking the terminal structure as —$CCl_3$ was substantially coincident with a number average molecular weight as determined from GPC, it was confirmed that polyvinyl acetate having a quantitatively halogen-substituted group (—$CCl_3$) in one terminal thereof could be synthesized.

Next, a flask equipped with a condenser, a nitrogen introducing tube, a stirrer, and a thermometer, the inside of which had been purged with nitrogen, was charged with 132.5 g of methanol and 1,050 g of isopropyl alcohol as solvents, 2,996 g of methyl acrylate, 2,448 g of benzyl methacrylate and 72.7 g of styrene as monomers, and 1,236 g of the foregoing polyvinyl acetate/methanol solution as a macro initiator, and the temperature was raised from room temperature to 60° C. over one hour. At the point of time when the internal temperature reached 60° C., a catalyst solution having 1.2 g of cuprous bromide as a catalyst and 24.07 9 of tris-(2-dimethylamino)ethylamine as a ligand dissolved in 30 g of methanol was added. After adding the catalyst solution, the mixture was heated and subjected to a polymerization reaction under a reflux condition for 25 hours.

As shown in FIG. 1, a number average molecular weight (Mn) increased with the lapse of polymerization reaction time. Furthermore, molar ratios of the respective monomers of methyl acrylate (MA), benzyl methacrylate (BZMA) and styrene (St) in the polymer as calculated from the consumed amounts of the monomers in the polymerization solution as determined by gas chromatography are shown in Table 1. As is clear from Table 1, it was confirmed that the block copolymer as connected to the polyvinyl acetate is polyvinyl acetate-b-poly(methyl acrylate-co-benzyl methacrylate-co-styrene) in which its composition changes with an increase of the number average molecular weight thereof and the monomer composition in this block polymer changes towards the terminal (it is of a gradient structure). Moreover, its number average molecular was 19,400, and its molecular weight distribution was 1.41. In this polyvinyl acetate based block copolymer, a connecting group to connect the polyvinyl acetate block to the other block is a dichloromethylene group.

TABLE 1

| | Average molar composition ratio | | |
|---|---|---|---|
| Mn | MA | BzMA | St |
| 4,100 to 9,500 | 38.2 | 57.3 | 4.4 |
| 9,500 to 12,500 | 69.9 | 28.9 | 1.2 |
| 12,500 to 16,500 | 75.6 | 23.9 | 0.5 |
| 16,500 to 18,700 | 91.7 | 8.3 | 0.0 |
| 18,700 to 19,400 | 100 | 0 | 0 |

Next, in a reaction vessel equipped with a condenser, a stirrer, and a thermometer, 7,344 g of the foregoing polymerization solution was dissolved in a mixed solvent of 5,251 g of methanol, 10,821 g of tetrahydrofuran, and 2,626 g of water, the temperature was then raised to 60° C., and 11,134 g of 5N sodium hydroxide was added to achieve a reaction at 65° C. for 7 hours. After completion of the reaction, a supernatant was removed, and the resulting polymer block was suspended by the addition of 10,552 g of tetrahydrofuran and 5,279 g of water, to which was then added 75.35 g of glacial acetic acid. 2,630 g of methanol was further added to precipitate the polymer. A supernatant was again removed, and 23,698 g of water was added to the residue. Thereafter, the solution was heated to 90° C., and the residual THF and methanol were distilled off to obtain a polymer aqueous solution. Thereafter, a polymer aqueous solution was thrown into acetonitrile to precipitate the polymer. The resulting polymer was dried in vacuo to obtain polyvinyl alcohol-b-poly(sodium acrylate-co-methyl acrylate-co-sodium methacrylate-co-benzyl methacrylate-co-styrene) in which the copolymer as connected to the PVA based block is a gradient copolymer. In this PVA based block copolymer, a connecting group to connect the PVA based block to the other block is the foregoing connecting group (dichloromethylene group) in which a part or all of the chlorine atoms are substituted with a hydrogen atom.

A structure of the foregoing block copolymer was confirmed by H-NMR using heavy water as a solvent. A composition ratio, as determined by H-NMR, of a vinyl alcohol unit to a sodium acrylate unit to a methyl acrylate unit to a sodium methacrylate unit to a benzyl methacrylate unit to a styrene unit in the block copolymer was 21:36:17:3:18:5 (molar ratio).

Example 6

Synthesis of polyvinyl alcohol-b-poly(sodium acrylate-co-methyl acrylate-co-sodium methacrylate-co-benzyl methacrylate-co-styrene)

A flask equipped with a condenser, a nitrogen introducing tube, a stirrer, and a thermometer, the inside of which had been purged with nitrogen, was charged with 447 g of vinyl acetate, 225 g of chloroform as a chain transfer agent and a solvent, and 0.1 g of 2,2'-azobis(2,4-dimethylvaleronitrile) as a catalyst, and the mixture was heated and subjected to a polymerization reaction under a reflux condition for 3.5 hours. After completion of the reaction, the reaction mixture was brought into contact with hexane, and a polymer as obtained by precipitation in hexane was dried in vacuo to obtain polyvinyl acetate. The polyvinyl acetate had a number average molecular weight of 9,300 and a molecular weight distribution of 2.1.

A terminal structure of the foregoing polyvinyl acetate was —$CCl_3$. From the matter that a peak of a methylene group (a peak having a chemical shift δ of from 2.8 to 3.2) adjacent to the terminal of this polyvinyl acetate was seen in 1H-NMR (solvent: $CDCl_3$) and the matter that a number average molecular weight (9,000) as calculated while taking the terminal structure as —$CCl_3$ was substantially coincident with a number average molecular weight as determined from GPC, it was confirmed that polyvinyl acetate having a quantitatively halogen-substituted group (—$CCl_3$) in one terminal thereof could be synthesized.

Next, a flask equipped with a condenser, a nitrogen introducing tube, a stirrer, and a thermometer, the inside of which had been purged with nitrogen, was charged with 28.3 g of methanol and 88.9 g of isopropyl alcohol as solvents, 150.5 g of methyl acrylate, 122.7 g of benzyl methacrylate and 3.72 g of styrene as monomers, and 100 g of the foregoing polyvinyl acetate as a macro initiator, and the temperature was raised from room temperature to 60° C. over one hour. At the point of time when the internal temperature reached 60° C., a catalyst solution having 0.12 g of cuprous bromide as a catalyst and 2.42 g of tris(2-dimethylamino)ethylamine as a ligand dissolved in 5 g of methanol was added. After adding the catalyst solution, the mixture was heated and subjected to a polymerization reaction under a reflux condition for 33 hours.

Figure 2:
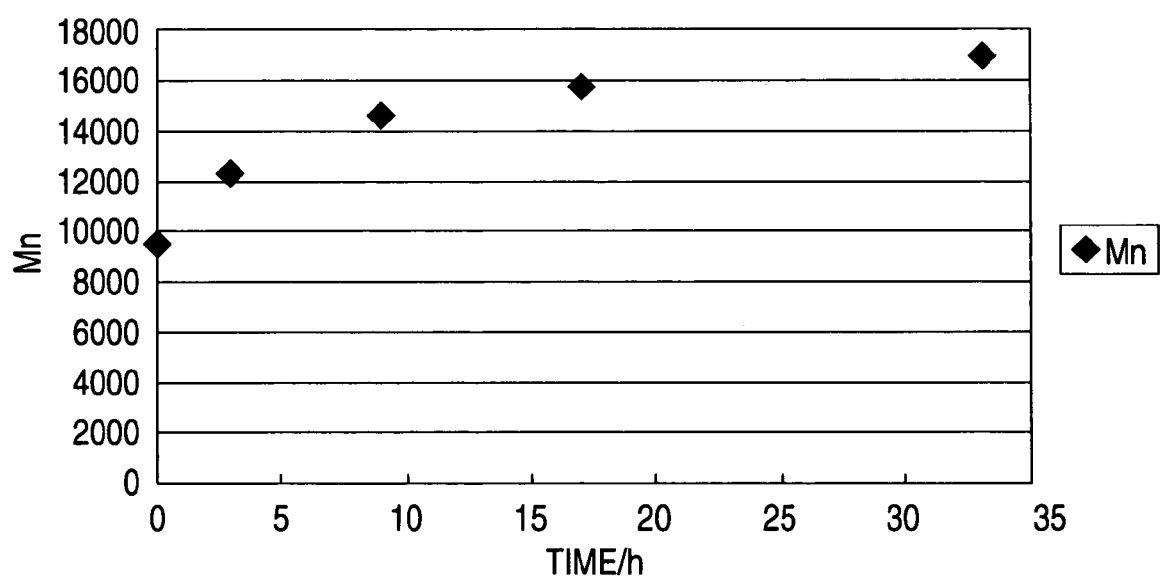
FIG. 2 is a graph showing a number average molecular weight of a polyvinyl alcohol based block copolymer as synthesized in Example 6 versus the elapsed polymerization time.

As shown in FIG. 2, a number average molecular weight (Mn) increased with the lapse of polymerization reaction time. Furthermore, molar ratios of the respective monomers of methyl acrylate (MA), benzyl methacrylate (BZMA) and styrene (St) in the polymer as calculated from the consumed amounts of the monomers in the polymerization solution as determined by gas chromatography are shown in Table 2. As is clear from Table 2, it was confirmed that the block copolymer as connected to the polyvinyl acetate is polyvinyl acetate-b-poly(methyl acrylate-co-benzyl methacrylate-co-styrene) in which its composition changes with an increase of the number average molecular weight thereof and the monomer composition in this block polymer changes towards the terminal (it is of a gradient structure). Moreover, its number average molecular was 16,900, and its molecular weight distribution was 1.67. In this polyvinyl acetate based block copolymer, a connecting group to connect the polyvinyl acetate block to the other block is a dichloromethylene group.

TABLE 2

| Mn | Average molar composition ratio | | |
|---|---|---|---|
| | MA | BzMA | St |
| 9,300 to 12,200 | 24.6 | 68.9 | 6.5 |
| 12,200 to 14,600 | 69.9 | 29.0 | 1.1 |
| 14,600 to 15,700 | 79.1 | 20.9 | 0.0 |
| 15,700 to 16,900 | 91.2 | 8.8 | 0.0 |

Next, in a reaction vessel equipped with a condenser, a stirrer, and a thermometer, 502 g of the foregoing polymerization solution was dissolved in a mixed solvent of 276 g of methanol, 552 g of tetrahydrofuran, and 138 9 of water, the temperature was then raised to 60° C., and 728 g of 5N sodium hydroxide was added to achieve a reaction at 65° C. for 7 hours. After completion of the reaction, a supernatant was removed, and the resulting polymer block was suspended by the addition of 550 g of tetrahydrofuran and 140 g of water, to which was then added 280 g of methanol to precipitate the polymer. A supernatant was again removed, and 300 g of water was added to the residue. Thereafter, the solution was heated to 90° C., and the residual THF and methanol were distilled off to obtain a polymer aqueous solution. Thereafter, a polymer aqueous solution was thrown into acetonitrile to precipitate the polymer. The resulting polymer was dried in vacuo to obtain polyvinyl alcohol-b-poly(sodium acrylate-co-methyl acrylate-co-sodium methacrylate-co-benzyl methacrylate-co-styrene) in which the copolymer as connected to the PVA based block is a gradient copolymer. In this PVA based block copolymer, a connecting group to connect the PVA based block to the other block is the foregoing connecting group (dichloromethylene group) in which a part or all of the chlorine atoms are substituted with a hydrogen atom.

A structure of the foregoing block copolymer was confirmed by H-NMR using heavy water as a solvent. A composition ratio, as determined by H-NMR, of a vinyl alcohol unit to a sodium acrylate unit to a methyl acrylate unit to a sodium methacrylate unit to a benzyl methacrylate unit to a styrene unit in the block copolymer was 36:31:11:7:11:4 (molar ratio).

Example 7

Synthesis of polyvinyl alcohol-b-poly(sodium acrylate-co-methyl acrylate-co-sodium methacrylate-co-benzyl methacrylate-co-styrene)

A flask equipped with a condenser, a nitrogen introducing tube, a stirrer, and a thermometer, the inside of which had been purged with nitrogen, was charged with 3,587 g of vinyl acetate and 1,907 g of chloroform as a chain transfer agent and a solvent, and the temperature was raised to 70° C. over one hour. Next, a catalyst solution having 0.3 g of azobis-(2-methylbutyronitrile) as a catalyst dissolved in 534 g of chloroform was added dropwise over 6 hours. Thereafter, a catalyst solution having 0.5 g of azobis(2-methylbutyronitrile) as a catalyst dissolved in 444.5 g of chloroform was added dropwise over 5 hours. After the dropwise addition of the catalyst solution, the mixture was heated and subjected to a polymerization reaction under a reflux condition for 10 hours. After completion of the reaction, the unreacted vinyl acetate and chloroform were distilled off in vacuo at an internal temperature of 40° C. while continuously adding dropwise a 0.01N sodium hydroxide/methanol solution in the reaction solution, to obtain a methanol solution of polyvinyl acetate (polymer concentration: 74%). This polyvinyl acetate had a number average molecular weight of 4,400 and a molecular weight distribution of 2.7.

A terminal structure of the foregoing polyvinyl acetate was —CCl$_3$. From the matter that a peak of a methylene group (a peak having a chemical shift δ of from 2.8 to 3.2) adjacent to the terminal of this polyvinyl acetate was seen in 1H-NMR (solvent: CDCl$_3$) and the matter that a number average molecular weight (4,500) as calculated while taking the terminal structure as —CCl$_3$ was substantially coincident with a number average molecular weight as determined from GPC, it was confirmed that polyvinyl acetate having a quantitatively halogen-substituted group (—CCl$_3$) in one terminal thereof could be synthesized.

Next, a flask equipped with a condenser, a nitrogen introducing tube, a stirrer, and a thermometer, the inside of which had been purged with nitrogen, was charged with 17 g of methanol and 1,048.5 g of isopropyl alcohol as solvents, 2,623 g of methyl acrylate, 2,142 g of benzyl methacrylate and 63.5 g of styrene as monomers, and 1,353 g of the foregoing methanol solution of polyvinyl acetate as a macro initiator, and the temperature was raised from room temperature to 60° C. over one hour. At the point of time when the internal temperature reached 60° C., a catalyst solution having 0.6 g of cuprous bromide as a catalyst and 12.0 g of tris(2-dimethylamino)ethylamine as a ligand dissolved in 30 g of methanol was added. After adding the catalyst solution, the mixture was heated and subjected to a polymerization reaction under a reflux condition for 25.5 hours.

Figure 3:
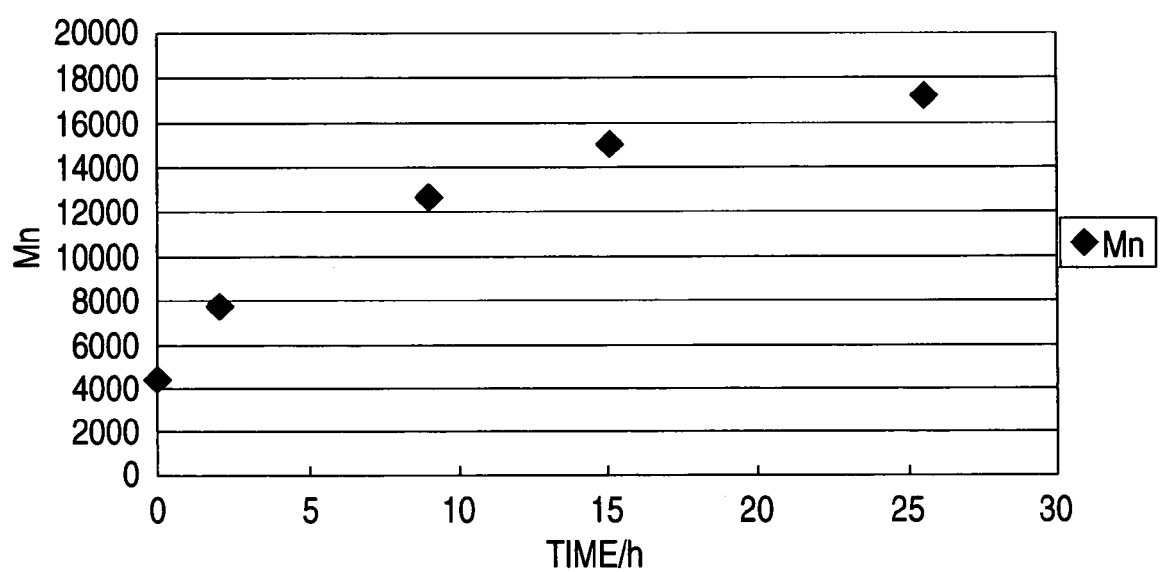
FIG. 3 is a graph showing a number average molecular weight of a polyvinyl alcohol based block copolymer as synthesized in Example 7 versus the elapsed polymerization time.

As shown in FIG. 3, a number average molecular weight (Mn) increased with the lapse of polymerization reaction time. Furthermore, molar ratios of the respective monomers of methyl acrylate (MA), benzyl methacrylate (BzMA) and styrene (St) in the polymer as calculated from the consumed amounts of the monomers in the polymerization solution as determined by gas chromatography are shown in Table 3. As is clear from Table 3, it was confirmed that the block copolymer as connected to the polyvinyl acetate is polyvinyl acetate-b-poly(methyl acrylate-co-benzyl methacrylate-co-styrene) in which its composition changes with an increase of the number average molecular weight thereof and the monomer composition in this block polymer changes towards the terminal (it is of a gradient structure). Moreover, its number average molecular was 17,300, and its molecular weight distribution was 1.48. In this polyvinyl acetate based block copolymer, a connecting group to connect the polyvinyl acetate block to the other block is a dichloromethylene group.

TABLE 3

| Mn | Average molar composition ratio | | |
|---|---|---|---|
|  | MA | BzMA | St |
| 4,400 to 7,800 | 45.7 | 50.0 | 4.4 |
| 7,800 to 12,600 | 54.0 | 43.7 | 2.3 |
| 12,600 to 15,100 | 71.8 | 27.6 | 0.6 |
| 15,100 to 17,300 | 90.0 | 10.0 | 0.0 |

Next, in a reaction vessel equipped with a condenser, a stirrer, and a thermometer, 502 g of the foregoing polymerization solution was dissolved in a mixed solvent of 276 g of methanol, 552 g of tetrahydrofuran, and 138 g of water, the temperature was then raised to 60° C., and 728 g of 5N sodium hydroxide was added to achieve a reaction at 65° C. for 7 hours. After completion of the reaction, a supernatant was removed, and the resulting polymer block was suspended by the addition of 550 g of tetrahydrofuran and 140 g of water, to which was then added 280 g of methanol to precipitate the polymer. A supernatant was again removed, and 300 g of water was added to the residue, followed by neutralizing with acetic acid. The solution was heated to 90° C., and the residual THF and methanol were distilled off to obtain a polymer aqueous solution. Thereafter, impurities were removed from the polymer aqueous solution by using an ultrafiltration membrane (ACP-1050, manufactured by Asahi Kasei Corporation). After the ultrafiltration, the polymer aqueous solution was concentrated and evaporated to dryness to obtain polyvinyl alcohol-b-poly(sodium acrylate-co-methyl acrylate-co-sodium methacrylate-co-benzyl methacrylate-co-styrene) in which the copolymer as connected to the PVA based block is a gradient copolymer. In this PVA based block copolymer, a connecting group to connect the PVA based block to the other block is the foregoing connecting group (dichloromethylene group) in which a part or all of the chlorine atoms are substituted with a hydrogen atom.

A structure of the foregoing block copolymer was confirmed by H-NMR using heavy water as a solvent. A composition ratio, as determined by H-NMR, of a vinyl alcohol unit to a sodium acrylate unit to a methyl acrylate unit to a sodium methacrylate unit to a benzyl methacrylate unit to a styrene unit in the block copolymer was 25:26:21:2:21:5 (molar ratio).

Comparative Example 2

Synthesis of b-poly(sodium acrylate-co-methyl acrylate-co-sodium methacrylate-co-benzyl methacrylate-co-styrene)

A flask equipped with a condenser, a nitrogen introducing tube, a stirrer, and a thermometer, the inside of which had been purged with nitrogen, was charged with 15 g of methanol and 47.5 g of isopropyl alcohol as solvents, 131 g of methyl acrylate, 108.6 g of benzyl methacrylate and 3.31 g of styrene as monomers, and 2.2 g of methyl bromopropionate as an initiator, and the temperature was raised from room temperature to 60° C. over one hour. At the point of time when the internal temperature reached 60° C., a catalyst solution having 0.0597 g of cuprous bromide as a catalyst and 1.2121 g of tris(2-dimethylamino)ethylamine as a ligand dissolved in 5 g of methanol was added. After adding the catalyst solution, the mixture was heated and subjected to a polymerization reaction under a reflux condition for 22 hours.

Figure 4:
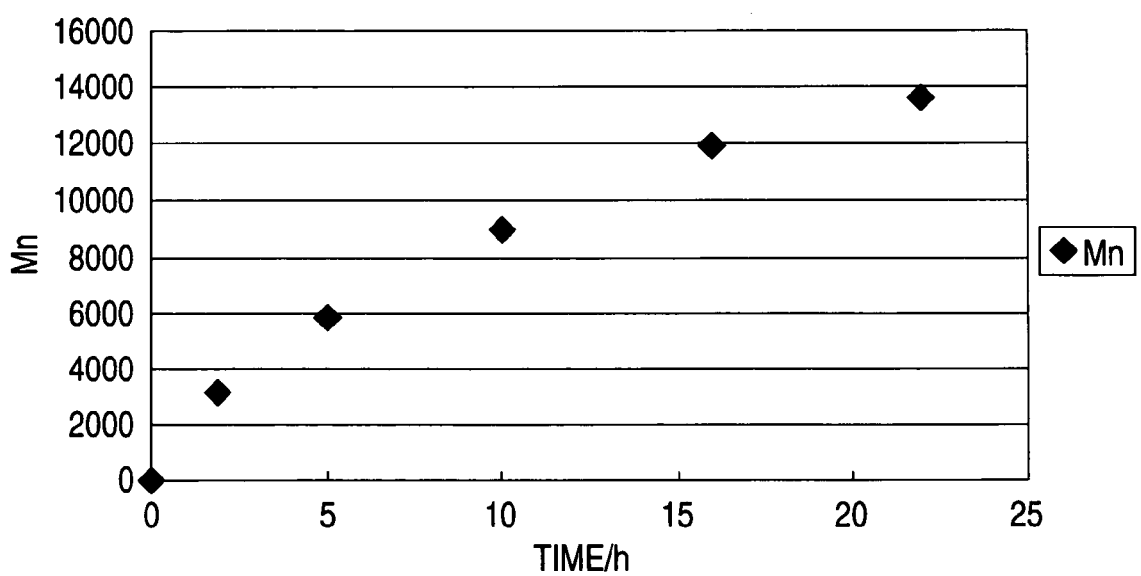
FIG. 4 is a graph showing a number average molecular weight of a polyvinyl alcohol based block copolymer as synthesized in Comparative Example 2 versus the elapsed polymerization time.

As shown in FIG. 4, a number average molecular weight (Mn) increased with the lapse of polymerization reaction time. Furthermore, molar ratios of the respective monomers of methyl acrylate (MA), benzyl methacrylate (BZMA) and styrene (St) in the polymer as calculated from the consumed amounts of the monomers in the polymerization solution as determined by gas chromatography are shown in Table 4. As is clear from Table 4, it was confirmed that the resulting block copolymer is b-poly(methyl acrylate-co-benzyl methacrylate-co-styrene) which is a gradient copolymer in which its composition changes with an increase of the number average molecular weight thereof. Moreover, its number average molecular was 13,600, and its molecular weight distribution was 1.60.

TABLE 4

| Mn | Average molar composition ratio | | |
|---|---|---|---|
| | MA | BzMA | St |
| 0 to 3,100 | 31.7 | 62.0 | 6.3 |
| 3,100 to 5,800 | 52.8 | 44.0 | 3.2 |
| 5,800 to 8,900 | 69.0 | 30.5 | 0.5 |
| 8,900 to 11,900 | 77.5 | 22.5 | 0.0 |
| 11,900 to 13,600 | 93.2 | 6.8 | 0 |

Next, in a reaction vessel equipped with a condenser, a stirrer, and a thermometer, 319 g of the foregoing polymerization solution was dissolved in 520 g of tetrahydrofuran, the temperature was then raised to 60° C., and 380 g of 5N sodium hydroxide was added to achieve a reaction at 65° C. for 7 hours. After completion of the reaction, a supernatant was removed, and the resulting polymer block was suspended by the addition of 160 g of tetrahydrofuran, to which was then added 150 g of methanol to precipitate the polymer. A supernatant was again removed, and 300 g of water was added to the residue, followed by neutralizing with acetic acid. The solution was heated to 90° C., and the residual THF and methanol were distilled off to obtain a polymer aqueous solution. Thereafter, the polymer aqueous solution was thrown into acetonitrile to precipitate the polymer. The resulting polymer was dried in vacuo to obtain poly(sodium acrylate-co-methyl acrylate-co-sodium methacrylate-co-benzyl methacrylate-co-styrene) which is a gradient copolymer.

A structure of the foregoing gradient copolymer was confirmed by H-NMR using heavy water as a solvent. A composition ratio, as determined by H-NMR, of a sodium acrylate unit to a methyl acrylate unit to a sodium methacrylate unit to a benzyl methacrylate unit to a styrene unit in the polymer was 41:26:4:24:5 (molar ratio).

Referential Example 1

Synthesis of poly(sodium acrylate-co-n-butyl acrylate)

A flask equipped with a condenser, a nitrogen introducing tube, a stirrer, and a thermometer, the inside of which had been purged with nitrogen, was charged with 7.43 g of cuprous bromide as a catalyst. In addition, a mixed solution of 500 g of anisole as a solvent, 250 g of t-butyl acrylate and 250 g of n-butyl acrylate as monomers, 9.88 g of pentamethyldiethylenetriamine as a ligand, and 7.243 g of methyl bromopropionate as an initiator was bubbled with nitrogen for 15 minutes and then charged in the foregoing flask. The mixture was heated and subjected to a polymerization reaction under a reflux condition for 130 minutes.

After completion of the reaction, methanol/water (2,000 mL/500 mL) was added to the reaction mixture to precipitate a polymer. The precipitated polymer was recovered and suspended in 1,000 mL of methanol, to which was then added 300 mL of water to precipitate the polymer. Thereafter, the resulting polymer was dried in vacuo to obtain poly(t-butyl acrylate-co-n-butyl acrylate). This polymer had a number average molecular weight of 8,900 and a molecular weight distribution of 1.36.

Next, in a flask equipped with a condenser, a stirrer, and a thermometer, 350 g of the foregoing poly(t-butyl acrylate-co-n-butyl acrylate) was dissolved in 3,500 mL of toluene, to which was then added 12.8 g of p-toluenesulfonic acid monohydrate, and the mixture was heated and allowed to react under a reflux condition for 6 hours. Thereafter, the toluene was removed by an evaporator, and the residue was dried in vacuo to obtain poly(acrylic acid-co-n-butyl acrylate).

Next, 150 g of the foregoing poly(acrylic acid-co-n-butyl acrylate) was suspended in 200 mL of water, and the suspension was neutralized with and dissolved in a sodium hydroxide aqueous solution, followed by precipitation in acetonitrile. The resulting polymer was dried in vacuo to obtain poly(sodium acrylate-co-n-butyl acrylate).

A structure of this random copolymer was confirmed by H-NMR using heavy water as a solvent. A composition ratio, as determined by H-NMR, of a sodium acrylate unit to an n-butyl acrylate unit in the random copolymer was 50:50 (molar ratio).

Referential Example 2

Synthesis of poly(sodium acrylate-co-n-butyl acrylate-co-styrene)

A flask equipped with a condenser, a nitrogen introducing tube, a stirrer, and a thermometer, the inside of which had been purged with nitrogen, was charged with 4.259 g of cuprous bromide and 0.0217 g of cupric bromide as catalysts. In addition, a mixed solution of 68.8 g of methanol as a solvent, 352 g of t-butyl acrylate, 118 g of n-butyl acrylate and 79.2 g of styrene as monomers, 8.21 g of tris(2-dimethylamino)ethylamine as a ligand, and 4.41 g of methyl bromopropionate as an initiator was bubbled with nitrogen for 15 minutes and then charged in the foregoing flask. The mixture was heated and subjected to a polymerization reaction under a reflux condition for 150 minutes.

After completion of the reaction, methanol/water (1,000 mL/300 mL) was added to the reaction mixture to precipitate a polymer. The precipitated polymer was recovered and suspended in 500 mL of methanol, to which was then added 150 mL of water to precipitate the polymer. Thereafter, the resulting polymer was dried in vacuo to obtain poly(t-butyl acrylate-co-n-butyl acrylate-co-styrene). This polymer had a number average molecular weight of 21,000 and a molecular weight distribution of 1.33.

Next, in a flask equipped with a condenser, a stirrer, and a thermometer, 172 g of the foregoing poly(t-butyl acrylate-co-n-butyl acrylate-co-styrene) was dissolved in 1,720 mL of toluene, to which was then added 6.31 g of p-toluenesulfonic acid monohydrate, and the mixture was heated and allowed to react under a reflux condition for 6 hours. Thereafter, the toluene was removed by an evaporator, and the residue was dried in vacuo to obtain poly(acrylic acid-co-n-butyl acrylate-co-styrene).

Next, 100 g of the foregoing poly(acrylic acid-co-n-butyl acrylate-co-styrene) was suspended in 100 mL of water, and the suspension was neutralized with and dissolved in a sodium hydroxide aqueous solution, followed by precipitation in acetonitrile. The resulting polymer was dried in vacuo to obtain poly(sodium acrylate-co-n-butyl acrylate-co-styrene) A structure of this random copolymer was confirmed by H-NMR using heavy water as a solvent. A composition ratio, as determined by H-NMR, of a sodium acrylate unit to an n-butyl acrylate unit to a styrene unit in the random copolymer was 48:20:32 (molar ratio).

Referential Example 3

Synthesis of poly(sodium acrylate-co-n-butyl acrylate-co-styrene)

A flask equipped with a condenser, a nitrogen introducing tube, a stirrer, and a thermometer, the inside of which had been purged with nitrogen, was charged with 3.135 g of cuprous bromide and 0.0234 g of cupric bromide as catalysts. In addition, a mixed solution of 68.9 g of methanol as a solvent, 400 g of t-butyl acrylate, 113 g of n-butyl acrylate and 37.5 g of styrene as monomers, 6.06 g of tris(2-dimethylamino)ethylamine as a ligand, and 4.18 g of methyl bromopropionate as an initiator was bubbled with nitrogen for 15 minutes and then charged in the foregoing flask. The mixture was heated and subjected to a polymerization reaction under a reflux condition for 150 minutes.

After completion of the reaction, methanol/water (1,000 mL/300 mL) was added to the reaction mixture to precipitate a polymer. The precipitated polymer was recovered and suspended in 500 mL of methanol, to which was then added 150 mL of water to precipitate the polymer. Thereafter, the resulting polymer was dried in vacuo to obtain poly(t-butyl acrylate-co-n-butyl acrylate-co-styrene). This polymer had a number average molecular weight of 21,000 and a molecular weight distribution of 1.25.

Next, in a flask equipped with a condenser, a stirrer, and a thermometer, 295 g of the foregoing poly(t-butyl acrylate-co-n-butyl acrylate-co-styrene) was dissolved in 3,000 mL of toluene, to which was then added 10.8 g of p-toluenesulfonic acid monohydrate, and the mixture was heated and allowed to react under a reflux condition for 6 hours. Thereafter, the toluene was removed by an evaporator, and the residue was dried in vacuo to obtain poly(acrylic acid-co-n-butyl acrylate-co-styrene).

Next, 100 g of the foregoing poly(acrylic acid-co-n-butyl acrylate-co-styrene) was suspended in 100 mL of water, and the suspension was neutralized with and dissolved in a sodium hydroxide aqueous solution, followed by precipitation in acetonitrile. The resulting polymer was dried in vacuo to obtain poly(sodium acrylate-co-n-butyl acrylate-co-styrene).

A structure of the foregoing random copolymer was confirmed by H-NMR using heavy water as a solvent. A composition ratio, as determined by H-NMR, of a sodium acrylate unit to an n-butyl acrylate unit to a styrene unit in the random copolymer was 63:22:15 (molar ratio).

Referential Example 4

Synthesis of poly(sodium acrylate-co-n-butyl acrylate-co-styrene)

A flask equipped with a condenser, a nitrogen introducing tube, a stirrer, and a thermometer, the inside of which had been purged with nitrogen, was charged with 8.78 g of cuprous bromide and 0.0688 g of cupric bromide as catalysts. In addition, a mixed solution of 112.5 g of methanol as a solvent, 774 g of t-butyl acrylate, 456 g of n-butyl acrylate and 290 g of styrene as monomers, 9.6051 g of tris(2-dimethylamino)ethylamine as a ligand, and 12.95 g of methyl bromopropionate as an initiator was bubbled with nitrogen for 15 minutes and then charged in the foregoing flask. The mixture was heated and subjected to a polymerization reaction under a reflux condition for 140 minutes.

After completion of the reaction, methanol/water (2,000 mL/500 mL) was added to the reaction mixture to precipitate a polymer. The precipitated polymer was recovered and suspended in 1,000 mL of methanol, to which was then added 300 mL of water to precipitate the polymer. Thereafter, the resulting polymer was dried in vacuo to obtain poly(t-butyl acrylate-co-n-butyl acrylate-co-styrene). This polymer had a number average molecular weight of 20,600 and a molecular weight distribution of 1.33.

Next, in a flask equipped with a condenser, a stirrer, and a thermometer, 570 g of the foregoing poly(t-butyl acrylate-co-n-butyl acrylate-co-styrene) was dissolved in 5,700 mL of toluene, to which was then added 20.9 g of p-toluenesulfonic acid monohydrate, and the mixture was heated and allowed to react under a reflux condition for 6 hours. Thereafter, the toluene was removed by an evaporator, and the residue was dried in vacuo to obtain poly(acrylic acid-co-n-butyl acrylate-co-styrene).

Next, 300 g of the foregoing poly(acrylic acid-co-n-butyl acrylate-co-styrene) was suspended in 1,000 mL of water, and the suspension was neutralized with and dissolved in a sodium hydroxide aqueous solution, followed by precipitation in acetonitrile. The resulting polymer was dried in vacuo to obtain poly(sodium acrylate-co-n-butyl acrylate-co-styrene).

A structure of the foregoing random copolymer was confirmed by H-NMR using heavy water as a solvent. A composition ratio, as determined by H-NMR, of a sodium acrylate unit to an n-butyl acrylate unit to a styrene unit in the random copolymer was 38:25:28 (molar ratio).

Referential Example 5

Synthesis of poly(sodium acrylate-co-n-butyl acrylate-co-styrene)

A flask equipped with a condenser, a nitrogen introducing tube, a stirrer, and a thermometer, the inside of which had been purged with nitrogen, was charged with 9 g of 2,2'-azobis(2,4-dimethylvaleronitrile) as a catalyst. In addition, 1,050 g of tetrahydrofuran as a solvent and 192 g of acrylic acid, 240 g of n-butyl acrylate and 48 g of styrene as monomers were charged in the foregoing flask. The bath temperature was raised from room temperature to 70° C. over one hour, and the mixture was subjected to a polymerization reaction at 70° C. for 8 hours.

After completion of the reaction, the polymerization liquid was concentrated by an evaporator, and a polymer was precipitated in acetonitrile. Thereafter, the resulting polymer was dried in vacuo to obtain poly(acrylic acid-co-n-butyl acrylate-co-styrene). This polymer had a number average molecular weight of 11,000 and a molecular weight distribution of 1.65.

Next, 200 g of the foregoing poly(acrylic acid-co-n-butyl acrylate-co-styrene) was suspended in 100 mL of water, and the suspension was neutralized with and dissolved in a sodium hydroxide aqueous solution. Thereafter, the water was removed by an evaporator, and the residue was dried in vacuo to obtain poly(sodium acrylate-co-n-butyl acrylate-co-styrene).

A structure of the foregoing random copolymer was confirmed by H-NMR using heavy water as a solvent. A composition ratio, as determined by H-NMR, of a sodium acrylate unit to an n-butyl acrylate unit to a styrene unit in the random copolymer was 60:31:9 (molar ratio).

Referential Example 6

Synthesis of poly(sodium acrylate-co-n-butyl acrylate-co-styrene)

A flask equipped with a condenser, a nitrogen introducing tube, a stirrer, and a thermometer, the inside of which had been purged with nitrogen, was charged with 9 g of 2,2'-azobis(2,4-dimethylvaleronitrile) as a catalyst. In addition, 1,050 g of tetrahydrofuran as a solvent and 144 g of acrylic acid, 288 g of n-butyl acrylate and 48 g of styrene as monomers were charged in the foregoing flask. The bath temperature was raised from room temperature to 70° C. over one hour, and the mixture was subjected to a polymerization reaction at 70° C. for 8 hours.

After completion of the reaction, the polymerization liquid was concentrated by an evaporator, and a polymer was precipitated in acetonitrile. Thereafter, the resulting polymer was dried in vacuo to obtain poly(acrylic acid-co-n-butyl acrylate-co-styrene). This polymer had a number average molecular weight of 8,200 and a molecular weight distribution of 1.80.

Next, 200 g of the foregoing poly(acrylic acid-co-n-butyl acrylate-co-styrene) was suspended in 100 mL of water, and the suspension was neutralized with and dissolved in a sodium hydroxide aqueous solution. Thereafter, the water was removed by an evaporator, and the residue was dried in vacuo to obtain poly(sodium acrylate-co-n-butyl acrylate-co-styrene).

A structure of the foregoing random copolymer was confirmed by H-NMR using heavy water as a solvent. A composition ratio, as determined by H-NMR, of a sodium acrylate unit to an n-butyl acrylate unit to a styrene unit in the random copolymer was 50:40:10 (molar ratio).

Referential Example 7

Synthesis of poly(sodium acrylate-co-n-butyl acrylate-co-styrene)

A flask equipped with a condenser, a nitrogen introducing tube, a stirrer, and a thermometer, the inside of which had been purged with nitrogen, was charged with 30 g of 2,2'-azobis(2,4-dimethylvaleronitrile) as a catalyst. In addition, 3,500 g of tetrahydrofuran as a solvent and 600 g of acrylic acid, 600 g of n-butyl acrylate and 400 g of styrene as monomers were charged in the foregoing flask. The bath temperature was raised from room temperature to 70° C. over one hour, and the mixture was subjected to a polymerization reaction at 70° C. for 8 hours.

After completion of the reaction, the polymerization liquid was concentrated by an evaporator, and a polymer was precipitated in acetonitrile. Thereafter, the resulting polymer was dried in vacuo to obtain poly(acrylic acid-co-n-butyl acrylate-co-styrene). This polymer had a number average molecular weight of 11,000 and a molecular weight distribution of 1.60.

Next, 700 g of the foregoing poly(acrylic acid-co-n-butyl acrylate-co-styrene) was suspended in 3,500 mL of water, and the suspension was neutralized with and dissolved in a sodium hydroxide aqueous solution. Thereafter, the water was removed by an evaporator, and the residue was dried in vacuo to obtain poly(sodium acrylate-co-n-butyl acrylate-co-styrene).

A structure of the foregoing random copolymer was confirmed by H-NMR using heavy water as a solvent. A composition ratio, as determined by H-NMR, of a sodium acrylate unit to an n-butyl acrylate unit to a styrene unit in the random copolymer was 47:22:31 (molar ratio).

Referential Example 8

Synthesis of poly(sodium acrylate-co-n-butyl acrylate-co-styrene)

A flask equipped with a condenser, a nitrogen introducing tube, a stirrer, and a thermometer, the inside of which had been purged with nitrogen, was charged with 30 g of 2,2'-azobis(2,4-dimethylvaleronitrile) as a catalyst. In addition, 3,500 g of tetrahydrofuran as a solvent and 600 g of acrylic acid, 600 g of n-butyl acrylate and 400 g of styrene as monomers were charged in the foregoing flask. The bath temperature was raised from room temperature to 70° C. over one hour, and the mixture was subjected to a polymerization reaction at 70° C. for 8 hours.

After completion of the reaction, the reaction liquid was cooled to room temperature, neutralized with a sodium hydroxide/methanol solution, and then precipitated in isopropyl alcohol. A precipitate was filtered and dried in vacuo to obtain a mixture of poly(sodium acrylate-co-n-butyl acrylate-co-styrene). This polymer had a number average molecular weight of 11,000 and a molecular weight distribution of 1.6.

30 g of a mixture of the foregoing random copolymer and sodium acrylate was dissolved in 970 g of water, and the sodium acrylate was then removed by using an ultrafiltration membrane (AIP-1010, manufactured by Asahi Kasei Corporation). After removing the sodium acrylate, the polymer aqueous solution was concentrated and evaporated to dryness to obtain the foregoing random copolymer.

A structure of the foregoing random copolymer was confirmed by H-NMR using heavy water as a solvent. A composition ratio, as determined by H-NMR, of a sodium acrylate unit to an n-butyl acrylate unit to a styrene unit in the random copolymer was 47:21:32 (molar ratio).

Referential Example 9

Synthesis of poly(sodium acrylate-co-2-ethylhexyl acrylate-co-styrene)

A flask equipped with a condenser, a nitrogen introducing tube, a stirrer, and a thermometer, the inside of which had been purged with nitrogen, was charged with 30 g of 2,2'-azobis(2,4-dimethylvaleronitrile) as a catalyst. In addition, 3,500 g of tetrahydrofuran as a solvent and 600 g of acrylic acid, 600 g of 2-ethylhexyl acrylate and 400 g of styrene as monomers were charged in the foregoing flask. The bath temperature was raised from room temperature to 70° C. over one hour, and the mixture was subjected to a polymerization reaction at 70° C. for 8 hours.

After completion of the reaction, the polymerization liquid was concentrated by an evaporator, and a polymer was precipitated in acetonitrile. Thereafter, the resulting polymer was dried in vacuo to obtain poly(acrylic acid-co-2-ethylhexyl acrylate-co-styrene). This polymer had a number average molecular weight of 13,000 and a molecular weight distribution of 1.5.

Next, 200 g of the foregoing poly(acrylic acid-co-2-ethylhexyl acrylate-co-styrene) was suspended in 100 mL of water, and the suspension was neutralized with and dissolved in a sodium hydroxide aqueous solution. Thereafter, the water was removed by an evaporator, and the residue was dried in vacuo to obtain poly(sodium acrylate-co-2-ethylhexyl acrylate-co-styrene).

A structure of the foregoing random copolymer was confirmed by H-NMR using heavy water as a solvent. A composition ratio, as determined by H-NMR, of a sodium acrylate unit to a 2-ethylhexyl acrylate unit to a styrene unit in the random copolymer was 47.5:17:35.5 (molar ratio).

Referential Example 10

Synthesis of poly(sodium acrylate-co-n-butyl acrylate-co-benzyl methacrylate)

A flask equipped with a condenser, a nitrogen introducing tube, a stirrer, and a thermometer, the inside of which had been purged with nitrogen, was charged with 4 g of 2,2'-azobis(2,4-dimethylvaleronitrile) as a catalyst. In addition, 700 g of tetrahydrofuran as a solvent and 120 g of acrylic acid, 120 g of n-butyl acrylate and 80 g of benzyl methacrylate as monomers were charged in the foregoing flask. The bath temperature was raised from room temperature to 70° C. over one hour, and the mixture was subjected to a polymerization reaction at 70° C. for 8 hours.

After completion of the reaction, the polymerization liquid was concentrated by an evaporator, and a polymer was precipitated in acetonitrile. Thereafter, the resulting polymer was dried in vacuo to obtain poly(acrylic acid-co-n-butyl acrylate-co-benzyl methacrylate). This polymer had a number average molecular weight of 15,000 and a molecular weight distribution of 1.6.

Next, 200 g of the foregoing poly(acrylic acid-co-n-butyl acrylate-co-benzyl methacrylate) was suspended in 100 mL of water, and the suspension was neutralized with and dissolved in a sodium hydroxide aqueous solution. Thereafter, the water was removed by an evaporator, and the residue was dried in vacuo to obtain poly(acrylic acid-co-n-butyl acrylate-co-benzyl methacrylate).

A structure of the foregoing random copolymer was confirmed by H-NMR using heavy water as a solvent. A composition ratio, as determined by H-NMR, of a sodium acrylate unit to an n-butyl acrylate unit to a benzyl methacrylate unit in the random copolymer was 56:20:24 (molar ratio).

Referential Example 11

Synthesis of poly(sodium acrylate-co-n-butyl acrylate-co-benzyl methacrylate)

A flask equipped with a condenser, a nitrogen introducing tube, a stirrer, and a thermometer, the inside of which had been purged with nitrogen, was charged with 4 g of 2,2'-azobis(2,4-dimethylvaleronitrile) as a catalyst. In addition, 700 g of tetrahydrofuran as a solvent and 85 g of acrylic acid, 79 g of n-butyl acrylate and 156 g of benzyl methacrylate as monomers were charged in the foregoing flask. The bath temperature was raised from room temperature to 70° C. over one hour, and the mixture was subjected to a polymerization reaction at 70° C. for 8 hours.

After completion of the reaction, the polymerization liquid was concentrated by an evaporator, and a polymer was precipitated in acetonitrile. Thereafter, the resulting polymer was dried in vacuo to obtain poly(acrylic acid-co-n-butyl acrylate-co-benzyl methacrylate). This polymer had a number average molecular weight of 16,000 and a molecular weight distribution of 1.7.

Next, 200 g of the foregoing poly(acrylic acid-co-n-butyl acrylate-co-benzyl methacrylate) was suspended in 100 mL of water, and the suspension was neutralized with and dissolved in a sodium hydroxide aqueous solution. Thereafter, the water was removed by an evaporator, and the residue was dried in vacuo to obtain poly(acrylic acid-co-n-butyl acrylate-co-benzyl methacrylate).

A structure of the foregoing random copolymer was confirmed by H-NMR using heavy water as a solvent. A composition ratio, as determined by H-NMR, of a sodium acrylate unit to an n-butyl acrylate unit to a benzyl methacrylate unit in the random copolymer was 40:30:30 (molar ratio).

Referential Example 12

Synthesis of poly(sodium acrylate-co-n-butyl acrylate-co-benzyl methacrylate-co-styrene)

A flask equipped with a condenser, a nitrogen introducing tube, a stirrer, and a thermometer, the inside of which had been purged with nitrogen, was charged with 4 g of 2,2'-azobis(2,4-dimethylvaleronitrile) as a catalyst. In addition, 700 g of tetrahydrofuran as a solvent and 98 g of acrylic acid, 91 g of n-butyl acrylate, 11 g of benzyl methacrylate and 22 g of styrene as monomers were charged in the foregoing flask. The bath temperature was raised from room temperature to 70° C. over one hour, and the mixture was subjected to a polymerization reaction at 70° C. for 8 hours.

After completion of the reaction, the polymerization liquid was concentrated by an evaporator, and a polymer was precipitated in acetonitrile. Thereafter, the resulting polymer was dried in vacuo to obtain poly(acrylic acid-co-n-butyl acrylate-co-benzyl methacrylate-co-styrene) This polymer had a number average molecular weight of 13,000 and a molecular weight distribution of 1.4.

Next, 200 g of the foregoing poly(acrylic acid-co-n-butyl acrylate-co-benzyl methacrylate-co-styrene) was suspended in 100 mL of water, and the suspension was neutralized with and dissolved in a sodium hydroxide aqueous solution. Thereafter, the water was removed by an evaporator, and the residue was dried in vacuo to obtain poly(acrylic acid-co-n-butyl acrylate-co-benzyl methacrylate-co-styrene).

A structure of the foregoing random copolymer was confirmed by H-NMR using heavy water as a solvent. A composition ratio, as determined by H-NMR, of a sodium acrylate unit to an n-butyl acrylate unit to a benzyl methacrylate unit to a styrene unit in the random copolymer was 30:10:25:35 (molar ratio).

Production examples of pigment dispersion aqueous liquids using the block copolymers of the invention as obtained in Examples 1 to 7 will be hereunder described. Incidentally, in the following Examples 8 to 33 and Comparative Examples 3 to 10, the PVA based block copolymer as obtained in the foregoing Example 1 is referred to as B-A; and the PVA based block copolymers as obtained in Examples 2 to 7 are referred to B-C to B-H, respectively. Furthermore, the random copolymer as obtained in Referential Example 1 is referred to as R-A; and the random copolymers as obtained in Referential Examples 2 to 12 are referred to as R-B to R-L, respectively.

Example 8

Preparation of Magenta Pigment Dispersion (Pigment Dispersion A)

75.8 g of Pigment Red-122 (paste, solids content: 29.7%, manufactured by Dainichiseika Color & Chemicals Mfg. Co., Ltd.), 25 g of a 10% aqueous solution of Acid Red-51 (manufactured by Aldrich Chemical Company), and 149.2 g of deionized water were mixed and dispersed at 25° C. for 8 hours by milling with zirconia beads of 0.5 mm in diameter as media, to obtain a dispersion.

The foregoing dispersion was weighed in a 300-mL beaker; the beaker was dipped in ice water; dispersing was carried out for 5 minutes by using an ultrasonic homogenizer (US-300T, manufactured by Nihonseiki Seisakusho Ltd., using a 26-mmφ chip); after the liquid temperature had reached 20° C., dispersing was repeated for 5 minutes; and dispersing was continued until a dispersing time became 60 minutes in total, to obtain a pigment dispersion. This dispersion was adjusted so as to have a pigment concentration of 8% by weight, thereby preparing a pigment dispersion A. By using this pigment dispersion, an ink was produced according to the following formulation.

(Preparation of Recording Liquid)

| | |
|---|---|
| Pigment dispersion A: | 3.75 g |
| B-A (10% aqueous solution): | 0.5 g |
| Deionized water: | 4.135 g |
| Diethylene glycol: | 0.5 g |
| Glycerin: | 0.5 g |
| Trimethylolpropane: | 0.6 g |
| Olefin E1010 (surfactant manufactured by Air Products and Chemicals, Inc.): | 0.015 g |

The foregoing components were mixed, stirred for 15 minutes, adjusted at a pH of 9 by an NaOH aqueous solution, and then subjected to an ultrasonic dispersing treatment for 30 minutes to obtain a recording liquid A. This recording liquid A was evaluated in the following methods. Incidentally, a printer of an inkjet recording system (BJ-S700, manufactured by Canon Inc.) was used as a printer, and commercially available glossy paper (PR101) was used as printing paper. Furthermore, the recording liquid was used for the evaluation after filtering by a 0.45-μm filter.

(a) Stability of Recording Liquid:

As a test method, an accelerated test was carried out by adding 1.0 wt % of ammonium benzoate having an effect for hindering dispersion stability to the recording liquid. After adding ammonium benzoate, the mixture was kept at 70° C. for one hour, and a particle size was measured. The smaller the increase of the particle size, the more stable the recording liquid is. Incidentally, with respect to the measurement of a mean particle size, the inkjet recording liquid was diluted with deionized water to 10,000 times; the measurement was carried out in DLS7000 of Otsuka Electronics Co., Ltd. by using He—Ne laser for magenta and yellow and Ar laser for black and cyan, respectively; and a value of the mean particle size was calculated by the Cumulant method.

(b) Rub Fastness of Recorded Image:

By using a BJ-S700 printer of Canon Inc., the subject ink was filled in a cartridge, and printing was carried out glossy paper (PR-101 of Canon Inc.). The rub fastness was tested just after printing and after lapsing one hour according to the following criteria. The results are shown in Table 5.

Rub Fastness

A: Color fade does not occur even when rubbed by a finger.

B: Color fade slightly occurs when rubbed by a finger.

C: Color fade occurs when rubbed by a finger.

(c) 20° Gloss of Recorded Image:

By using a BJ-S700 printer of Canon Inc., the subject ink was filled in a cartridge, and printing was carried out glossy paper (PR-101 of Canon Inc.). After lapsing one day, the measurement of 20° gloss was carried out by using a haze-gloss reflectometer (manufactured by BYK-Gardner). The results are shown in Table 5.

Example 9

Preparation of Cyan Pigment Dispersion (Pigment dispersion B)

73.1 g of Pigment Blue-15:3 (paste, solids content: 30.8%, manufactured by Dainichiseika Color & Chemicals Mfg. Co., Ltd.), 25 g of a 10% aqueous solution of Direct Blue-86 (manufactured by Mitsubishi Chemical Corporation), and 151.9 g of deionized water were mixed and dispersed at 25° C. for 6 hours by milling with zirconia beads of 0.5 mm in diameter as media, to obtain a dispersion.

The foregoing dispersion was dispersed by using an ultrasonic homogenizer in the same manner as in Example 8, to obtain a pigment dispersion. This dispersion was adjusted so as to have a pigment concentration of 8% by weight, thereby preparing a pigment dispersion B. By using this pigment dispersion, an ink was prepared and evaluated in the same manner as in Example 8. The results are shown in Table 5.

Example 10

Preparation of Yellow Pigment Dispersion (Pigment Dispersion C)

95.7 g of Pigment Yellow-74 (paste, solids content: 23.5%, manufactured by Dainichiseika Color & Chemicals Mfg. Co., Ltd.), 25 g of a 10% aqueous solution of Direct Yelow-27 (manufactured by Aldrich Chemical Company), and 129.3 g of deionized water were mixed and dispersed at 25° C. for 8 hours by milling with zirconia beads of 0.5 mm in diameter as media, to obtain a dispersion.

The foregoing dispersion was dispersed by using an ultrasonic homogenizer in the same manner as in Example 8, to obtain a pigment dispersion. This dispersion was adjusted so as to have a pigment concentration of 8% by weight, thereby preparing a pigment dispersion C. By using this pigment dispersion, an ink was prepared and evaluated in the same manner as in Example 8. The results are shown in Table 5.

Example 11

Preparation of Black Pigment Dispersion (Pigment Dispersion D)

22.5 g of carbon black (MA100, powder, solids content: 100%, manufactured by Mitsubishi Chemical Corporation), 25 g of a 10% aqueous solution of Direct Blue-86 (manufactured by Mitsubishi Chemical Corporation), and 202.5 g of deionized water were mixed and dispersed at 25° C. for 6 hours by milling with zirconia beads of 0.5 mm in diameter as media, to obtain a dispersion.

The foregoing dispersion was dispersed by using an ultrasonic homogenizer in the same manner as in Example 8, to obtain a pigment dispersion. This dispersion was adjusted so as to have a pigment concentration of 8% by weight, thereby preparing a pigment dispersion D. By using this pigment dispersion, an ink was prepared and evaluated in the same manner as in Example 8. The results are shown in Table 5.

Example 12

An ink was prepared and evaluated in the same manner as in Example 9, except that in Example 9, B-A to be used as a polymer was changed to B-C. The results are shown in Table 5.

Example 13

Preparation of Magenta Pigment Dispersion (Pigment Dispersion E)

84.2 g of Pigment Red-122 (paste, solids content: 29.7%, manufactured by Dainichiseika Color & Chemicals Mfg. Co., Ltd.), 50 g of a 10% aqueous solution of B-A, and 115.7 g of deionized water were mixed and dispersed at 25° C. for 8 hours by milling with zirconia beads of 0.5 mm in diameter as media, to obtain a dispersion.

The foregoing dispersion was dispersed by using an ultrasonic homogenizer in the same manner as in Example 8, to obtain a pigment dispersion. This dispersion was adjusted so as to have a pigment concentration of 8% by weight, thereby preparing a pigment dispersion E. By using this pigment dispersion, an ink was produced according to the following formulation.

(Preparation of Recording Liquid)

| | |
|---|---|
| Pigment dispersion E: | 5 g |
| Deionized water: | 3.385 g |
| Diethylene glycol: | 0.5 g |
| Glycerin: | 0.5 g |
| Trimethylolpropane: | 0.6 g |
| Olefin E1010 (surfactant manufactured by Air by Air Products and Chemicals, Inc.): | 0.015 g |

The foregoing components were mixed, stirred for 15 minutes, and then subjected to an ultrasonic dispersing treatment for 30 minutes to obtain a recording liquid G, which was then evaluated in the same manner as in Example 8. The results are shown in Table 5.

Example 14

Preparation of Black Pigment Dispersion (Pigment Dispersion F)

25 g of carbon black (MA-100, powder, solids content: 100%, manufactured by Mitsubishi Chemical Corporation), 50 g of a 10% aqueous solution of B-A, and 175 g of deionized water were mixed and dispersed at 25° C. for 6 hours by milling with zirconia beads of 0.5 mm in diameter as media, to obtain a dispersion.

The foregoing dispersion was dispersed by using an ultrasonic homogenizer in the same manner as in Example 8, to obtain a pigment dispersion. This dispersion was adjusted so as to have a pigment concentration of 8% by weight, thereby preparing a pigment dispersion F.

The same procedures as in Example 13 were followed, except for changing the pigment dispersion to this pigment dispersion. The results are shown in Table 5.

Example 15

Preparation of Black Pigment Dispersion (Pigment Dispersion G)

25 g of carbon black (#990, powder, solids content: 100%, manufactured by Mitsubishi Chemical Corporation), 25 g of a 10% aqueous solution of R-A, and 150 g of deionized water were mixed and preliminarily dispersed for 30 minutes by using a homogenizer. Thereafter, the dispersion was dispersed at 70° C. for 90 minutes by milling with zirconia beads of 0.5 mm in diameter as media, 25 g of a 10% aqueous solution of B-D was added dropwise to the dispersion over 10 minutes by using a Peri-Star pump, and dispersing for 90 minutes was repeated twice to obtain a dispersion.

The foregoing dispersion was weighed in a 300-mL beaker; the beaker was dipped in ice water; and dispersing was carried out by using an ultrasonic homogenizer in the same manner as in Example 8 until a dispersing time became 60 minutes in total, to obtain a pigment dispersion. This dispersion was adjusted so as to have a pigment concentration of 8% by weight, thereby preparing a pigment dispersion F.

The same procedures as in Example 13 were followed, except for changing the pigment dispersion to this pigment dispersion. The results are shown in Table 5.

Example 16

Preparation of Magenta Pigment Dispersion (Pigment Dispersion H)

94.3 g of Pigment Red-122 (paste, solids content: 29.7%, manufactured by Dainichiseika Color & Chemicals Mfg. Co., Ltd.), 56 g of a 10% aqueous solution of R-B, and 87.7 g of deionized water were mixed and preliminarily dispersed for 10 minutes by using a homogenizer. Thereafter, the dispersion was dispersed at 60° C. for 4 hours by milling with zirconia beads of 0.5 mm in diameter as media, 14 g of a 10% aqueous solution of B-D was added dropwise to the dispersion over 5 minutes by using a Peri-Star pump, dispersing for one hour was repeated thrice, and after dropping the temperature to 40° C., dispersing was continued for one hour to obtain a dispersion.

The foregoing dispersion was weighed in a 500-mL beaker; the beaker was dipped in ice water; dispersing was carried out for 5 minutes by using an ultrasonic homogenizer (US-600T, manufactured by Nihonseiki Seisakusho Ltd., using a 36-mmφ chip); after the liquid temperature had reached 40° C., dispersing was repeated for 5 minutes; and dispersing was continued until a dispersing time became 60 minutes in total, to obtain a pigment dispersion. This dispersion was adjusted so as to have a pigment concentration of 8% by weight, thereby preparing a pigment dispersion H.

The same procedures as in Example 13 were followed, except for changing the pigment dispersion to this pigment dispersion. The results are shown in Table 5.

Example 17

Preparation of Magenta Pigment Dispersion (Pigment Dispersion T)

94.3 g of Pigment Red-122 (paste, solids content: 29.7%, manufactured by Dainichiseika Color & Chemicals Mfg. Co., Ltd.), 56 g of a 10% aqueous solution of R-C, and 91.1 g of deionized water were mixed and preliminarily dispersed for 10 minutes by using a homogenizer. Thereafter, the dispersion was dispersed at 40° C. for 4 hours by milling with zirconia beads of 0.5 mm in diameter as media, 14 g of a 10% aqueous solution of B-D was added dropwise to the dispersion over 5 minutes by using a Peri-Star pump, dispersing for one hour was repeated thrice, and after dropping the temperature to 25° C., dispersing was continued for one hour to obtain a dispersion.

The foregoing dispersion was dispersed by using an ultrasonic homogenizer in the same manner as in Example 16, to obtain a pigment dispersion. This dispersion was adjusted so as to have a pigment concentration of 8% by weight, thereby preparing a pigment dispersion I.

The same procedures as in Example 13 were followed, except for changing the pigment dispersion to this pigment dispersion. The results are shown in Table 5.

Example 18

Preparation of Magenta Pigment Dispersion (Pigment Dispersion J)

94.3 g of Pigment Red-122 (paste, solids content: 29.7%, manufactured by Dainichiseika Color & Chemicals Mfg. Co., Ltd.), 56 g of a 10% aqueous solution of R-D, and 87.7 g of deionized water were mixed and preliminarily dispersed for 10 minutes by using a homogenizer. Thereafter, the dispersion was dispersed at 60° C. for 4 hours by milling with zirconia beads of 0.5 mm in diameter as media, 14 g of a 10% aqueous solution of B-D was added dropwise to the dispersion over 5 minutes by using a Peri-Star pump, and dispersing for one hour was repeated thrice, and after dropping the temperature to 40° C., dispersing was continued for one hour to obtain a dispersion.

The foregoing dispersion was dispersed by using an ultrasonic homogenizer in the same manner as in Example 16, to obtain a pigment dispersion. This dispersion was adjusted so as to have a pigment concentration of 8% by weight, thereby preparing a pigment dispersion J.

The same procedures as in Example 13 were followed, except for changing the pigment dispersion to this pigment dispersion. The results are shown in Table 5.

Example 19

Preparation of Magenta Pigment Dispersion (Pigment Dispersion K)

94.3 g of Pigment Red-122 (paste, solids content: 29.7%, manufactured by Dainichiseika Color & Chemicals Mfg. Co., Ltd.), 56 g of a 10% aqueous solution of R-D, and 87.7 g of deionized water were mixed and preliminarily dispersed for 10 minutes by using a homogenizer. Thereafter, the dispersion was dispersed at 60° C. for 4 hours by milling with zirconia beads of 0.5 mm in diameter as media, 14 g of a 10% aqueous solution of B-E was added dropwise to the dispersion over 5 minutes by using a Peri-Star pump, and dispersing for one hour was repeated thrice, and after dropping the temperature to 40° C., dispersing was continued for one hour to obtain a dispersion.

The foregoing dispersion was dispersed by using an ultrasonic homogenizer in the same manner as in Example 16, to obtain a pigment dispersion. This dispersion was adjusted so as to have a pigment concentration of 8% by weight, thereby preparing a pigment dispersion K.

The same procedures as in Example 13 were followed, except for changing the pigment dispersion to this pigment dispersion. The results are shown in Table 5.

Example 20

Preparation of Cyan Pigment Dispersion (Pigment Dispersion L)

90.9 g of Pigment Blue-15:3 (paste, solids content: 30.8%, manufactured by Dainichiseika Color & Chemicals Mfg. Co., Ltd.), 56 g of a 10% aqueous solution of R-E, and 91.1 g of deionized water were mixed and preliminarily dispersed for 10 minutes by using a homogenizer. Thereafter, the dispersion was dispersed at 40° C. for 4 hours by milling with zirconia beads of 0.5 mm in diameter as media, 14 g of a 10% aqueous solution of B-F was added dropwise to the dispersion over 5 minutes by using a Peri-Star pump, and dispersing for one hour was repeated thrice, and after dropping the temperature to 25° C., dispersing was continued for one hour to obtain a dispersion.

The foregoing dispersion was dispersed by using an ultrasonic homogenizer in the same manner as in Example 16, except that dispersing was carried out for 3 minutes and that after the liquid temperature had reached 20° C., dispersing was repeated for 3 minutes, to obtain a pigment dispersion. This dispersion was adjusted so as to have a pigment concentration of 8% by weight, thereby preparing a pigment dispersion L.

The same procedures as in Example 13 were followed, except for changing the pigment dispersion to this pigment dispersion. The results are shown in Table 5.

Example 21

Preparation of Yellow Pigment Dispersion (Pigment Dispersion M)

119.1 g of Pigment Yellow-74 (paste, solids content: 23.5%, manufactured by Dainichiseika Color & Chemicals Mfg. Co., Ltd.), 56 g of a 10% aqueous solution of R-F, and 62.9 g of deionized water were mixed and preliminarily dispersed for 10 minutes by using a homogenizer. Thereafter, the dispersion was dispersed at 25° C. for one hour by milling with zirconia beads of 0.5 mm in diameter as media, 42 g of a 10% aqueous solution of B-F was added dropwise to the dispersion over 15 minutes by using a Peri-Star pump, and after raising the temperature to 40° C., dispersing was carried out for 7 hours to obtain a dispersion.

The foregoing dispersion was dispersed by using an ultrasonic homogenizer in the same manner as in Example 20, to obtain a pigment dispersion. This dispersion was adjusted so as to have a pigment concentration of 8% by weight, thereby preparing a pigment dispersion M.

The same procedures as in Example 13 were followed, except for changing the pigment dispersion to this pigment dispersion. The results are shown in Table 5.

Example 22

Preparation of Magenta Pigment Dispersion (Pigment Dispersion N)

94.3 g of Pigment Red-122 (paste, solids content: 29.7%, manufactured by Dainichiseika Color & Chemicals Mfg.

Co., Ltd.), 56 g of a 10% aqueous solution of R-G, and 87.7 g of deionized water were mixed and preliminarily dispersed for 10 minutes by using a homogenizer. Thereafter, the dispersion was dispersed at 60° C. for 4 hours by milling with zirconia beads of 0.5 mm in diameter as media, 14 g of a 10% aqueous solution of B-F was added dropwise to the dispersion over 5 minutes by using a Peri-Star pump, and dispersing for one hour was repeated thrice, and after dropping the temperature to 40° C., dispersing was continued for one hour to obtain a dispersion.

The foregoing dispersion was dispersed by using an ultrasonic homogenizer in the same manner as in Example 16, to obtain a pigment dispersion. This dispersion was adjusted so as to have a pigment concentration of 8% by weight, thereby preparing a pigment dispersion N.

The same procedures as in Example 13 were followed, except for changing the pigment dispersion to this pigment dispersion. The results are shown in Table 5.

Example 23

Preparation of Black Pigment Dispersion (Pigment Dispersion O)

28 g of carbon black (#990, powder, solids content: 100%, manufactured by Mitsubishi Chemical Corporation), 112 g of a 10% aqueous solution of R-G, and 95 g of deionized water were mixed and preliminarily dispersed for 10 minutes by using a homogenizer. Thereafter, the dispersion was dispersed at 80° C. for 6 hours by milling with zirconia beads of 0.5 mm in diameter as media, and after dropping the temperature to 60° C., 14 g of a 10% aqueous solution of B-F was added dropwise to the dispersion over 5 minutes by using a Peri-Star pump. Dispersing for one hour was repeated thrice, and after dropping the temperature to 40° C., dispersing was continued for one hour to obtain a dispersion.

The foregoing dispersion was dispersed by using an ultrasonic homogenizer in the same manner as in Example 16, to obtain a pigment dispersion. This dispersion was adjusted so as to have a pigment concentration of 8% by weight, thereby preparing a pigment dispersion O.

The same procedures as in Example 13 were followed, except for changing the pigment dispersion to this pigment dispersion. The results are shown in Table 5.

Example 24

Preparation of Cyan Pigment Dispersion (Pigment Dispersion P)

90.9 g of Pigment Blue-15:3 (paste, solids content: 30.8%, manufactured by Dainichiseika Color & Chemicals Mfg. Co., Ltd.), 112 g of a 10% aqueous solution of R-G, and 32.1 g of deionized water were mixed and preliminarily dispersed for 10 minutes by using a homogenizer. Thereafter, the dispersion was dispersed at 25° C. for one hour by milling with zirconia beads of 0.5 mm in diameter as media, 42 g of a 10% aqueous solution of B-F was added dropwise to the dispersion over 15 minutes by using a Peri-Star pump, and dispersing was carried out for one hour to obtain a dispersion.

The foregoing dispersion was dispersed by using an ultrasonic homogenizer in the same manner as in Example 20, to obtain a pigment dispersion. This dispersion was adjusted so as to have a pigment concentration of 8% by weight, thereby preparing a pigment dispersion P.

The same procedures as in Example 13 were followed, except for changing the pigment dispersion to this pigment dispersion. The results are shown in Table 5.

Example 25

Preparation of Yellow Pigment Dispersion (Pigment Dispersion Q)

119.1 g of Pigment Yellow-74 (paste, solids content: 23.5%, manufactured by Dainichiseika Color & Chemicals Mfg. Co., Ltd.), 56 g of a 10% aqueous solution of R-G, and 62.9 g of deionized water were mixed and preliminarily dispersed for 10 minutes by using a homogenizer. Thereafter, the dispersion was dispersed at 25° C. for one hour by milling with zirconia beads of 0.5 mm in diameter as media, 42 g of a 10% aqueous solution of B-F was added dropwise to the dispersion over 15 minutes by using a Peri-Star pump, and after raising the temperature to 40° C., dispersing was carried out for 7 hours to obtain a dispersion.

The foregoing dispersion was dispersed by using an ultrasonic homogenizer in the same manner as in Example 20, to obtain a pigment dispersion. This dispersion was adjusted so as to have a pigment concentration of 8% by weight, thereby preparing a pigment dispersion Q.

The same procedures as in Example 13 were followed, except for changing the pigment dispersion to this pigment dispersion. The results are shown in Table 5.

Example 26

Preparation of Black Pigment Dispersion (Pigment Dispersion R)

A pigment dispersion R was obtained in the same manner as in Example 23, except for changing the R-G to R-I.

The same procedures as in Example 13 were followed, except for changing the pigment dispersion to this pigment dispersion. The results are shown in Table 5.

Example 27

Preparation of Black Pigment Dispersion (Pigment Dispersion S)

28 g of carbon black (#990, powder, solids content: 100%, manufactured by Mitsubishi Chemical Corporation), 112 g of a 10% aqueous solution of R-J, and 95 g of deionized water were mixed and preliminarily dispersed for 10 minutes by using a homogenizer. Thereafter, the dispersion was dispersed at 60° C. for 6 hours by milling with zirconia beads of 0.5 mm in diameter as media, and 14 g of a 10% aqueous solution of B-F was added dropwise to the dispersion over 5 minutes by using a Peri-Star pump. Dispersing for one hour was repeated thrice, and after dropping the temperature to 40° C., dispersing was continued for one hour to obtain a dispersion.

The foregoing dispersion was dispersed by using an ultrasonic homogenizer in the same manner as in Example 16, to obtain a pigment dispersion. This dispersion was adjusted so as to have a pigment concentration of 8% by weight, thereby preparing a pigment dispersion S.

The same procedures as in Example 13 were followed, except for changing the pigment dispersion to this pigment dispersion. The results are shown in Table 5.

Example 28

Preparation of Black Pigment Dispersion (Pigment Dispersion T)

A pigment dispersion T was obtained in the same manner as in Example 27, except for changing the R-J to R-K.

The same procedures as in Example 13 were followed, except for changing the pigment dispersion to this pigment dispersion. The results are shown in Table 5.

Example 29

Preparation of Black Pigment Dispersion (Pigment Dispersion U)

A pigment dispersion U was obtained in the same manner as in Example 27, except for changing the R-J to R-L.

The same procedures as in Example 13 were followed, except for changing the pigment dispersion to this pigment dispersion. The results are shown in Table 5.

Example 30

Preparation of Cyan Pigment Dispersion (Pigment Dispersion V)

A pigment dispersion V was obtained in the same manner as in Example 24, except for changing the B-F to B-G.

The same procedures as in Example 13 were followed, except for changing the pigment dispersion to this pigment dispersion. The results are shown in Table 5.

Example 31

Preparation of Black Pigment Dispersion (Pigment Dispersion W)

28 g of carbon black (#960, powder, solids content: 100%, manufactured by Mitsubishi Chemical Corporation), 140 g of a 10% aqueous solution of R-I, and 84 g of deionized water were mixed and preliminarily dispersed for 10 minutes by using a homogenizer. Thereafter, the dispersion was dispersed at 80° C. for 6 hours by milling with zirconia beads of 0.5 mm in diameter as media, and after dropping the temperature to 60° C., 14 g of a 10% aqueous solution of B-G was added dropwise to the dispersion over 5 minutes by using a Peri-Star pump. Dispersing for one hour was repeated twice, and after dropping the temperature to 40° C., dispersing was continued for one hour to obtain a dispersion. The foregoing dispersion was dispersed by using an ultrasonic homogenizer in the same manner as in Example 16, to obtain a pigment dispersion. This dispersion was adjusted so as to have a pigment concentration of 8% by weight, thereby preparing a pigment dispersion W.

The same procedures as in Example 13 were followed, except for changing the pigment dispersion to this pigment dispersion. The results are shown in Table 5.

Example 32

Preparation of Cyan Pigment Dispersion (Pigment Dispersion X)

A pigment dispersion X was obtained in the same manner as in Example 30, except for changing the R-G and B-G to R-H and B-H, respectively.

The same procedures as in Example 13 were followed, except for changing the pigment dispersion to this pigment dispersion. The results are shown in Table 5.

Example 33

Preparation of Black Pigment Dispersion (Pigment Dispersion Y)

A pigment dispersion Y was obtained in the same manner as in Example 27, except for changing the R-J and B-F to R-H and B-H, respectively.

The same procedures as in Example 13 were followed, except for changing the pigment dispersion to this pigment dispersion. The results are shown in Table 5.

Comparative Example 3

The same procedures as in Example 8 were followed, except for changing the polymer of Example 8 to a polyvinyl alcohol homopolymer (PVA-102 of Kuraray Co., Ltd.). The results are shown in Table 5.

Comparative Example 4

The same procedures as in Example 8 were followed, except for changing the polymer of Example 8 to a styrene-acrylic acid block copolymer (P2476 of Polymer Source Inc.). The results are shown in Table 5.

Comparative Example 5

The same-procedures as in Example 8 were followed, except that the polymer was not used. The results are shown in Table 5.

Comparative Example 6

The same procedures as in Example 13 were followed, except for changing the polymer of Example 13 to a styrene-acrylic acid block copolymer (P2476 of Polymer Source Inc.). The results are shown in Table 5.

Comparative Example 7

The same procedures as in Example 13 were followed, except for changing the polymer of Example 13 to a polyvinyl alcohol homopolymer (PVA-102 of Kuraray Co., Ltd.). The results are shown in Table 5.

Comparative Example 8

The same procedures as in Example 14 were followed, except for changing the polymer of Example 14 to a polymer dispersant JONCRYL 678 (Johnson Polymer, Inc.). The results are shown in Table 5.

Comparative Example 9

The same procedures as in Example 14 were followed, except for changing the polymer of Example 14 to R-D. The results are shown in Table 5.

Comparative Example 10

28 g of carbon black (#960, powder, solids content: 100%, manufactured by Mitsubishi Chemical Corporation), 112 g of a 10% aqueous solution of R-G, and 126 g of deionized water were mixed and preliminarily dispersed for 10 minutes by using a homogenizer. Thereafter, the dispersion was dispersed at 80° C. for 6 hours by milling with zirconia beads of 0.5 mm in diameter as media, and after dropping the temperature to 60° C., 14 g of a 10% aqueous solution of the polymer as obtained in Comparative Example 2 was added dropwise to the dispersion over 5 minutes by using a Peri-Star pump. Dispersing was carried out for one hour, and after dropping the temperature to 40° C., dispersing was continued for one hour to obtain a dispersion.

The foregoing dispersion was dispersed by using an ultrasonic homogenizer in the same manner as in Example 16, to obtain a pigment dispersion. This dispersion was adjusted so as to have a pigment concentration of 8% by weight, thereby preparing a pigment dispersion. This dispersion was formed into an ink in the same manner as Example 13 to obtain a recording liquid. However, the prepared recording liquid had a very high viscosity so that printing could not be carried out. The results are shown in Table 5.

TABLE 5

|  | Pigment | Dye | Block polymer | Random polymer | Stability of recording liquid | | | Rub fastness | | Gloss |
|---|---|---|---|---|---|---|---|---|---|---|
|  |  |  |  |  | Particle size (before the test) | Particle size (after the test) | Stability | Just after printing | After lapsing one hour |  |
| Example 8 | Magenta | Yes | PVA-b-P(AA(Na)·tBA·A (CH3)) | — | 106 nm | 112 nm | A | A | A | 46 |
| Example 9 | Cyan | Yes | PVA-b-P(AA(Na)·tBA·A (CH3)) | — | 107 nm | 104 nm | A | A | A | 45 |
| Example 10 | Yellow | Yes | PVA-b-P(AA(Na)·tBA·A (CH3)) | — | 108 nm | 121 nm | A | A | A | 50 |
| Example 11 | CB | Yes | PVA-b-P(AA(Na)·tBA·A (CH3)) | — | 112 nm | 111 nm | A | A | A | 43 |
| Example 12 | Cyan | Yes | PVA-b-P(AA·tBA·A (CH3)·St) | — | 94 nm | 109 nm | A | A | A | 50 |
| Example 13 | Magenta | — | PVA-b-P(AA(Na)·tBA·A (CH3)) | — | 121 nm | 124 nm | A | A | A | 43 |
| Example 14 | CB | — | PVA-b-P(AA(Na)·tBA·A (CH3)) | — | 128 nm | 134 nm | A | A | A | 40 |
| Example 15 | CB | — | PVA-b-P(AA(Na)·A (CH3)·MAA·BzMA) | P(nBA·AA) | 110 nm | 92 nm | A | A | A | 58 |
| Example 16 | Magenta | — | PVA-b-P(AA(Na)·A (CH3)·MAA·BzMA) | P(St·nBA·AA = 20/30/50) | 106 nm | 106 nm | A | A | A | 51 |
| Example 17 | Magenta | — | PVA-b-P(AA(Na)·A (CH3)·MAA·BzMA) | P(St·nBA·AA = 10/30/60) | 111 nm | 99 nm | A | A | A | 53 |
| Example 18 | Magenta | — | PVA-b-P(AA(Na)·nBA·St) | P(St·nBA·AA = 20/30/30) | 107 nm | 111 nm | A | A | A | 52 |
| Example 19 | Magenta | — | PVA-b-P(AA(Na)·A (CH3)·MAA·BzMA·St) | P(St·nBA·AA = 20/30/30) | 116 nm | 112 nm | A | A | A | 56 |
| Example 20 | Cyan | — | PVA-b-P(AA(Na)·A (CH3)·MAA·BzMA·St) | P(St·nBA·AA = 10/50/40) | 122 nm | 120 nm | A | A | A | 49 |
| Example 21 | Yellow | — | PVA-b-P(AA(Na)·A (CH3)·MAA·BzMA·St) | P(St·nBA·AA = 10/60/30) | 135 nm | 139 nm | A | A | A | 55 |
| Example 22 | Magenta | — | PVA-b-P(AA(Na)·A (CH3)·MAA·BzMA·St) | P(St·nBA·AA = 20/30/30) | 116 nm | 109 nm | A | A | A | 59 |
| Example 23 | CB | — | PVA-b-P(AA(Na)·A (CH3)·MAA·BzMA·St) | P(St·nBA·AA = 20/30/30) | 106 nm | 116 nm | A | A | A | 68 |
| Example 24 | Cyan | — | PVA-b-P(AA(Na)·A (CH3)·MAA·BzMA·St) | P(St·nBA·AA = 20/30/30) | 115 nm | 115 nm | A | A | A | 54 |
| Example 25 | Yellow | — | PVA-b-P(AA(Na)·A (CH3)·MAA·BzMA·St) | P(St·nBA·AA = 20/30/30) | 130 nm | 133 nm | A | A | A | 51 |
| Example 26 | CB | — | PVA-b-P(AA(Na)·A (CH3)·MAA·BzMA·St) | P(St·2EHA·AA = 20/30/30) | 104 nm | 108 nm | A | A | A | 58 |
| Example 27 | CB | — | PVA-b-P(AA(Na)·A (CH3)·MAA·BzMA·St) | P(BzMA·nBA·AA = 20/30/30) | 100 nm | 101 nm | A | A | A | 56 |
| Example 28 | CB | — | PVA-b-P(AA(Na)·A (CH3)·MAA·BzMA·St) | P(BzMA·nBA·AA = 33/23/44) | 111 nm | 112 nm | A | A | A | 53 |
| Example 29 | CB | — | PVA-b-P(AA(Na)·A (CH3)·MAA·BzMA·St) | P(St·BzMA·nBA·AA = 22/11/23/44) | 109 nm | 111 nm | A | A | A | 59 |
| Example 30 | Cyan | — | PVA-b-P(AA(Na)·A (CH3)·MAA·BzMA·St) | P(St·nBA·AA = 20/30/30) | 111 nm | 116 nm | A | A | A | 50 |
| Example 31 | CB | — | PVA-b-P(AA(Na)·A (CH3)·MAA·BzMA·St) | P(St·2EHA·AA = 20/30/30) | 88 nm | 91 nm | A | A | A | 72 |
| Example 32 | Cyan | — | PVA-b-P(AA(Na)·A (CH3)·MAA·BzMA·St) | P(St·nBA·AA = 20/30/30) | 113 nm | 116 nm | A | A | A | 50 |
| Example 33 | CB | — | PVA-b-P(AA(Na)·A (CH3)·MAA·BzMA·St) | P(St·nBA·AA = 20/30/30) | 108 nm | 107 nm | A | A | A | 60 |
| Comparative Example 3 | Magenta | Yes | — | PVA | 105 nm | 2,000 nm | C | C | C | 23 |
| Comparative Example 4 | Magenta | Yes | PSt-b-PAA | — | 107 nm | 356 nm | B | C | B | 25 |
| Comparative Example 5 | Magenta | Yes | — | — | 101 nm | Could not be detected. | C | C | C | 26 |
| Comparative Example 6 | Magenta | — | PSt-b-PAA | — | Could not be detected. | — | — | — | — | — |
| Comparative Example 7 | Magenta | — | — | PVA | Could not be detected. | — | — | — | — | — |
| Comparative Example 8 | CB | — | — | JC678 | 130 nm | 160 nm | B | C | C | 18 |

TABLE 5-continued

| | Pigment | Dye | Block polymer | Random polymer | Stability of recording liquid | | | Rub fastness | | |
| | | | | | Particle size (before the test) | Particle size (after the test) | Stability | Just after printing | After lapsing one hour | Gloss |
| --- | --- | --- | --- | --- | --- | --- | --- | --- | --- | --- |
| Comparative Example 9 | CB | — | — | P(St · nBA · AA) | 118 nm | 142 nm | B | C | C | 22 |
| Comparative Example 10 | CB | — | — | P(AA(Na) · A(CH3) · MAA · BzMA · St) | 125 nm | 150 nm | B | — | — | — |

It is noted from the foregoing results that the recording liquid having a polyvinyl alcohol based block copolymer added thereto according to the invention is excellent in stability, and high in gloss (high in printing density) and excellent in rub fastness of the resulting printed matter. On the other hand, it is noted that the recording liquid not using this polymer or using a known polymer is low in stability and insufficient in rub fastness and low in printing density of the resulting printed matter.

While the invention has been described in detail and with reference to specific embodiments thereof, it will be apparent to one skilled in the art that various changes and modifications can be made therein without departing from the spirit and scope thereof.

This application is based on a Japanese patent application filed Apr. 2, 2003 (Patent Application No. 2003-99276) and a Japanese patent application filed Jun. 10, 2003 (Patent Application No. 2003-164779), the contents thereof being hereby incorporated by reference.

INDUSTRIAL APPLICABILITY

According to the invention, it is possible to provide a recording liquid of a pigment dispersion type capable of giving a printed matter which is high in optical density, is suppressed in blur, has high printing quality, and has good fastness including rub fastness, light fastness and water fastness and having a low viscosity, good discharge properties and good storage stability. In particular, the recording liquid of the invention can be suitably used for recording liquids for an inkjet printer, etc.

The invention claimed is:

1. A polyvinyl alcohol based block copolymer represented by the following general formula (1):

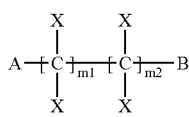

(1)

wherein:
A represents a polyvinyl alcohol based block;
B represents a block containing a hydrophobic segment B' and a hydrophilic or hydrophobic segment B" other than A and B', the block B comprising a charge group;
$X^1$, $X^2$, $X^3$, and $X^4$ each independently represents a hydrogen atom, a halogen atom, an alkyl group, an alkenyl group, an aralkyl group, or an aryl group;
m1 represents an integer of from 1 to 5;
m2 represents an integer of from 0 to 4; and
(m1+m2) represents an integer of from 1 to 5.

2. The polyvinyl alcohol based block copolymer according to claim 1, characterized in that the polyvinyl alcohol based block A in the general formula (1) has a molecular weight of 500 or more and not more than 100,000.

3. The polyvinyl alcohol based block copolymer according to claim 1, characterized in that the segments B' and B" in the block B are aligned in the order of B' and B" from the side near A.

4. The polyvinyl alcohol based block copolymer according to claim 1, characterized in that the block B is a gradient copolymer.

5. The polyvinyl alcohol based block copolymer according to claim 1, characterized in that the polyvinyl alcohol based block A has a molecular weight of from 500 to 50,000; and that the block B has a molecular weight of from 500 to 50,000.

6. The polyvinyl alcohol based block copolymer according to claim 1, characterized in that A in the general formula (1) is represented by any one of the following general formulae (2) to (5):

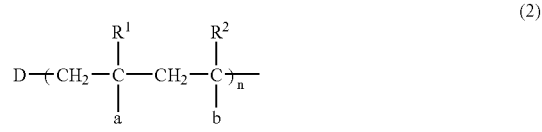

(2)

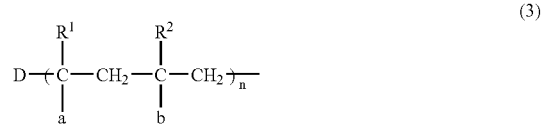

(3)

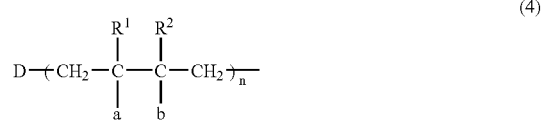

(4)

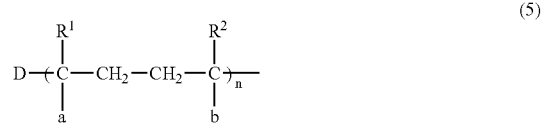

(5)

(wherein a and b each represents —OH or —OCOR³, (wherein R³ represents a hydrogen atom, an alkyl group, an alkenyl group, an aryl group, or an aralkyl group, provided that the case where a and b represent —OCOR³ at the same time is excluded); $R^1$ and $R^2$ each independently represents a hydrogen atom or a hydrocarbon group having from 1 to 6 carbon atoms; n represents an integer of from 1 to 1,000; and D is represented by the following general formula (6) or (7):

(6)

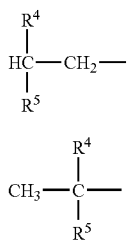

(7)

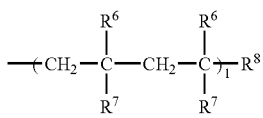

(wherein $R^4$ represents a hydrogen atom or a hydrocarbon group having from 1 to 6 carbon atoms; and $R^5$ represents —OH or —OCOR$^4$, (wherein $R^4$ represents a hydrogen atom, an alkyl group, an alkenyl group, an aryl group, or an aralkyl group))); and that B in the general formula (1) is represented by any one of the following general formulae (8) to (11):

(8)

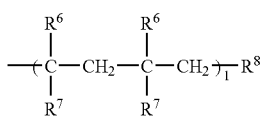

(9)

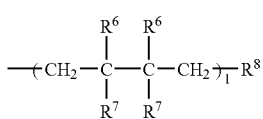

(10)

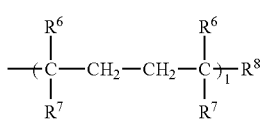

(11)

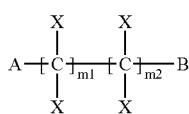

(wherein $R^6$ represents a hydrogen atom, a halogen atom, a cyano group, or an alkyl group having from 1 to 10 carbon atoms; $R^7$ represents a hydrogen atom, a hydroxyl group, a halogen atom, a cyano group, a carboxyl group, a carboxylato salt, an aminocarbonyl group, an alkyl group, an acyloxy group, an alkenyl group, an aryl group, or an alkoxycarbonyl group; $R^8$ represents a hydrogen atom, a halogen atom, an alkyl group, an alkyl ether group, an alkenyl group, an aryl group, an aralkyl group, or an acyloxy group; and l represents an integer of from 1 to 1,000).

7. A pigment dispersion aqueous liquid containing at least a pigment and a polyvinyl alcohol based block copolymer represented by the following general formula (1) in an aqueous medium:

(1)

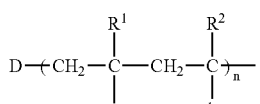

wherein:
A represents a polyvinyl alcohol based block;
B represents a block containing a hydrophobic segment B' and a hydrophilic or hydrophobic segment B" other than A and B', the block B comprising a charge group;

$X^1$, $X^2$, $X^3$, and $X^4$ each independently represents a hydrogen atom, a halogen atom, an alkyl group, an alkenyl group, an aralkyl group, or an aryl group;
m1 represents an integer of from 1 to 5;
m2 represents an integer of from 0 to 4; and
(m1+m2) represents an integer of from 1 to 5.

8. The pigment dispersion aqueous liquid according to claim 7, characterized in that the polyvinyl alcohol based block A in the general formula (1) has a molecular weight of 500 or more and not more than 100,000.

9. The pigment dispersion aqueous liquid according to claim 7, characterized in that the segments B' and B" in the block B are aligned in the order of B' and B" from the side near A.

10. The pigment dispersion aqueous liquid according to claim 7, characterized in that the block B is a gradient copolymer.

11. The pigment dispersion aqueous liquid according to claim 7, characterized in that the polyvinyl alcohol based block A has a molecular weight of from 500 to 50,000; and that the block B has a molecular weight of from 500 to 50,000.

12. The pigment dispersion aqueous liquid according to claim 7, characterized in that A in the general formula (1) is represented by any one of the following general formulae (2) to (5):

(2)

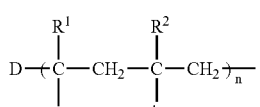

(3)

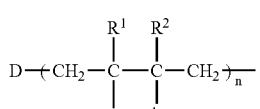

(4)

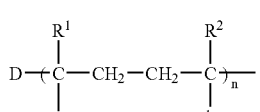

(5)

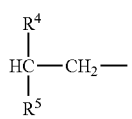

(wherein a and b each represents —OH or —OCOR$^3$, (wherein $R^3$ represents a hydrogen atom, an alkyl group, an alkenyl group, an aryl group, or an aralkyl group, provided that the case where a and b represent —OCOR$^3$ at the same time is excluded); $R^1$ and $R^2$ each independently represents a hydrogen atom or a hydrocarbon group having from 1 to 6 carbon atoms; n represents a integer of from 1 to 1,000; and D is represented by the following general formula (6) or (7):

(6)

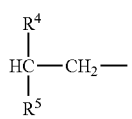

-continued

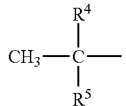
(7)

(wherein $R^4$ represents a hydrogen atom or a hydrocarbon group having from 1 to 6 carbon atoms; and $R^5$ represents —OH or —OCOR$^4$, (wherein $R^4$ represents a hydrogen atom, an alkyl group, an alkenyl group, an aryl group, or an aralkyl group))); and that B in the general formula (1) is represented by any one of the following general formulae (8) to (11):

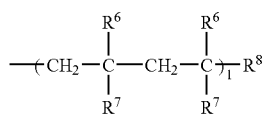
(8)

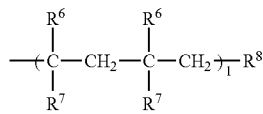
(9)

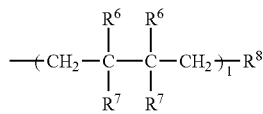
(10)

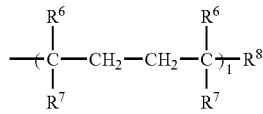
(11)

(wherein $R^6$ represents a hydrogen atom, a halogen atom, a cyano group, or an alkyl group having from 1 to 10 carbon atoms; $R^7$ represents a hydrogen atom, a hydroxyl group, a halogen atom, a cyano group, a carboxyl group, a carboxylato salt, an aminocarbonyl group, an alkyl group, an acyloxy group, an alkenyl group, an aryl group, or an alkoxycarbonyl group; $R^8$ represents a hydrogen atom, a halogen atom, an alkyl group, an alkyl ether group, an alkenyl group, an aryl group, an aralkyl group, or an acyloxy group; and 1 represents a integer of from 1 to 1,000).

13. The pigment dispersion aqueous liquid according to claim 7, characterized in that the pigment is one or two or more pigments selected from the group consisting of phthalocyanine based pigments, anthrapyrimidine based pigments, anthanthrone based pigments, indanthrone based pigments, flavanthrone based pigments, perylene based pigments, diketopyrrolopyrrole based pigments, perinone based pigments, quinophthalone based pigments, anthraquinone based pigments, thioindigo based pigments, quinacridone based pigments, quinacridone quinone based pigments, xanthene based pigments, dioxazine based pigments, monoazo based pigments, disazo based pigments, azomethine based pigments, carbon black, metal complex based pigments, and inorganic pigments.

14. The pigment dispersion aqueous liquid according to claim 7, characterized in that a weight ratio of the pigment to the polyvinyl alcohol based block copolymer is from 1:0.01 to 1:2.

15. The pigment dispersion aqueous liquid according to claim 7, characterized by further containing a copolymer containing a hydrophobic segment and a hydrophilic segment other than a polyvinyl alcohol based block, with a weight ratio of said copolymer to the polyvinyl alcohol based block copolymer being from 99:1 to 1:99.

16. The pigment dispersion aqueous liquid according to claim 15, characterized in that the copolymer containing a hydrophobic segment and a hydrophilic segment other than a polyvinyl alcohol based block is a random copolymer.

17. A recording liquid containing the pigment dispersion aqueous liquid according to claim 7.

* * * * *